United States Patent
Kwak et al.

(10) Patent No.: US 9,348,504 B2
(45) Date of Patent: May 24, 2016

(54) MULTI-DISPLAY APPARATUS AND METHOD OF CONTROLLING THE SAME

(71) Applicant: Samsung Electronics Co., Ltd, Suwon-si, Gyeonggi-do (KR)

(72) Inventors: Ji-yeon Kwak, Seoul (KR); Hyun-jin Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 157 days.

(21) Appl. No.: 14/050,803

(22) Filed: Oct. 10, 2013

(65) Prior Publication Data

US 2014/0101575 A1 Apr. 10, 2014

(30) Foreign Application Priority Data

Oct. 10, 2012 (KR) .......................... 10-2012-0112687

(51) Int. Cl.
| | | |
|---|---|---|
| *G06F 15/00* | (2006.01) | |
| *G06F 13/00* | (2006.01) | |
| *G06F 3/0488* | (2013.01) | |
| *G06F 3/0481* | (2013.01) | |
| *G06F 1/16* | (2006.01) | |
| *G06F 3/0486* | (2013.01) | |
| *H04M 1/02* | (2006.01) | |

(52) U.S. Cl.
CPC ............ *G06F 3/0488* (2013.01); *G06F 1/1616* (2013.01); *G06F 3/0486* (2013.01); *G06F 3/04817* (2013.01); *H04M 1/0216* (2013.01); *H04M 1/0243* (2013.01); *G06F 2200/1614* (2013.01); *G06F 2200/1637* (2013.01); *H04M 2250/16* (2013.01)

(58) Field of Classification Search
CPC .............................. G06F 1/1616; G06F 3/0481
USPC .................. 715/781, 702, 767, 789, 830, 864
See application file for complete search history.

(56) References Cited

U.S. PATENT DOCUMENTS

| | | | |
|---|---|---|---|
| 5,862,251 | A | 1/1999 | Al-Karmi et al. |
| 6,545,669 | B1 | 4/2003 | Kinawi et al. |
| 6,750,858 | B1 | 6/2004 | Rosenstein |
| 6,819,939 | B2 | 11/2004 | Masamura |

(Continued)

FOREIGN PATENT DOCUMENTS

| | | |
|---|---|---|
| EP | 2244166 | 10/2010 |
| EP | 2347317 | 7/2011 |

(Continued)

OTHER PUBLICATIONS

US 7,092,574, 08/2006, Suzuki et al. (withdrawn)

*Primary Examiner* — Kevin Nguyen
(74) *Attorney, Agent, or Firm* — Staas & Halsey LLP

(57) ABSTRACT

A multi-display apparatus includes a first body on which a first display is provided, a second body on which a second display is provided, a hinge configured to connect the first body and the second body, a storage configured to store control operation information which is matched with a rotated state of the first body and the second body, a sensor configured to sense a folding gesture to rotate at least one of the first body and the second body on a basis of the hinge, and a controller configured to perform, when the folding gesture is sensed, an operation corresponding to the folding gesture using the control operation information corresponding to the rotated state of a rotated body from among the first body and the second body.

26 Claims, 50 Drawing Sheets

(56) References Cited

U.S. PATENT DOCUMENTS

| | | | |
|---|---|---|---|
| 7,006,134 | B1 | 2/2006 | Arai et al. |
| 7,120,317 | B1 | 10/2006 | Wu et al. |
| 8,049,737 | B2 | 11/2011 | Cho et al. |
| 8,793,608 | B2 * | 7/2014 | Sirpal et al. .................. 715/781 |
| 2003/0179422 | A1 | 9/2003 | Liu |
| 2004/0020941 | A1 | 2/2004 | Engesser et al. |
| 2004/0150671 | A1 | 8/2004 | Kamiwada et al. |
| 2006/0062466 | A1 | 3/2006 | Zou et al. |
| 2006/0161870 | A1 | 7/2006 | Hotelling et al. |
| 2007/0242056 | A1 | 10/2007 | Engelhardt et al. |
| 2008/0126955 | A1 | 5/2008 | Takatoshi |
| 2008/0148184 | A1 | 6/2008 | Davis |
| 2008/0244468 | A1 | 10/2008 | Nishihara et al. |
| 2010/0060664 | A1 | 3/2010 | Kilpatrick, II et al. |
| 2010/0064244 | A1 | 3/2010 | Kilpatrick, II et al. |
| 2010/0073306 | A1 | 3/2010 | Hickerson |
| 2010/0079355 | A1 | 4/2010 | Kilpatrick, II et al. |
| 2010/0085382 | A1 | 4/2010 | Lundqvist et al. |
| 2010/0103099 | A1 | 4/2010 | Lee |
| 2010/0182265 | A1 | 7/2010 | Kim et al. |
| 2010/0188353 | A1 | 7/2010 | Yoon et al. |
| 2010/0245256 | A1 | 9/2010 | Estrada et al. |
| 2010/0255862 | A1 | 10/2010 | Mitsunaga et al. |
| 2010/0275159 | A1 | 10/2010 | Matsubara et al. |
| 2011/0018901 | A1 * | 1/2011 | Boorman et al. ............. 345/629 |
| 2011/0102314 | A1 | 5/2011 | Roux |
| 2011/0107226 | A1 | 5/2011 | Heo |
| 2011/0187646 | A1 | 8/2011 | Mahmoud |
| 2011/0191704 | A1 | 8/2011 | Hinckley et al. |
| 2011/0209102 | A1 | 8/2011 | Hinckley et al. |
| 2011/0216064 | A1 | 9/2011 | Dahl et al. |
| 2011/0291988 | A1 | 12/2011 | Bamji et al. |
| 2011/0310031 | A1 | 12/2011 | Harris et al. |
| 2012/0015694 | A1 | 1/2012 | Han |
| 2012/0042246 | A1 | 2/2012 | Schwesinger et al. |
| 2012/0064947 | A1 | 3/2012 | Yi et al. |
| 2012/0084710 | A1 | 4/2012 | Sirpal et al. |

FOREIGN PATENT DOCUMENTS

| | | |
|---|---|---|
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 1020100053597 | 5/2010 |
| KR | 10-0960577 | 6/2010 |
| KR | 1020100086639 | 8/2010 |
| KR | 1020100105005 | 9/2010 |
| KR | 1020100115547 | 10/2010 |
| KR | 1020100121880 | 11/2010 |
| KR | 1020100132772 | 12/2010 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110116699 | 10/2011 |
| KR | 10-1094769 | 12/2011 |
| KR | 20110139697 | 12/2011 |
| KR | 20120006674 | 1/2012 |
| KR | 1020120001944 | 1/2012 |
| KR | 1020120026395 | 3/2012 |
| KR | 1020120038692 | 4/2012 |
| WO | 2006086508 | 8/2006 |
| WO | 2012044545 | 4/2012 |

* cited by examiner

FIG. 11
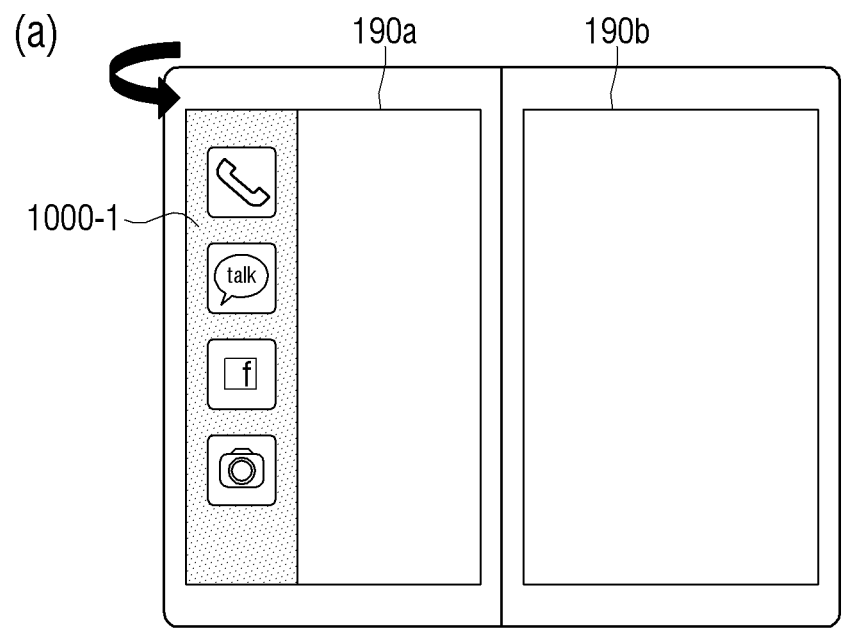
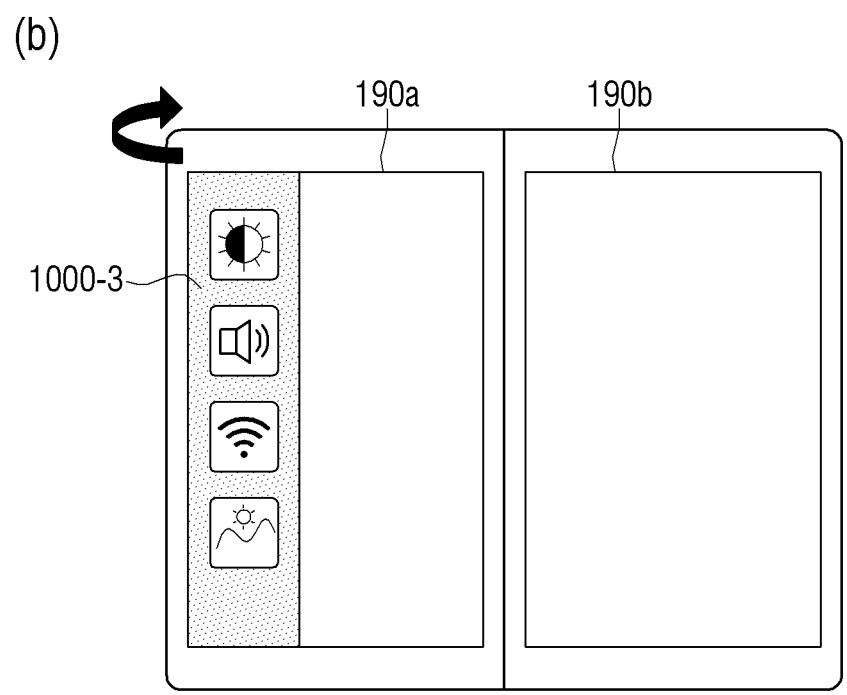

FIG. 12
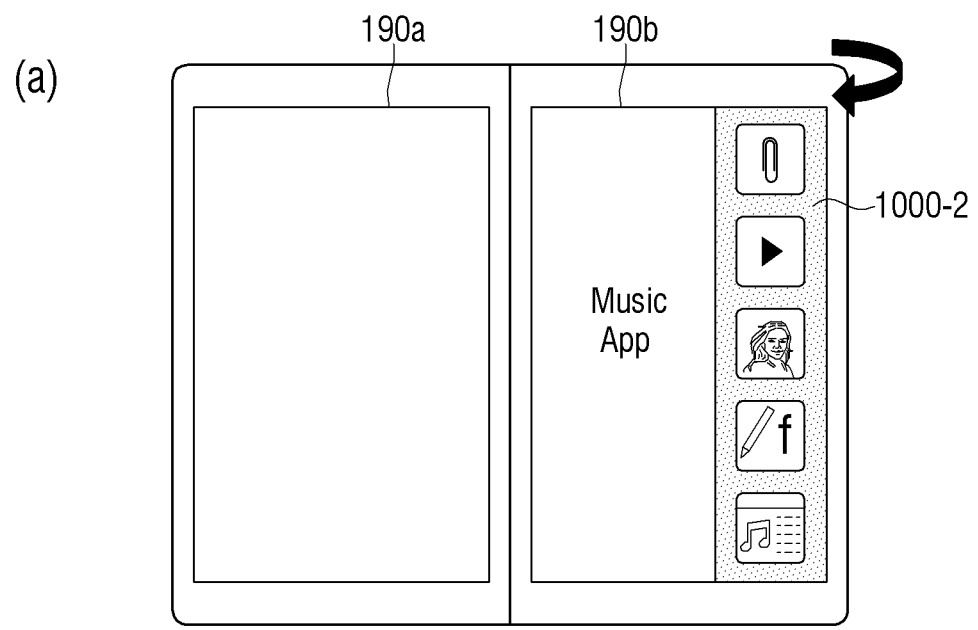
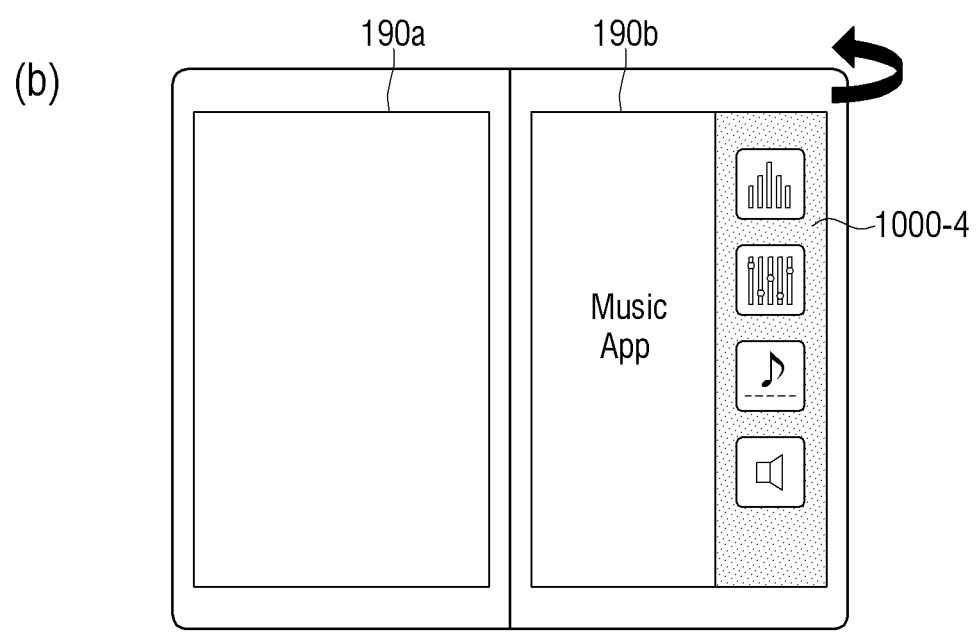

FIG. 13
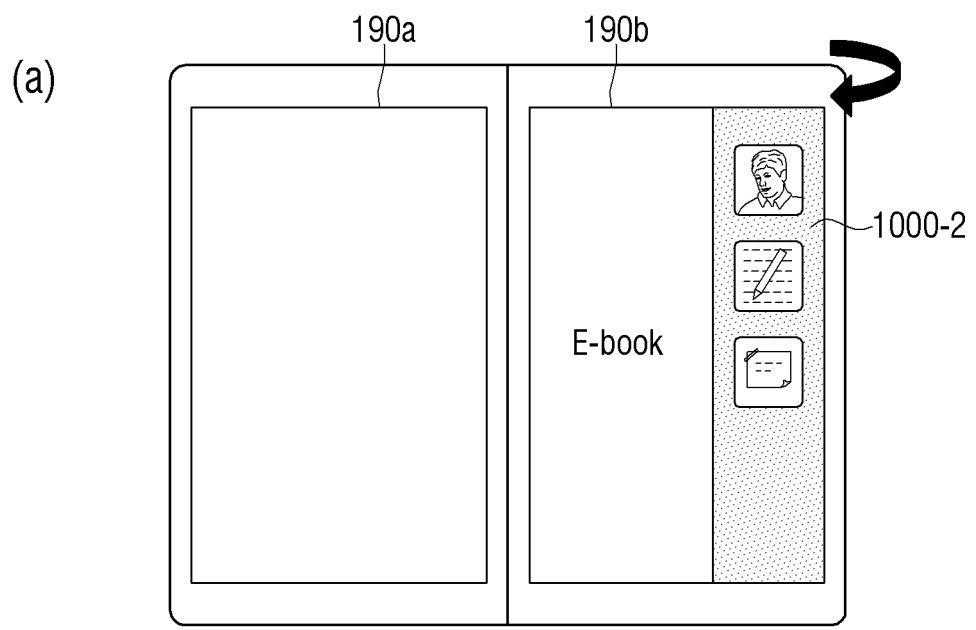
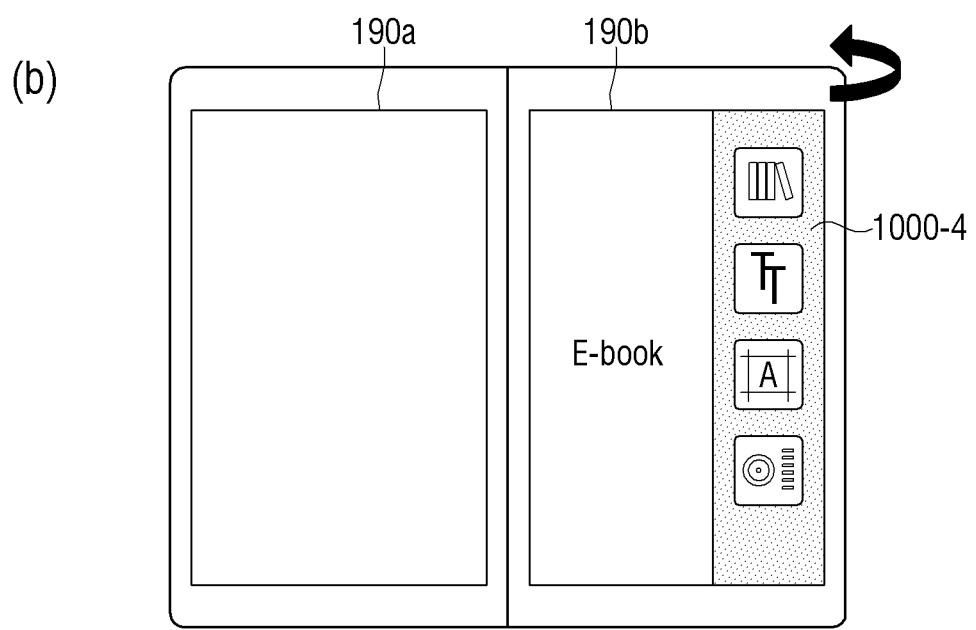

FIG. 14
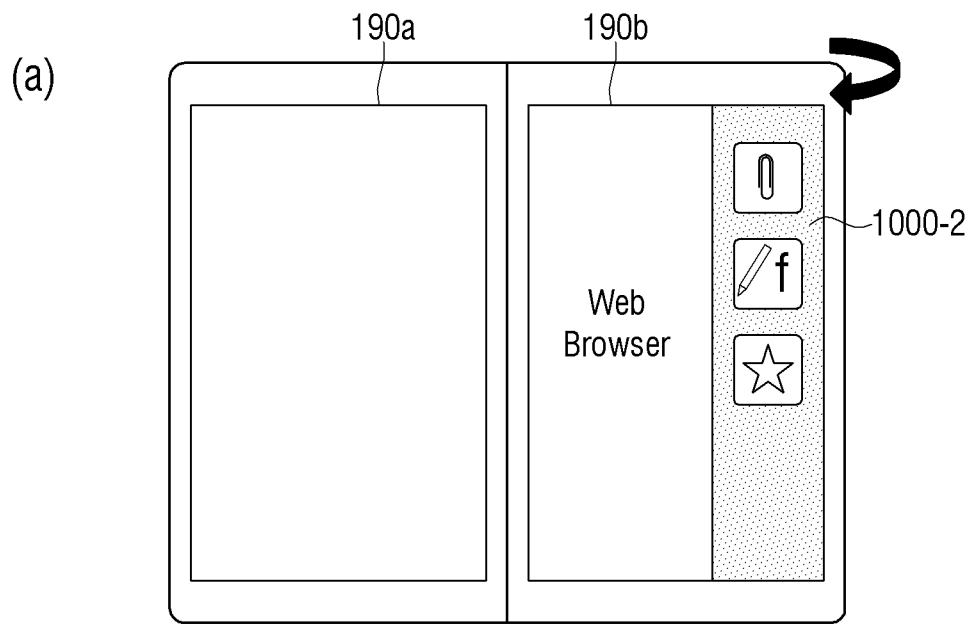
(a)
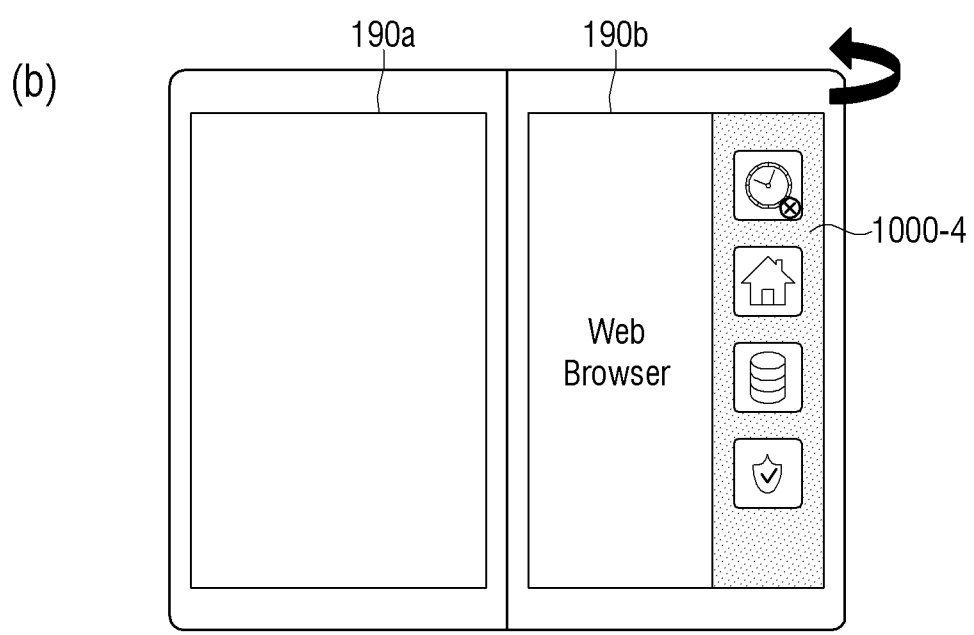
(b)

FIG. 15
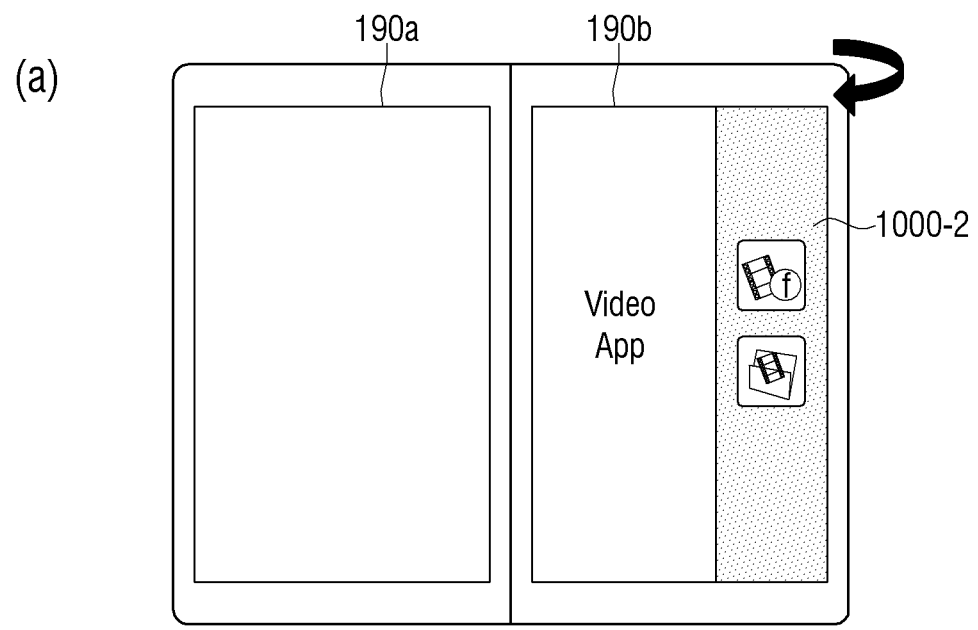
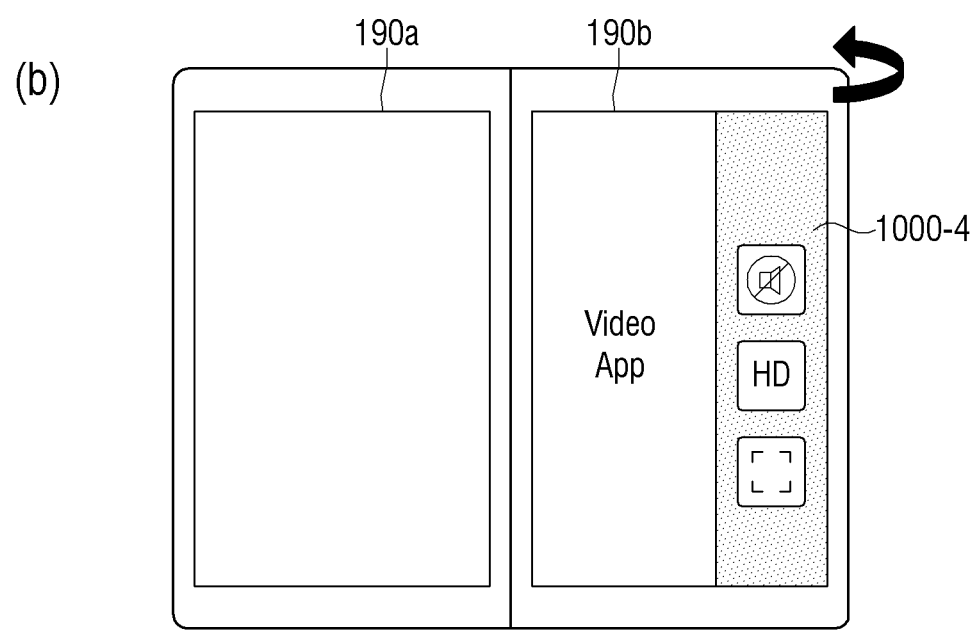

MULTI-DISPLAY APPARATUS AND METHOD OF CONTROLLING THE SAME

CROSS-REFERENCE TO RELATED APPLICATIONS

This application claims the benefit of priority under 35 U.S.C. §119 to Korean Patent Application No. 10-2012-0112687, filed on Oct. 10, 2012, in the Korean Intellectual Property Office, the content of which is incorporated herein in its entirety by reference.

BACKGROUND OF THE INVENTION

1. Field of the Invention

Embodiments of the inventive concept relate to a multi-display apparatus and a method of controlling the same, and more particularly, to a multi-display apparatus configured to display task screens using multiple displays and to display a user interface corresponding to a user's manipulation, and a method of controlling the same.

2. Description of the Related Art

Diverse types of displays have been used recently. In such displays, diverse applications are installed and run by the user's selection. The user may control a display apparatus using an input apparatus. In particular, a portable electronic device, which may be carried by users, is usually developed as a display apparatus, which uses a user interface in a touch screen format because of its small in size. Accordingly, a display apparatus may provide diverse types of graphical user interfaces (GUIs), which can be touched by users.

A GUI may be provided in an optimal form so that the user may intuitively see operation of running applications and control the apparatus more easily and rapidly.

However, the related-art user interfaces have mostly been produced for a display apparatus having a single display unit. Accordingly, development of a user interface method appropriate for a multi-display apparatus having a plurality of display units has not been entirely satisfactory.

In particular, as technology of a central processing unit (CPU) and software has been developed, a portable device may provide a plurality of task screens to display a single or a plurality of applications. The plurality of task screens may be provided using one or more touch screens, which may be physically or graphically separated.

Accordingly, there is a need for a GUI method for a touch screen of a multi-display apparatus in order that the user may use the multi-display apparatus more intuitively and conveniently.

SUMMARY OF THE INVENTION

The present inventive concept provides a multi-display apparatus having a user interface that allows a user to control the multi-display apparatus and to run applications intuitively and conveniently, and a controlling method thereof.

Additional features and utilities of the present general inventive concept will be set forth in part in the description which follows and, in part, will be obvious from the description, or may be learned by practice of the general inventive concept.

The foregoing and/or other features and utilities of the present inventive concept may be achieved by providing a multi-display apparatus including a first body on which a first display is provided, a second body on which a second display is provided, a hinge configured to connect the first body and the second body, a storage configured to store control operation information which is matched with a rotated state of the first body and the second body, a sensor configured to sense a folding gesture to rotate at least one of the first body and the second body on a basis of the hinge, and a controller configured to perform, when the folding gesture is sensed, an operation corresponding to the folding gesture using the control operation information corresponding to the rotated state of a rotated body from among the first body and the second body.

The controller may be configured to display a user interface (UI) corresponding to the folding gesture at a predetermined area of a screen of the first display or the second display.

The controller may be configured to expand and to reduce the UI according to a dragging direction when a manipulation to drag the UI is input.

The controller may be configured to adjust at least one of a display position and a shape of the UI according to a dragging direction when a manipulation to drag the UI is input.

The sensor may be configured to sense rotation of the multi-display apparatus, and the controller may be configured to change an arrangement direction of objects displayed on the UI according to a rotating direction when rotation of the multi-display apparatus is sensed.

The sensor may be configured to sense rotation of the multi-display apparatus, and the controller may be configured to change a display position of the UI according to a rotating direction when rotation of the multi-display apparatus is sensed.

The controller may be configured to display, when the first body is rotated in a first direction, a clipboard UI on a predetermined area of a screen of the first display, the controller may be configured to display, when the first body is rotated in a second direction opposite to the first direction, an application configuration UI on the predetermined area of the screen of the first display, the controller may be configured to display, when the second body is rotated in a third direction, a quick launcher UI on a predetermined area of a screen of the second display, and the controller may be configured to display, when the second body is rotated in a fourth direction opposite to the third direction, a configuration UI on the predetermined area of the screen of the second display.

The controller may be configured to produce a first symbol for a first object and to display the first symbol on the clipboard UI when a first touch gesture is input to select the first object on the screen displayed on one of the first display and the second display and to move the first object onto the clipboard UI, and the controller may be configured to produce a second object for a second symbol and to display the second object on the screen displayed on one of the first display and the second display when a second touch gesture is input to select the second symbol displayed on the clipboard UI and to move the second symbol onto the screen.

The controller may be configured to display a recycle bin icon on the clipboard UI when a first touch gesture is input to touch a symbol displayed on the clipboard UI for a predetermined time, and the controller may be configured to delete the symbol from the clipboard UI when a second touch gesture is input to move the symbol to the recycle bin icon.

The folding gesture may be a folding and flat gesture in which the first body or the second body is rotated in a first direction on the basis of the hinge and is rotated in a second direction opposite to the first direction within a predetermined time.

The controller may be configured to display, when the folding and flat gesture occurs, a screen corresponding to the folding and flat gesture on at least one of the first display and the second display, and the controller may be configured to stop displaying the screen, when the folding and flat gesture occurs again while the controller is displaying the screen, and to return to an original state.

The folding gesture may be a folding and hold gesture in which the first body or the second body is rotated in a first direction on the basis of the hinge and is maintained in this position for a predetermined time.

The controller may be configured to display, when the folding and hold gesture occurs and while in a holding state, a screen corresponding to the folding and hold gesture on at least one of the first and second displays, and the controller may be configured to stop displaying the screen, when the holding state is released, and to return to an original state.

The foregoing and/or other features and utilities of the present inventive concept also provide a method of controlling a multi-display apparatus, the method including storing control operation information which is matched with a rotated state of a first body of the multi-display apparatus and a second body of the multi-display apparatus, wherein a first display is provided on the first body, a second display is provided on the second body, and a hinge is configured to connect the first body and the second body, sensing a folding gesture to rotate at least one of the first body and the second body on a basis of the hinge, and performing, when the folding gesture is sensed, an operation corresponding to the folding gesture using the control operation information corresponding to a rotated state of a rotated body from among the first body and the second body.

The performing the operation corresponding to the folding gesture may include displaying a user interface (UI) corresponding to the folding gesture at a predetermined area of a screen of the first display or the second display.

The method may further include expanding or reducing the UI according to a dragging direction when a manipulation to drag the UI is input.

The method may further include adjusting at least one of a display position and a shape of the UI according to a dragging direction when a manipulation to drag the UI is input.

The method may further include sensing rotation of the multi-display apparatus, and an changing arrangement direction of objects displayed on the UI according to a rotating direction when rotation of the multi-display apparatus is sensed.

The method may further include sensing rotation of the multi-display apparatus, and changing a display position of the UI according to rotating direction when rotation of the multi-display apparatus is sensed.

The performing the operation corresponding to the folding gesture may include displaying, when the first body is rotated in a first direction, a clipboard UI on a predetermined area of a screen of the first display, displaying, when the first body is rotated in a second direction opposite to the first direction, an application configuration UI on the predetermined area of the screen of the first display, displaying, when the second body is rotated in a third direction, a quick launcher UI on a predetermined area of a screen of the second display, and displaying, when the second body is rotated in a fourth direction opposite to the third direction, a configuration UI on the predetermined area of the screen of the second display.

The method may further include producing a first symbol for a first object and displaying the first symbol on the clipboard UI when a first touch gesture is input to select the first object on the screen displayed on one of the first display and the second display and to move the first object onto the clipboard UI, and producing a second object for a second symbol and displaying the second object on the screen displayed on one of the first display and the second display when a second touch gesture is input to select the second symbol displayed on the clipboard UI and to move the second symbol onto the screen.

The method may further include displaying a recycle bin icon on the clipboard UI when a first touch gesture is input to touch a symbol displayed on the clipboard UI for a predetermined time, and deleting the symbol from the clipboard UI when a second touch gesture is input to move the symbol to the recycle bin icon.

The folding gesture may be a folding and flat gesture in which the first body or the second body is rotated in a first direction on the basis of the hinge and is rotated in a second direction opposite to the first direction within a predetermined time.

The performing the operation corresponding to the folding gesture may include displaying, when the folding and flat gesture occurs, a screen corresponding to the folding and flat gesture on at least one of the first and second displays, and stopping displaying the screen, when the folding and flat gesture occurs again while displaying the screen, and returning to an original state.

The folding gesture may be a folding and hold gesture in which the first body or the second body is rotated in a first direction on the basis of the hinge and is maintained in this position for a predetermined time.

The performing the operation corresponding to the folding gesture may include displaying, when the folding and hold gesture occurs and while in a holding state, a screen corresponding to the folding and hold gesture on at least one of the first and second displays, and stopping displaying the screen, when the holding state is released, and returning to an original state.

The foregoing and/or other features and utilities of the present inventive concept also provide an electronic apparatus including a first body connected to a second body in a common housing, a sensor configured to sense a gesture to rotate the first body with respect to the second body and to produce a signal in response to the gesture, and a controller configured to perform, in response to the signal, an operation in at least one of the first body and the second body, the operation corresponding to the gesture.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 3 to 15 illustrate examples of an operation of providing a user interface as illustrated in FIG. 2;

DETAILED DESCRIPTION OF THE EMBODIMENTS

Figure 1:
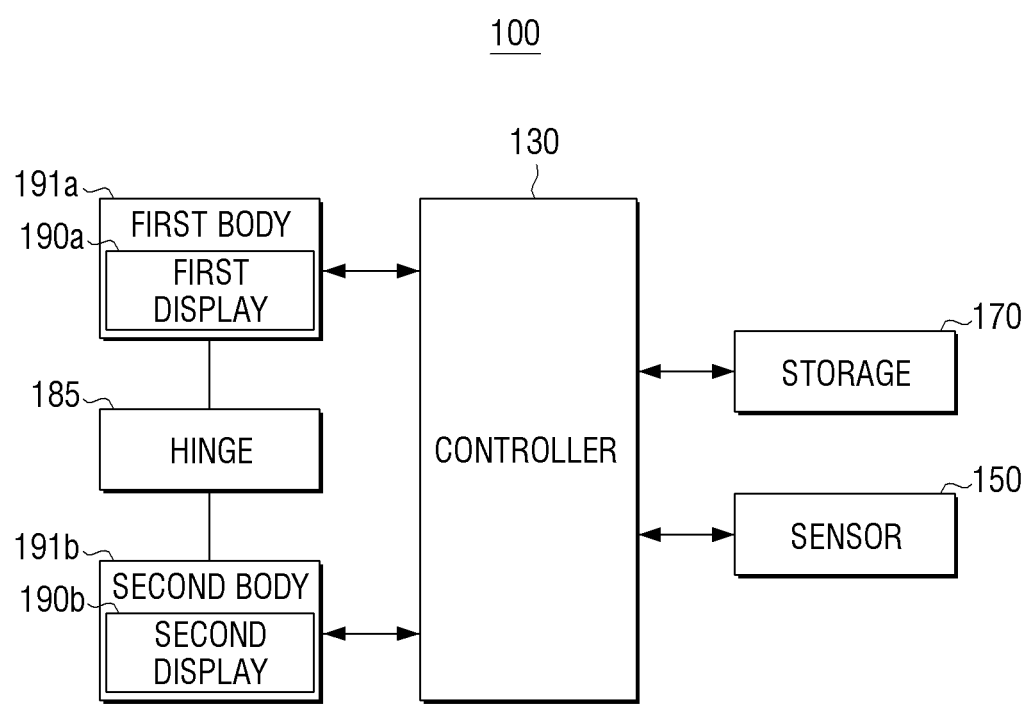
FIG. 1 is a schematic block diagram of a configuration of a multi-display apparatus according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the inventive concept. Thus, it is apparent that the exemplary embodiments of the present inventive concept may be carried out without those specifically defined matters. Also, well-known functions or constructions are not described in detail since they would obscure the inventive concept with unnecessary detail.

A multi-display apparatus may include one or more displays in a touch screen form, which may be an apparatus to run an application or to display content. For example, the multi-display apparatus may be a tablet personal computer (PC), a notebook computer, a portable multimedia player (PMP), personal digital assistant (PDA), a smart phone, a mobile phone, a digital picture frame, and the like. The exemplary embodiments of the present inventive concept are described with respect to a multi-display apparatus, which may be implemented with a cellular phone or a smart phone. However, the present inventive concept is not limited thereto.

FIG. 1 is a schematic block diagram of a configuration of a multi-display apparatus 100 according to an exemplary embodiment of the present inventive concept.

With reference to FIG. 1, the multi-display apparatus 100, according to an exemplary embodiment of the present inventive concept, may include a first display 190a provided on a first body 191a, a second display 190b provided on a second body 191b, a hinge 185 configured to connect the first body 191a and the second body 191b, a controller 130, a sensor 150, and a storage 170.

The first and second displays 190a and 190b may be implemented, for example, with touch screens, which may sense the user's touch. For example, each of the first and second displays 190a and 190b may be provided by stacking a touch sensing portion (not illustrated) and a display portion (not illustrated). The touch sensing portion may be implemented, for example, with a touch sensor to sense the user's touch and a proximity sensor to sense approach of the user's touch. The display portion may be implemented, for example. with a liquid crystal display (LCD) panel.

The first and second displays 190a and 190b may display diverse screens, such as, for example, a wallpaper screen including diverse icons, a web browsing screen, an application execution screen, a diverse content playback screen such as videos and pictures, a user interface screen, and so on, according to control of the controller 130.

The hinge 185 may connect the first body 191a and the second body 191b, and may support them so as to be rotatable. For example, the hinge 185 may connect the first and second displays 190a and 190b physically. The first display 190a may be provided on the first body 191a, and the second display 190b may be provided on the second body 191b.

The hinge 185 may physically connect the first body 191a and the second body 191b and may act as a shaft so that the first body 191a and the second body 191b may rotate respectively in a connected state. The hinge 185 may be formed in a single body to be connected to the first body 191a and the second body 191b, or may be formed in a plural body to be connected to both edges of the first body 191a and the second body 191b.

A more detailed external structure of the first and second bodies 191a and 191b and the hinge 185 is described below with reference to the drawings. For convenience of description, it is hereinbelow assumed that the hinge 185 may directly connect the first display 190a and the second display 190b.

The first display 190a and the second display 190b may rotate on the hinge 185. Accordingly, the first display 190a and the second display 190b may be closed and in contact, or may be bent back and opened in reverse so that rear faces of the first display 190a and the second display 190b may be in contact.

In addition, according to the structure of the hinge 185, the first display 190a and the second display 190b may be opened to 180 degrees in a completely flat form. The multi-display apparatus 100 may operate in diverse operating modes according to the degree to which the first display 190a and the second display 190b may be opened on the basis of the hinge 185.

Diverse operating modes are described below in detail with reference to the drawings.

When a folding gesture occurs in which the first body 191a or the second body 191b rotates on the hinge 185, the sensor 150 may sense an angle between the first body 191a and the second body 191b.

The folding gesture may be, for example, one of the user's gestures to control the multi-display apparatus 100 that uses a characteristic of the multi-display apparatus 100 in which the first body 191a and the second body 191b may rotate on the hinge 185.

An example of the folding gesture may be a folding and flat gesture in which the first body 191a or the second body 191b may be folded by rotating on the hinge 185 in a first direction and may become flat by rotating in a second direction opposite to the first direction within a predetermined time.

An example of the folding gesture may be a folding and hold gesture in which the first body 191a or the second body 191b may be folded by rotating on the hinge 185 in a first direction and maintaining this position.

The sensor 150 may sense rotation of the multi-display apparatus 100. For example, the user may turn the multi-display apparatus 100 horizontally or vertically. In this case, a pitch angle, a roll angle, a yaw angle, etc may change. The sensor 150 may sense these angles.

Figure 39:
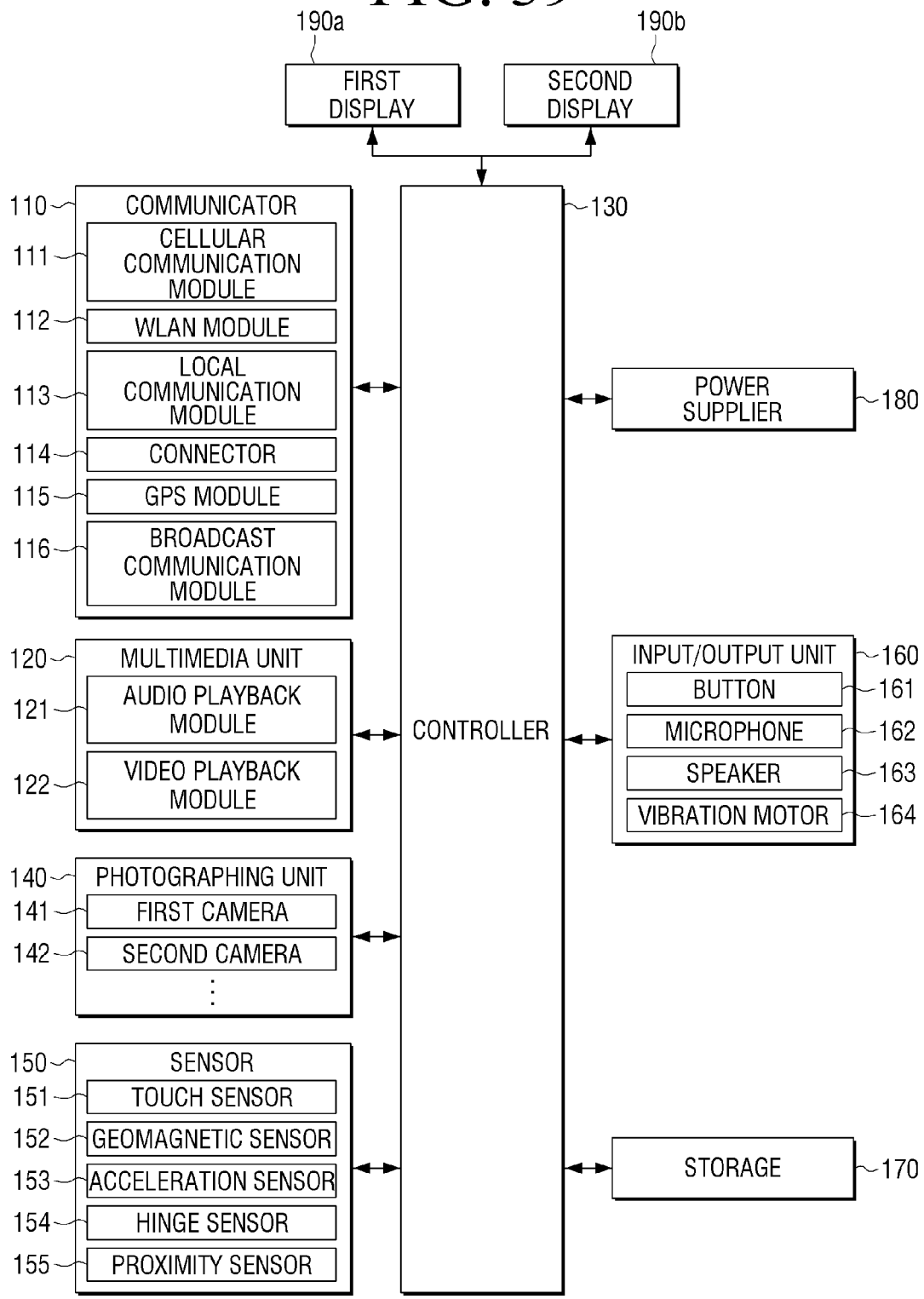
FIG. 39 is a detailed block diagram of a configuration of the multi-display apparatus according to an exemplary embodiment of the present inventive concept.

For example, the sensor 150 may include a touch sensor 151, a geomagnetic sensor 152, an acceleration sensor 153, a hinge sensor 154, and/or a proximity sensor 155 (see FIG. 39). Detailed description of these sensors is provided below with reference to the drawings.

The storage 170 may store control operation information which is matched differently according to a rotating body and its rotating direction. For example, the storage 170 may store control operation information that, when the first body 191a rotates in a first direction, a quick launcher user interface (UI) may be displayed at a predetermined area of a screen of the first display 190a or the second display 190b.

In addition, the storage 170 may store diverse programs and data which may be used for operation of the multi-display apparatus 100.

Figure 40:
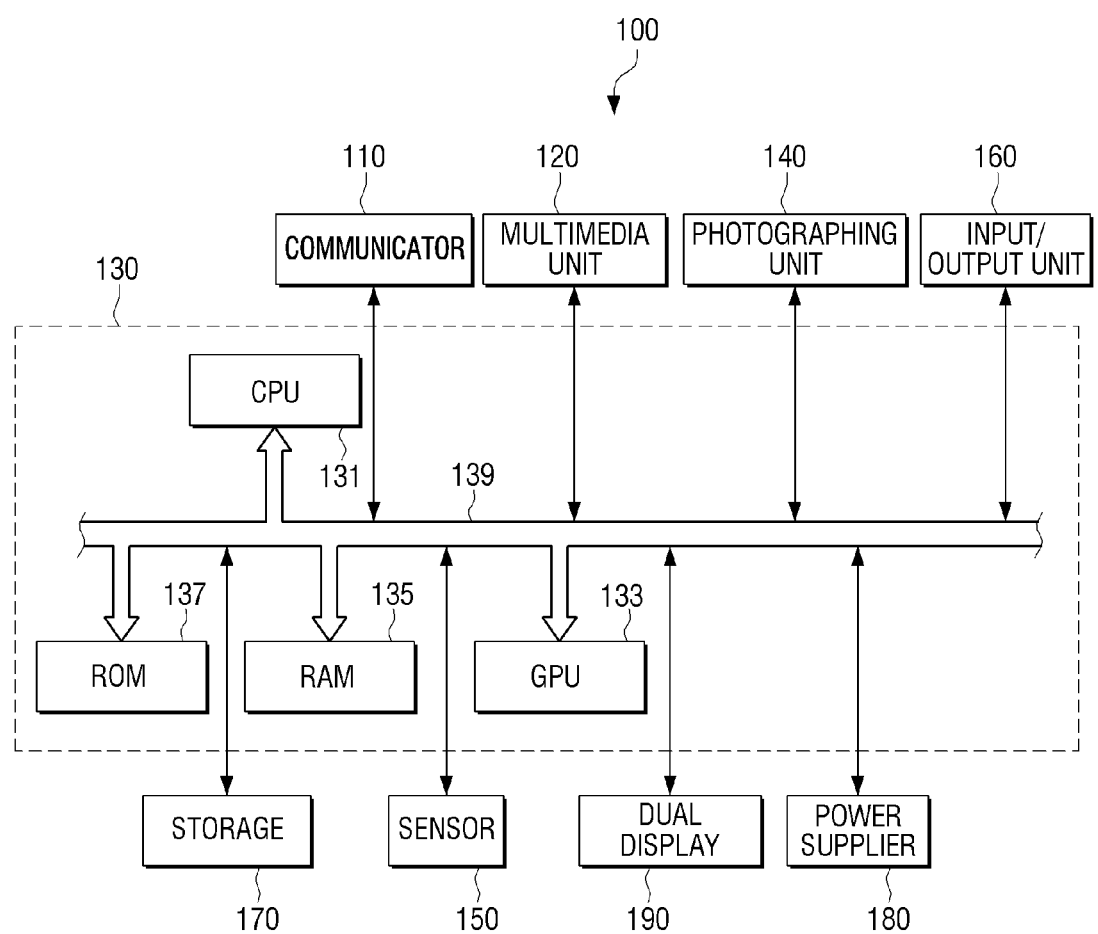
FIG. 40 is a detailed block diagram illustrating an example of a configuration of the controller as illustrated in FIG. 39.

The storage 170 may be a storage medium which may be provided separately with, for example, a read-only memory (ROM) 135 and a random-access memory (RAM) 137 which may be provided in the controller 130 (see FIG. 40). The storage 170 may be implemented, for example, with a hard disk drive (HDD), a solid state drive (SSD), a flash memory, a universal serial bus (USB), or the like.

When an interval angle θ (see FIG. 3) between the first body 191a and the second body 191b satisfies predetermined conditions, the controller 130 may perform an operation corresponding to the folding gesture that uses the rotating body and control operation information corresponding to the rotating direction.

The predetermined conditions may be, for example, a change in size of the interval angle and a valid (duration) time of the interval angle.

For example, in the folding and flat gesture, which is an example of the folding gesture, when the size of the interval angle θ changes from 180 degrees to 150 degrees (e.g. the range of 145 to 155 degrees) and when the valid time of the interval angle θ taken to return to 180 degrees is, for example, within 0.5 seconds, it may be determined that the predetermined conditions are satisfied.

On the other hand, another example of the folding gesture is the folding and hold gesture. In the folding and hold gesture, when the size of the interval angle θ changes from 180 degrees to 150 degrees (e.g. the range of 145 to 155 degrees) and when a predetermined duration time (e.g. 0.5 seconds) has elapsed at 150 degrees, it may be determined that the predetermined conditions are satisfied.

The change in size of the interval angle θ, which may be one of the predetermined conditions, for example, changing from 180 degrees to 150 degrees or from 180 degrees to 120 degrees, may be distinguished, and a corresponding control operation may be matched thereto.

For convenience of description, in an initialization state of operation, the interval angle θ has been described as 180 degrees, but is not limited thereto. The predetermined conditions may be preset by a manufacturer or may be designated by the user.

According to a an exemplary embodiment from among the diverse exemplary embodiments of the present inventive concept, the controller 130 may change a screen displayed on a display of the rotating body or the other body, and may display a UI corresponding to a folding gesture at an area of the screen. In this case, the existing screen may be pushed in one direction, a new area of the screen may become open, and the UI may be displayed on the new open area of the screen. Alternatively, the UI may be overlapped on the existing screen.

The size, the display position, and the shape of the UI may be arbitrarily adjusted by the user.

For example, when a manipulation to drag the UI is input, the controller 130 may expand or reduce the UI according to a dragging direction. For example, let's suppose that the UI is displayed on an edge area far from the hinge 185. When the UI is dragged toward the hinge 185, the UI may be expanded according to the dragging. In this case, when the dragging continues over the hinge 185 to the other display, the UI may be expanded to the other display. Expanding or reducing the UI by dragging may be performed by touching any point on the UI or by touching only a predetermined area of the UI. For example, a mark may be displayed on an edge area of the UI, and when the mark is touched and dragged, the UI may be expanded or reduced according to the dragging direction.

In addition, when a manipulation to drag the UI is input, the controller 130 may adjust, for example, the position or the shape of the UI according to the dragging direction. That is, the UI, which may be displayed on a left edge area of the screen of the first display 190a, may be moved, for example, to a right edge area of the screen of the first display 190a, or may be moved to an upper or lower edge area.

In addition, when the controller 130 senses rotation of the multi-display apparatus 100, the controller 130 may change an arrangement direction of the objects in the UI according to the rotating direction.

The objects may indicate, for example, text, images, and icons included in the UI.

In addition, when the multi-display apparatus 100 is rotated, the controller 130 may change the display position of the new display area according to the rotating direction.

The type of the UI may vary according to the exemplary embodiments of the present inventive concept. For example, diverse UIs such as, for example, a clipboard UI, an application configuration UI, a quick launcher UI, a configuration UI of the multi-display apparatus 100, an option setting UI, a web browser screen UI, a content playback UI, and/or a widget displaying UI may be displayed.

The UI may vary according to which body is rotated and according to which direction the body is rotated.

Diverse exemplary embodiments of the present inventive concept related to a control operation of the multi-display apparatus 100 are described here.

Figure 2:
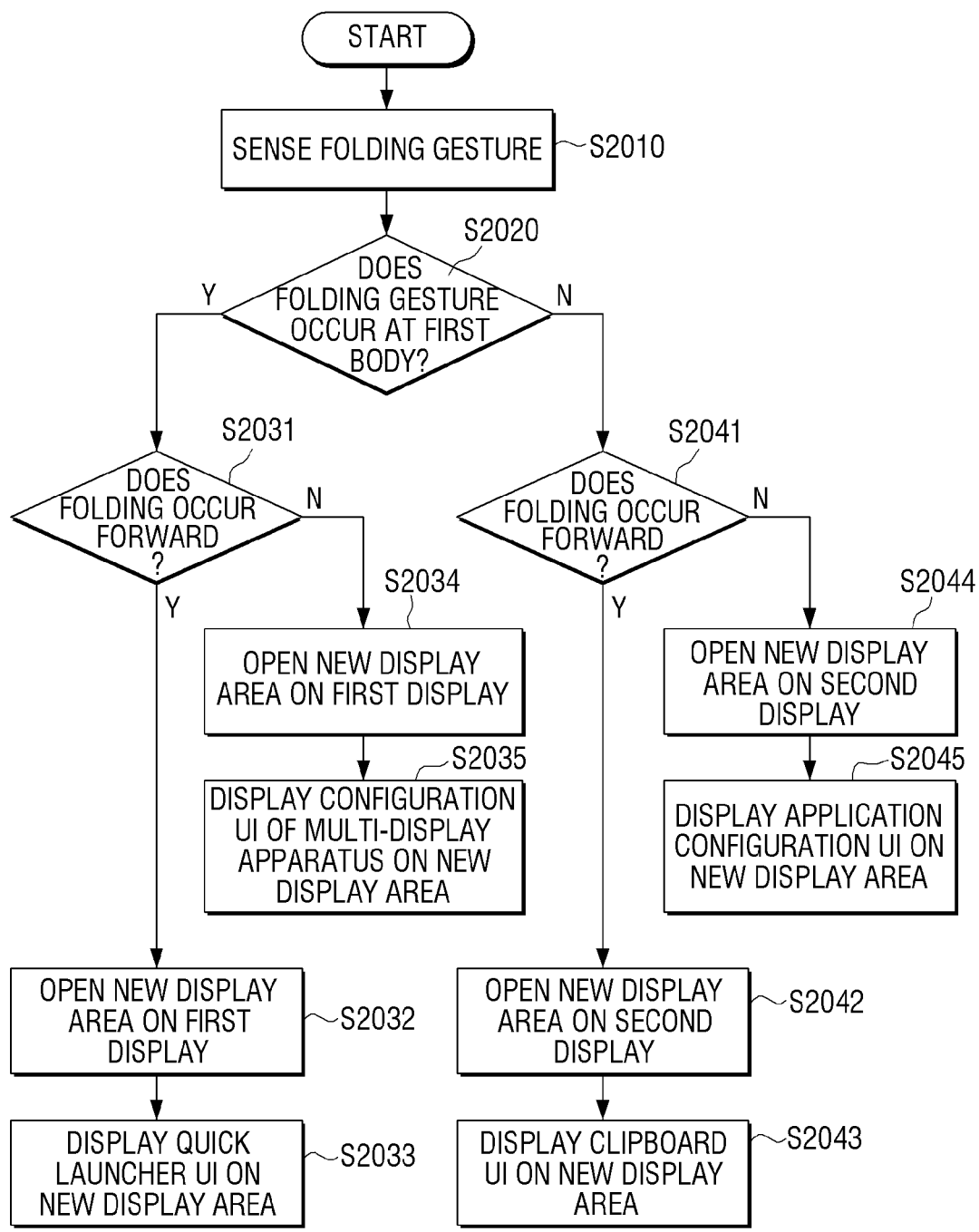
FIG. 2 is a flow chart illustrating operation of providing a user interface that corresponds to a folding gesture according to an exemplary embodiment of the present inventive concept.

FIG. 2 is a flow chart illustrating an operation of providing a user interface that corresponds to a folding gesture according to an exemplary embodiment of the present inventive concept.

More specifically, FIG. 2 illustrates an exemplary embodiment of the present inventive concept of selectively providing a plurality of UIs according to a type of the folding gesture of the multi-display apparatus 100.

With reference to FIG. 2, the multi-display apparatus 100 may sense the user's folding gesture using the sensor 150. More specifically, the multi-display apparatus 100 may sense the user's folding gesture in operation S2010, and may determine which body among the first body 191a and the second body 191b rotates in which direction.

For the determination, the first body 191a and the second body 191b each may include a rotation sensor such as, for example, the geomagnetic sensor 152, the acceleration sensor 153, and/or a gyro sensor (see FIG. 39). That is, when the pitch angle or the roll angle of the first body 191a changes, the multi-display apparatus 100 may determine that the first body 191a rotates, and when the pitch angle or the roll angle of the second body changes, the multi-display apparatus 100 may determine that the second body 191b rotates. In addition, the multi-display apparatus 100 may determine how many degrees the first or second body 191a or 191b rotates in which direction.

In addition, the multi-display apparatus 100 may determine which body rotates by monitoring a change in a contact point between the hinge 185 and the bodies 191a and 191b. For example, a light emitting diode (LED) (not illustrated) may be provided on each body 191a and 191b at a portion where each body 191a and 191b and the hinge 185 are in contact, and a photo diode array (not illustrated) may be provided on the hinge 185. In this case, the controller 130 may identify a light receiving point of the photo diode array and may determine how much each body 191a and 191b rotates in which direction. The rotating direction may be, for example, a forward or a backward direction. In an exemplary embodiment of the present inventive concept, the forward direction may indicate a front direction of the first or second display 190a or 190b, and the backward direction may indicate a rear direction of the first or second display 190a or 190b.

As a result of a determination, when the folding gesture occurs at the first body 191a in operation S2020-Y, and when the folding gesture occurs forward in operation S2031-Y, the multi-display apparatus 100 may open a new display area on the first display 191a in operation S2032. The new display area may indicate an area of the screen provided to display a UI among the entire area of the screen displayed on the first display 191a. For convenience of description, an area of the screen to display a UI may be referred to hereinbelow as the new display area.

In operation S2033, the multi-display apparatus 100 may display a quick launcher UI on the open new display area. The quick launcher UI may be a UI that displays icons, images, and/or text configured to directly executing diverse applications.

In addition, as a result of a determination in operation S2020, when the folding gesture occurs at the first body 191a in operation S2020-Y, and when the folding gesture occurs backward in operation S2031-N, the multi-display apparatus 100 may open a new display area on the first display 190a in operation S2034 and may display a configuration UI of the multi-display apparatus 100 on the open new display area in operation S2035. The configuration UI of the multi-display apparatus 100 may be a UI that sets operating environments of the multi-display apparatus 100.

In addition, when the folding gesture occurs at the second body in operation S2020-N, and when the folding gesture occurs forward in operation S2041-Y, the multi-display apparatus 100 may open a new display area on the second display 190b in operation S2042, and may display a clipboard UI on the open new display area in operation S2043. The clipboard UI may be a UI that stores objects copied by a copying (or cutting) command and that calls a copied object when desired.

In addition, as a result of determination in operation S2020, when the folding gesture occurs at the second body in operation S2020-N, and when the folding gesture does not occur forward in operation S2041-N, the multi-display apparatus 100 may open a new display area on the second display 190b in operation S2044, and may display an application configuration UI on the open new display area in operation S2045. The application configuration UI may be a UI that sets operating environments of a running application.

More detailed description of the UIs is provided with reference to FIGS. 3 to 15.

FIGS. 3 to 6 illustrate examples of operations of sensing a folding gesture.

Figure 3:
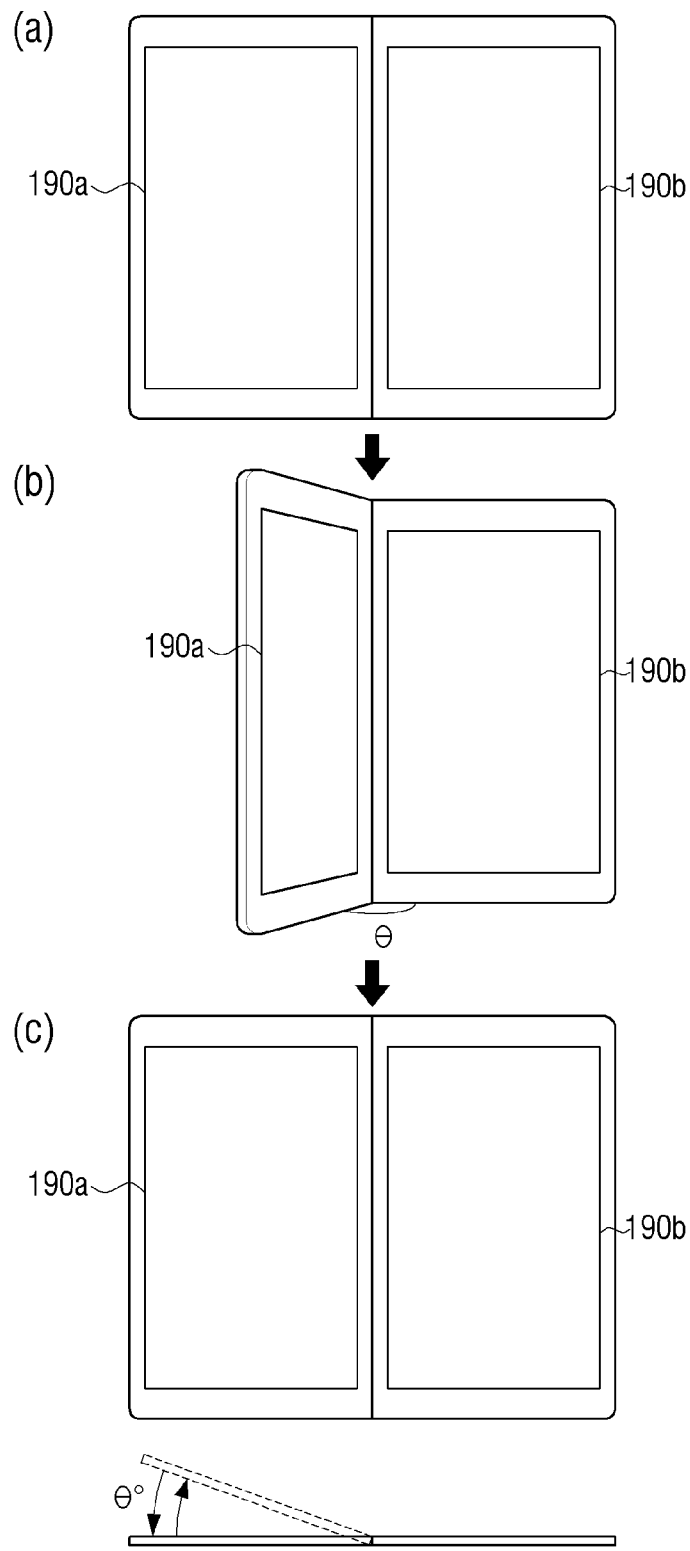

FIG. 3 illustrates an example of an operation of folding the first body 191a forward. As illustrated in a view (a) of FIG. 3, the first body 191a and the second body 191b of the multi-display apparatus 100 in this exemplary embodiment of the present inventive concept may unfold at an interval angle θ of 180 degrees on the basis of the hinge 135. This position may be referred to as an expanding mode. Hereinbelow, all operations may start in the expanding mode, that is, at an interval angle θ of 180 degrees between the first body 191a and the second body 191b on the basis of the hinge 135. However, they are not limited thereto, and the interval angle θ to start the operations may be set diversely by the manufacturer or the user. In other words, when an additional folding gesture occurs at an interval angle θ of 90 degrees, a UI corresponding to the folding gesture may be displayed.

In the state in which the first body 191a and the second body 191b may be unfolded as illustrated in a view (a) of FIG. 3, when the first body 191a, which includes the first display 190a, is folded forward at a predetermined relative angle of θ by the user, as illustrated in a view (b) of FIG. 3, and then returns to an original position within a predetermined time, as illustrated in a view (c) of FIG. 3, the multi-display apparatus 100 may proceed to operation S2031-Y.

Figure 4:
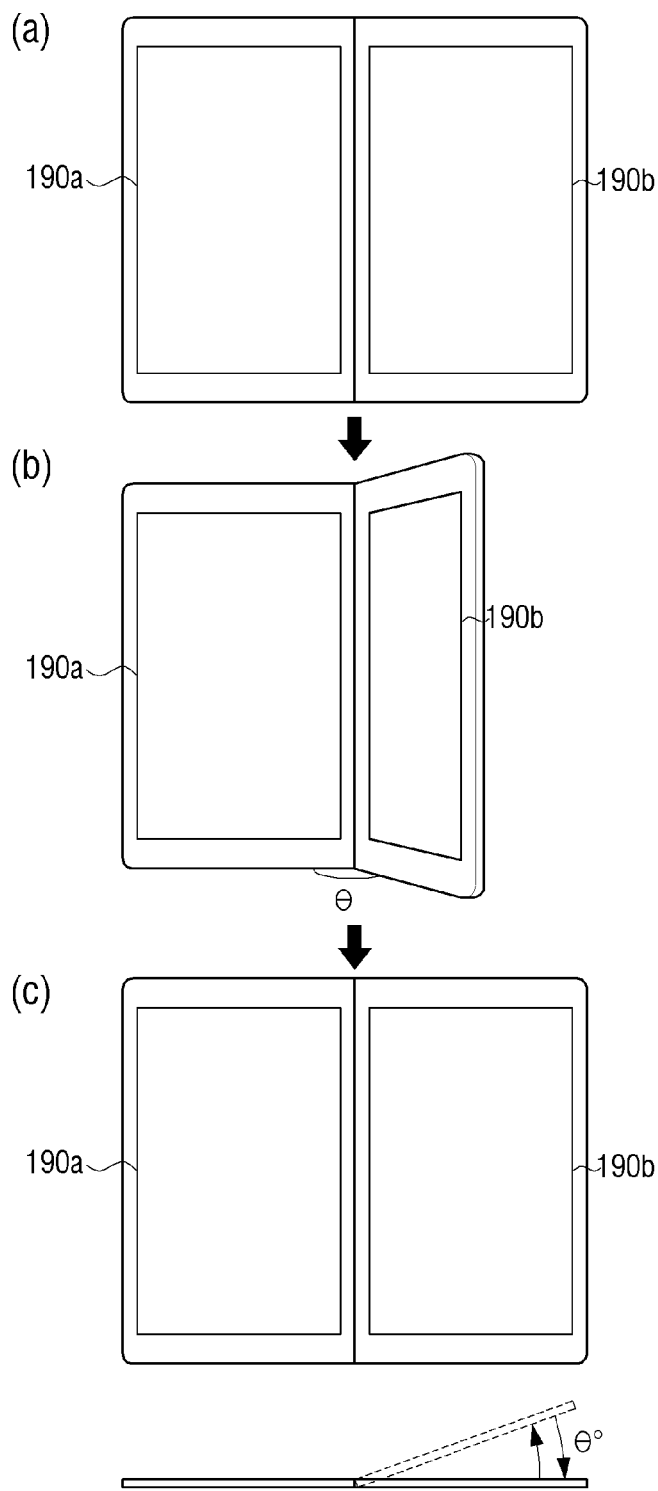

FIG. 4 illustrates an example of operations S2010, S2020, and S2041-Y of FIG. 2 in detail. As illustrated in a view (a) of FIG. 4, when the second body 191b, which includes the second display 190b, is folded forward at a predetermined interval angle θ by the user, as illustrated in a view (b) of FIG. 4, and then returns to the original position within a predetermined time, as illustrated in a view (c) of FIG. 4, the multi-display apparatus 100 may proceed to operation S2041-Y.

Figure 5:
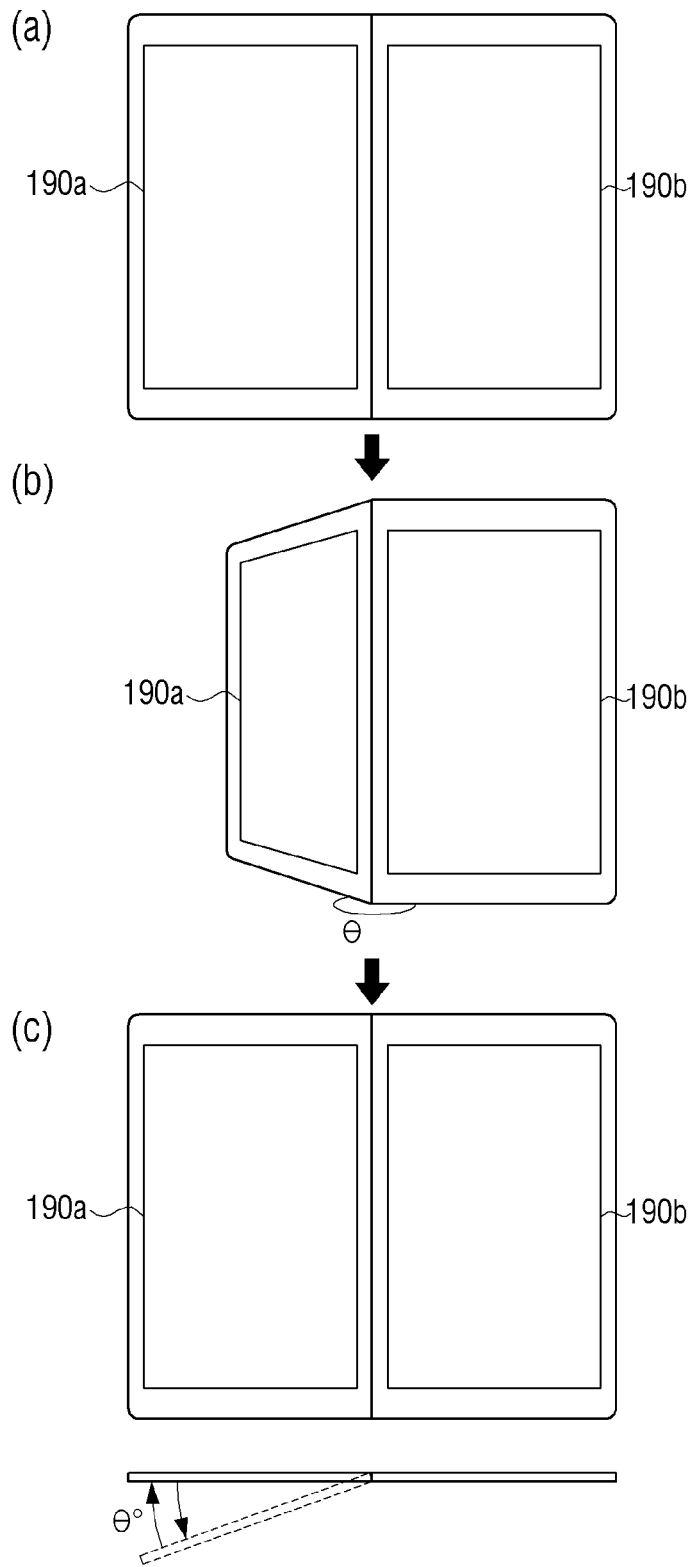
Figure 6:
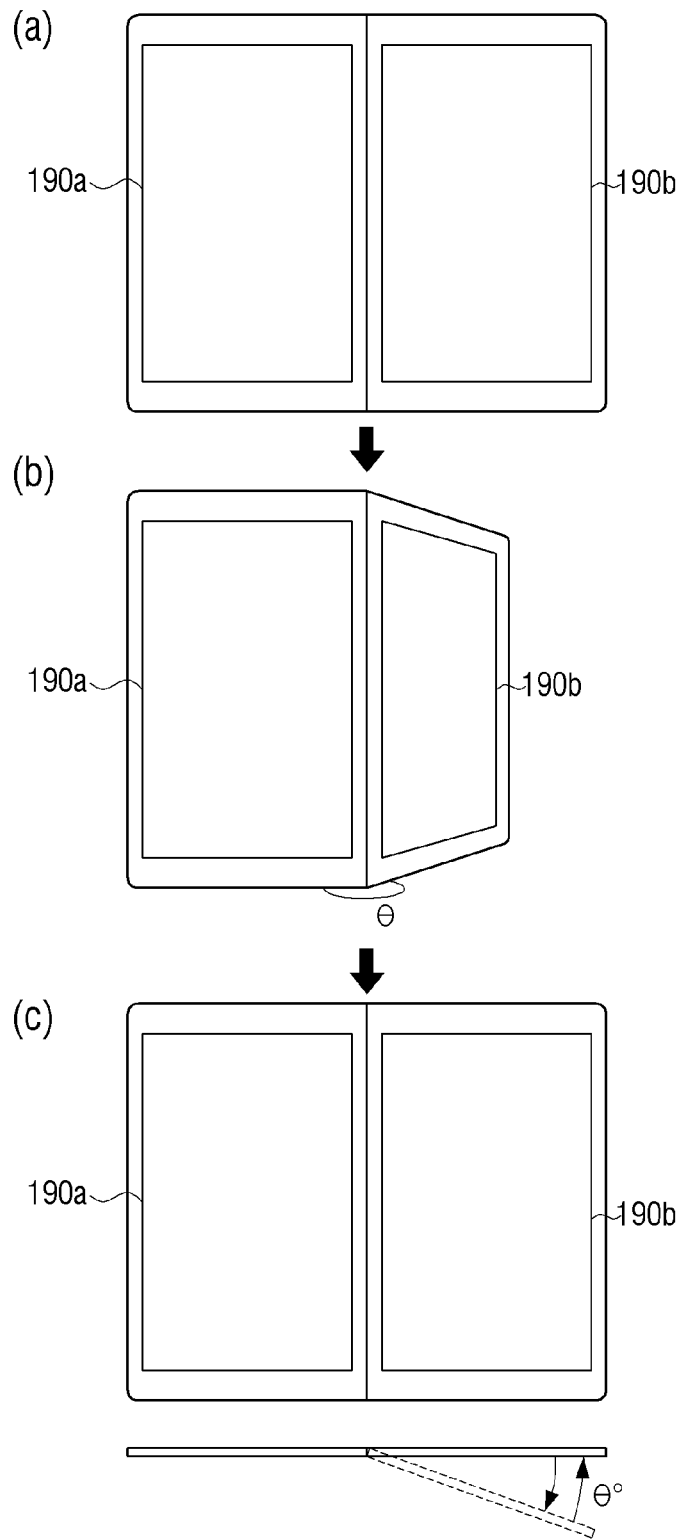

FIGS. 5 and 6 illustrate examples in which the first body 191a and the second body 191b are folded backward at more than a predetermined interval angle of θ and then return to the original position. FIG. 5 illustrates an example of operations S2010, S2020, and S2031-N of FIG. 2 in detail, and FIG. 6 illustrates an example of operations S2010, S2020, and S2041-N of FIG. 2 in detail. FIGS. 3 to 6 illustrate examples of the folding and flat gestures, but are not limited thereto. Other folding gestures, that is, other kinds of folding and flat gestures may be implemented. The folding and flat gesture and the folding and hold gesture are described with reference to FIGS. 16 and 20 in greater detail.

Figure 7:
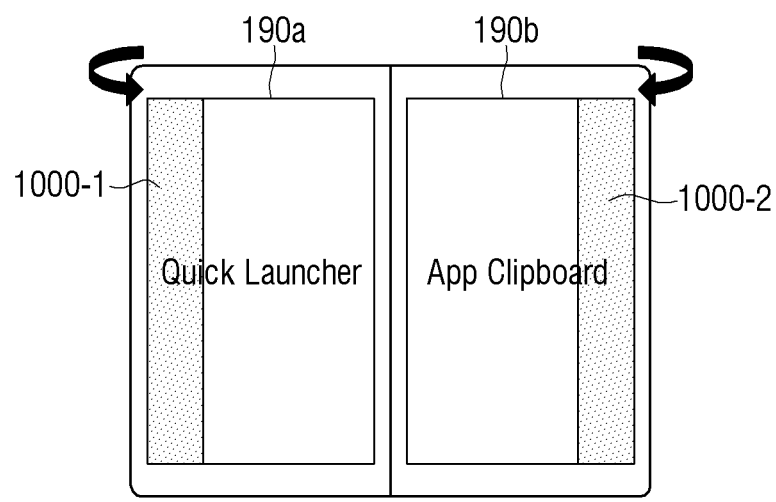
Figure 8:
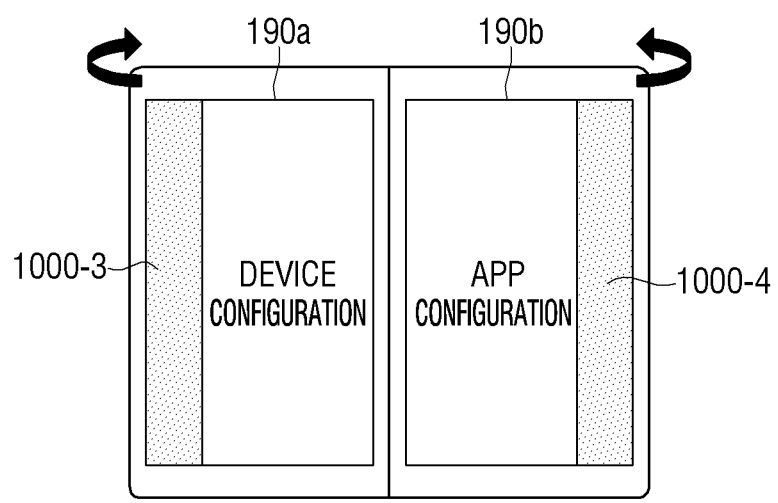

FIGS. 7 and 8 illustrate an example of UIs displayed according to the folding gestures.

When the first body 191a, which includes the first display 190a is folded forward as illustrated in FIG. 7, the multi-display apparatus 100 may display a quick launcher UI 1000-1 at a predetermined area of the screen of the first display 190a.

In addition, when the second body 191b, which includes the second display 190b, is folded forward, the multi-display apparatus 100 may display a clipboard UI 1000-2 at a predetermined area of the screen of the second display 190b.

FIG. 8 illustrates an example of the multi-display apparatus 100 folded backward. When the first body 191a, which includes the first display 190a, is folded backward as illustrated in FIG. 8, the multi-display apparatus 100 may display a device configuration UI 1000-3 of the multi-display apparatus 100 at a predetermined area of the screen of the first display 190a.

In addition, when the second body 191b, which includes the second display 190b, is folded backward, the multi-display apparatus 100 may display an application configuration UI 1000-4 at a predetermined area of the screen of the second display 190b.

In the above description, the displays 190a and 190b of the multi-display apparatus 100 are disposed horizontally, but it may also be possible that the displays 190a and 190b are disposed vertically.

Figure 9:
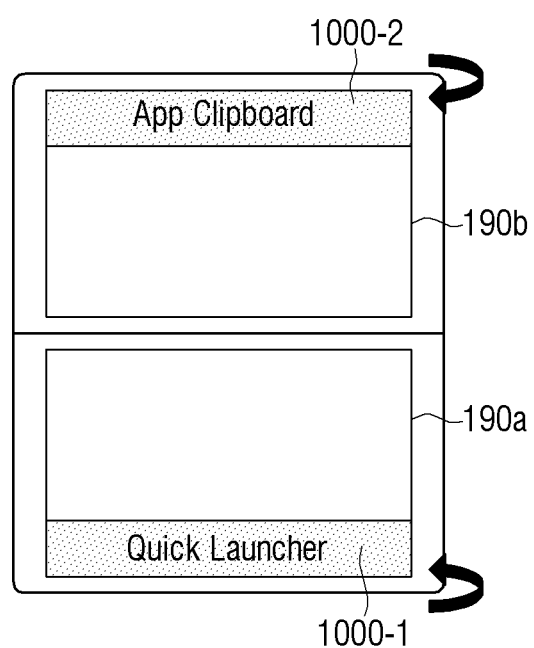
Figure 10:
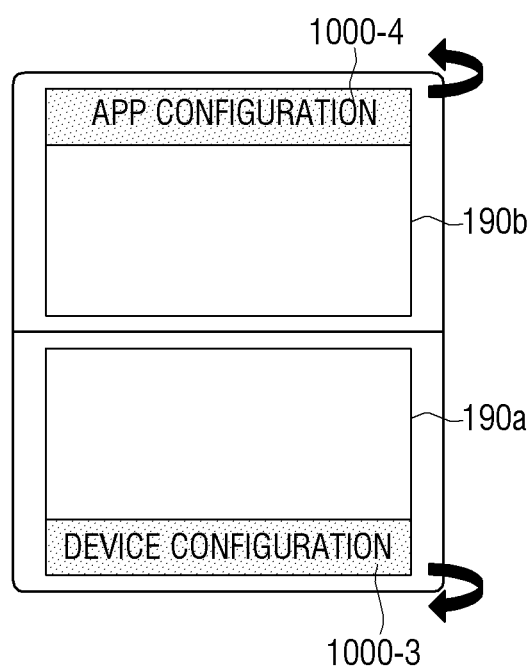

FIGS. 9 and 10 illustrate examples of UI providing operations of the multi-display apparatus 100 in which the displays 190a and 190b are disposed vertically. As illustrated in FIGS. 9 and 10, when the first body 191a or the second body 191b rotates forward or backward, the first body 191a or the second body 191b may display diverse UIs such as, for example, the quick launcher UI 1000-1, the clipboard UI 1000-2, the configuration UI 1000-3 of the multi-display apparatus 100, and/or the application configuration UI 1000-4. Unlike the embodiments of the present inventive concept illustrated in FIGS. 7 and 8, each UI may be displayed, for example, on an upper or a lower edge area of the screen.

In the above exemplary embodiments of the present inventive concept, a UI may be displayed on a display of a rotated body. In contrast, a UI may be displayed on a display of a body that may not be rotated. For example, when the first body 191a is folded backward, the entire screens displayed on the first and second bodies 191a and 191b may move toward the first body 191a as if being pulled by folding and a UI may be displayed on an edge of the second body 191b, which may be farthest from the first body 191a. The UI may not be a pop-up window form, but may be displayed in a form pulled by the folding.

FIGS. 11 to 15 illustrate examples of specific forms of diverse UIs displayed by folding. FIG. 11 illustrates exemplary embodiments of the present inventive concept of configurations of the quick launcher UI 1000-1 and the configuration UI 1000-3 of the multi-display apparatus 100. The quick launcher UI 1000-1 may be a UI that displays icons, images, and/or text configured to directly execute diverse applications as described above. As illustrated in a view (a) of FIG. 11, the quick launcher UI 1000-1 may display applications, such as, for example, a phone, a messenger, a social network service (SNS), a camera, and the like, using icons and/or images. The user may view the quick launcher UI 1000-1 by using a gesture of folding the first body 191a forward without pressing a button (not illustrated) to switch into a home screen or an application selecting screen. In addition, the user may directly select and run an application that the user wishes to use on the quick launcher UI 1000-1.

A view (b) of FIG. 11 illustrates an exemplary embodiment of the present inventive concept of the configuration UI 1000-3 of the multi-display apparatus 100. The configuration UI 1000-3 of the multi-display apparatus 100 may be a UI that sets operating environments of the multi-display apparatus 100 as described above. For example, the configuration UI 1000-3 of the multi-display apparatus 100 may display diverse configuration menus such as display resolution settings, sound settings, network settings, background image settings, and the like, in the form of an icon, an image, and/or a text. While an application is being run, the user may run a configuration menu of the multi-display apparatus 100 by selecting a configuration to set using the configuration UI 1000-3 of the multi-display apparatus 100.

FIGS. 12 to 15 illustrate examples of configuration of the clipboard UI 1000-2 and the application configuration UI 1000-4 that correspond to diverse applications. That is, the clipboard UI 1000-2 and the application configuration UI 1000-4 may be UIs that are displayed when a designated body from among the first body 191a and the second body 191b is rotated in a designated direction as described above. However, contents that may be displayed on the clipboard UI 1000-2 and the application configuration UI 1000-4 may vary according to an application running in the multi-display apparatus 100.

FIG. 12 illustrates examples of configuration of the clipboard UI 1000-2 and the application configuration UI 1000-4 that may be displayed by a folding gesture while a music application is running.

A view (a) of FIG. 12 illustrates an exemplary embodiment of the present inventive concept of the clipboard UI 1000-2 that corresponds to the music application. The clipboard UI 1000-2 may display functions and contents that may occur while the user is listening to music, such as, for example, a music highlight capture, a related music video view, a SNS update, and/or a share of music, a copy of lyrics, and the like.

A view (b) of FIG. 12 illustrates an exemplary embodiment of the present inventive concept of the application configuration UI 1000-4 that corresponds to the music application. The application configuration UI 1000-4 may display functions and contents, such as, for example, equalizer settings, equalizer effect settings, lyric settings, volume settings, and the like.

FIG. 13 illustrates examples of configuration of the clipboard UI 1000-2 and the application configuration UI 1000-4 while an e-book application is running.

As illustrated in a view (a) of FIG. 13, the clipboard UI 1000-2 that corresponds to to the e-book application may display functions and contents that may occur while the user is reading an e-book, such as, for example, a stored information view, a memo, a text capture, and the like. When the user wishes to copy an object such as, for example, a text or an image while reading the e-book, the user may open the clipboard UI 1000-2, copy the object onto the clipboard UI 1000-2, and check the text or the image on the clipboard UI 1000-2 when desire.

A view (b) of FIG. 13 illustrates an exemplary embodiment of the present inventive concept of the application configuration UI 1000-4 that corresponds to the e-book application. The application configuration UI 1000-4 may display setting functions related to reading the e-book, such as, for example, bookshelf settings, character style settings, character size settings, brightness settings, and the like.

FIG. 14 illustrates examples of configuration of the clipboard UI 1000-2 and the application configuration UI 1000-4 while a web browser application is running.

As illustrated in a view (a) of FIG. 14, the clipboard UI 1000-2 that corresponds to the web browser application may display functions and contents, such as, for example, a uniform resource locator (URL) copy, a SNS update of selected text, an image or a video, add a URL to favorites, and the like.

A view (b) of FIG. 14 illustrates an example of the application configuration UI 1000-4 that corresponds to the web browser application. The application configuration UI 1000-4 may display setting functions desired to run the web browser, such as, for example, search and transfer history deleting settings, homepage settings, data management settings, security settings, and the like.

FIG. 15 illustrates examples of configuration of the clipboard UI 1000-2 and the application configuration UI 1000-4 while a video application is running.

As shown in a view (a) of FIG. 15, the clipboard UI 1000-2 that corresponds to the video application may display functions and contents that may occur while the user is viewing video, such as, for example, a SNS update of the video, a video highlight capture, and the like.

A view (b) of FIG. 15 illustrates an example of the application configuration UI 1000-4 that corresponds to the video application. The application configuration UI 1000-4 may display setting functions desired to view video, such as volume settings, image quality settings, screen mode settings, and the like.

Figure 16:
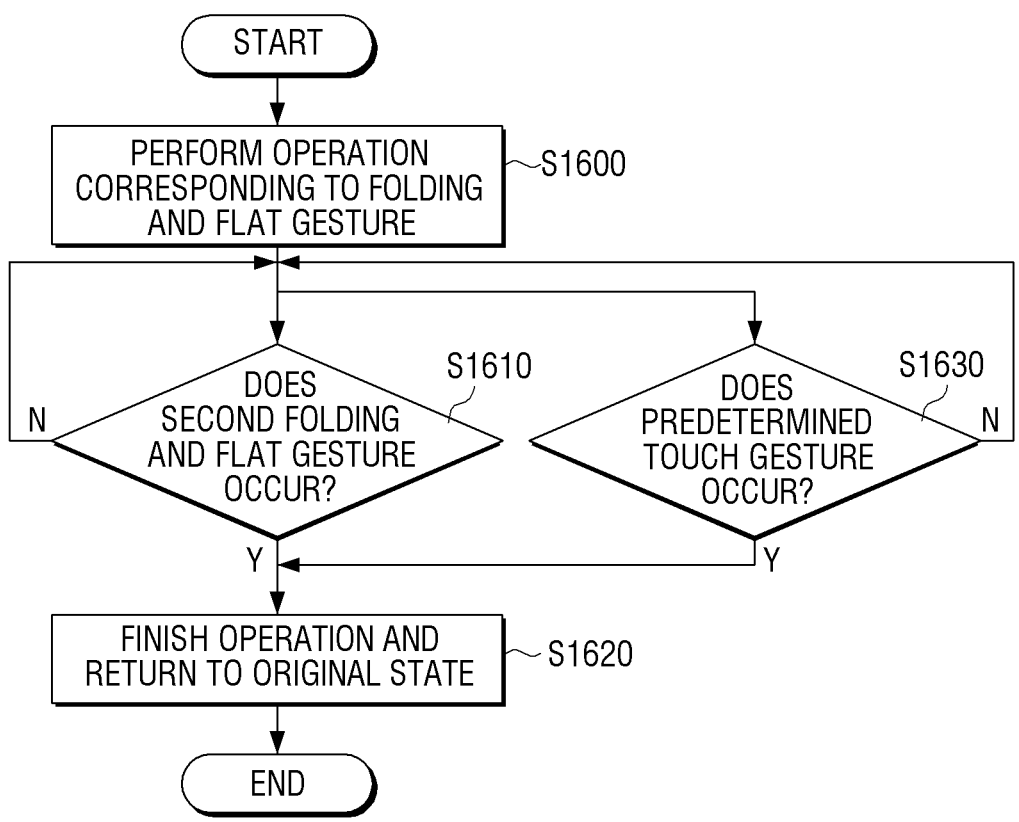
FIG. 16 is a flow chart illustrating operation that corresponds to a folding and flat gesture according to an exemplary embodiment of the present inventive concept.

FIG. 16 is a flow chart that illustrates an operation that corresponds to a folding and flat gesture according to an exemplary embodiment of the present inventive concept.

The folding and flat gesture may be a gesture in which the first body 191a or the second body 191b may be folded by rotating on the hinge 185 in a first direction and may become flat by rotating in a second direction opposite to the first direction within a predetermined time.

The predetermined time may be the same as or similar to the valid time, which has been described above with reference to the controller 130 of FIG. 1.

With reference to FIG. 16, when a folding and flat gesture occurs and when an interval angle $\theta$ between the first body 191a and the second body 191b satisfies predetermined conditions, a corresponding operation may be performed in operation S1600. The corresponding operation may include UI providing operations as described with reference to FIGS. 2 to 15, but is not limited thereto. That is, the corresponding operation may be diverse control operations of the multi-display apparatus 100.

During operation S1600, when an additional folding and flat gesture occurs in operation S1610-Y, the multi-display apparatus 100 may finish the corresponding operation and may return to its former state prior to operation S1600 in operation S1620. For convenience of description, the former folding and flat gesture may be referred to as a first folding and flat gesture, and the latter folding and flat gesture may be referred to as a second folding and flat gesture.

In addition, during operation S1600, when a predetermined touch gesture occurs in operation S1630-Y, the multi-display apparatus 100 may finish the corresponding operation and may return to its former state prior to operation S1600 in operation S1620.

The predetermined touch gesture may be a touch gesture that may be set to finish the provided UI, which is described below in greater detail.

Figure 17:
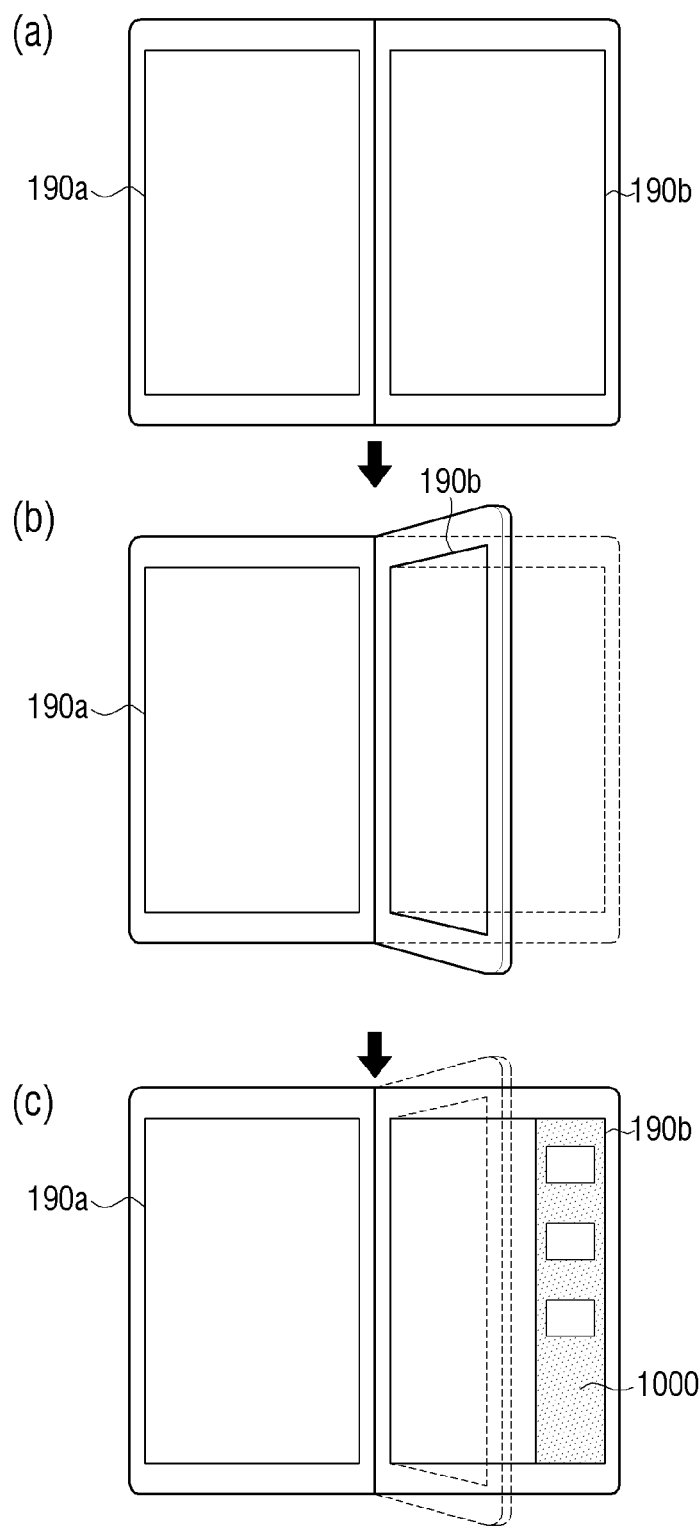
FIGS. 17 to 19 illustrate examples of an operation that corresponds to a folding and flat gesture as illustrated in FIG. 16.
Figure 18:
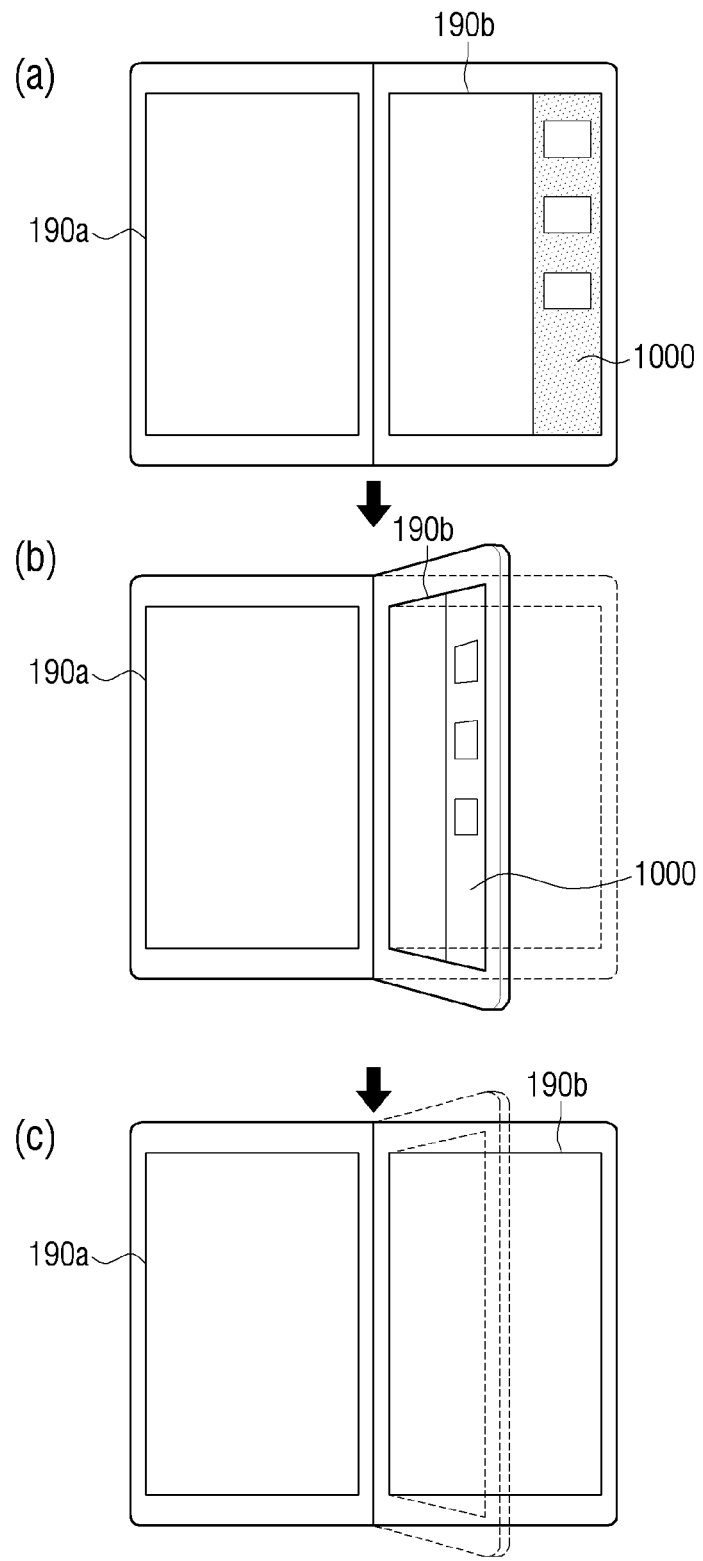
Figure 19:
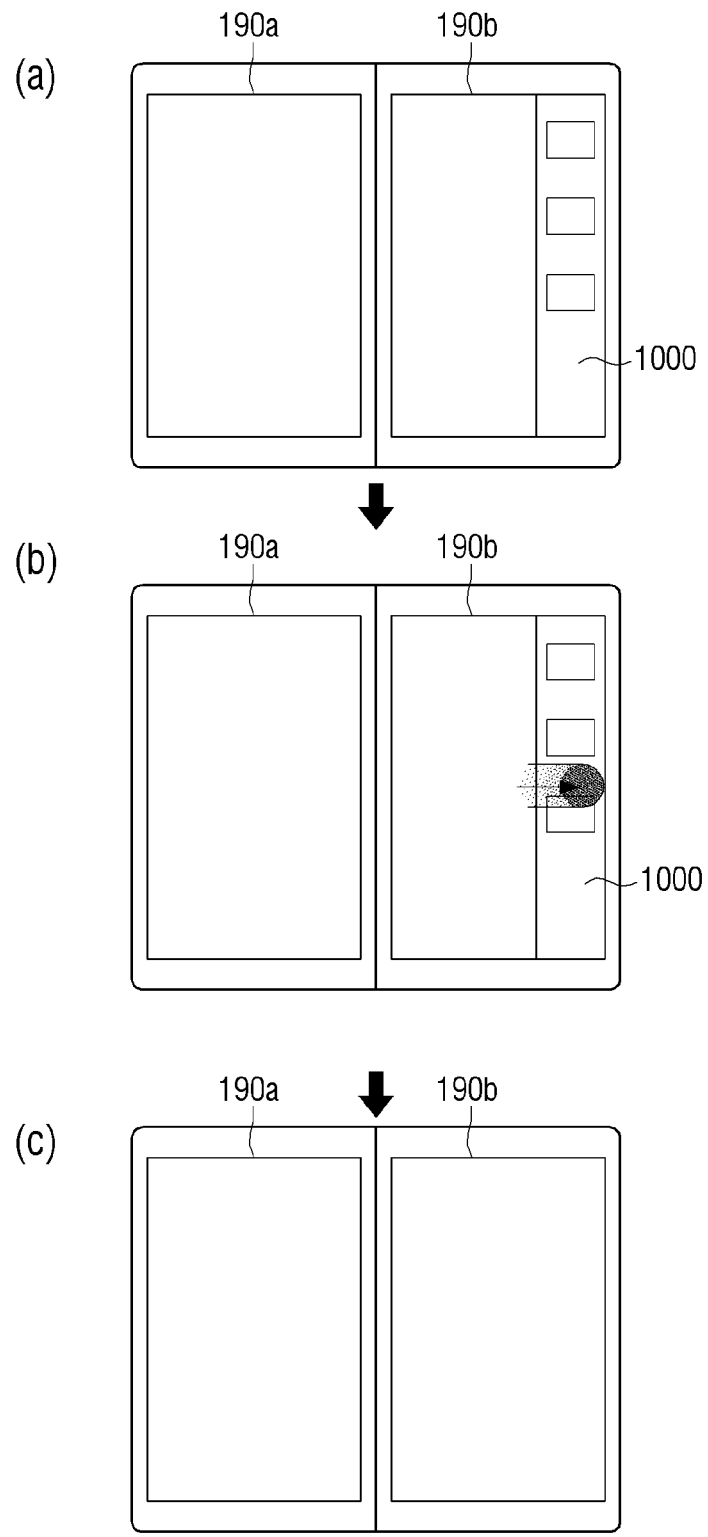

FIGS. 17 to 19 illustrate examples of an operation that corresponds to a folding and flat gesture as illustrated in FIG. 16.

FIG. 17 illustrates an example of operation S1600 of FIG. 16. When the multi-display apparatus 100 is in the expanding mode, that is, at an interval angle $\theta$ of 180 degrees as illustrated in a view (a) of FIG. 17, is rotated to a predetermined interval angle $\theta$ (e.g. 150 degrees), as illustrated in a view (b) of FIG. 17, and returns to an interval angle $\theta$ of 180 degrees within a predetermined valid time (e.g. 0.5 seconds), the multi-display apparatus 100 may determine that a folding and flat gesture is input, and may perform a corresponding operation.

A view (c) of FIG. 17 illustrates an example of the corresponding operation of opening a new display area on the second display 190b and providing a clipboard UI 1000.

The UI may be deleted by the user's folding gesture or touch gesture.

FIG. 18 illustrates an example of a method of deleting a UI using a folding gesture.

A view (a) of FIG. 18 illustrates an example of an operation that corresponds to a first folding and flat gesture running. As illustrated in a view (a) of FIG. 18, when a second folding and flat gesture, which may be the same as or similar to the first folding and flat gesture, occurs, as illustrated in a view (b) of FIG. 18, the multi-display apparatus 100 may delete the UI 1000 and may finish the running operation that corresponds to the first folding and flat gesture, as illustrated in a view (c) of FIG. 18.

FIG. 19 illustrates an example of a touch gesture to delete a UI. When a UI 1000 is displayed as illustrated in a view (a) of FIG. 19, the user may touch and drag the UI 1000 toward an edge as illustrated in a view (b) of FIG. 19. Consequently, the UI 1000 may disappear as if being pushed toward the edge, and the multi-display apparatus 100 may return to the screen without the UI 1000 as illustrated in a view (c) of FIG. 19.

Figure 20:
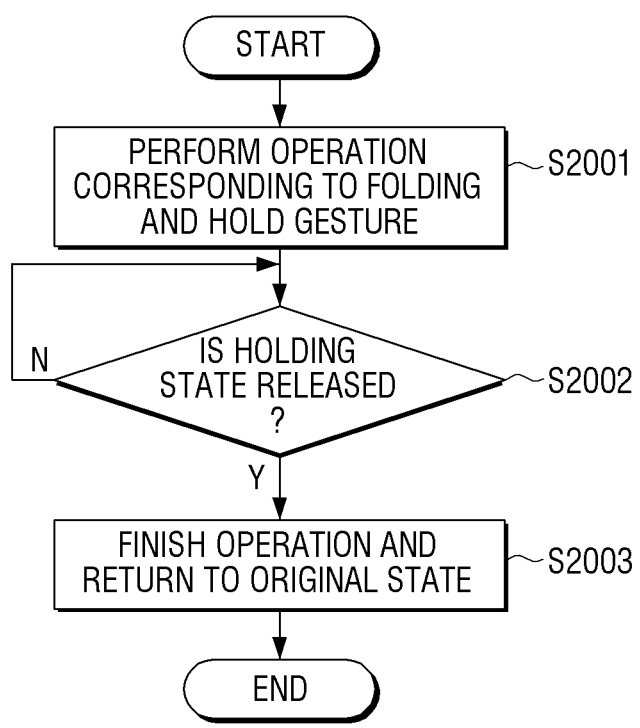
FIG. 20 is a flow chart illustrating operation that corresponds to a folding and hold gesture according to an exemplary embodiment of the present inventive concept.

FIG. 20 is a flow chart illustrating an operation that corresponds to a folding and hold gesture according to an exemplary embodiment of the present inventive concept.

The folding and hold gesture of the folding gesture may be a gesture in which the first body 191a or the second body 191b may be folded by rotating on the hinge 185 in a first direction and maintaining this position during a predetermined time.

The predetermined time may be the same as or similar to the valid time, which has been described above with reference to the controller 130 of FIG. 1.

With reference to FIG. 20, when a folding and hold gesture occurs and when an interval angle $\theta$ between the first body 191a and the second body 191b satisfies predetermined conditions, a corresponding operation may be performed in operation S2001. The corresponding operation may include UI providing operations as described with reference to FIGS. 2 to 15, but is not limited thereto. That is, the corresponding operation may be diverse control operations of the multi-display apparatus 100.

During operation S2001, when the holding state is released in operation S2002-Y, the multi-display apparatus 100 may finish the corresponding operation and may return to its former state prior to operation S2001 in operation S2003.

Figure 21:
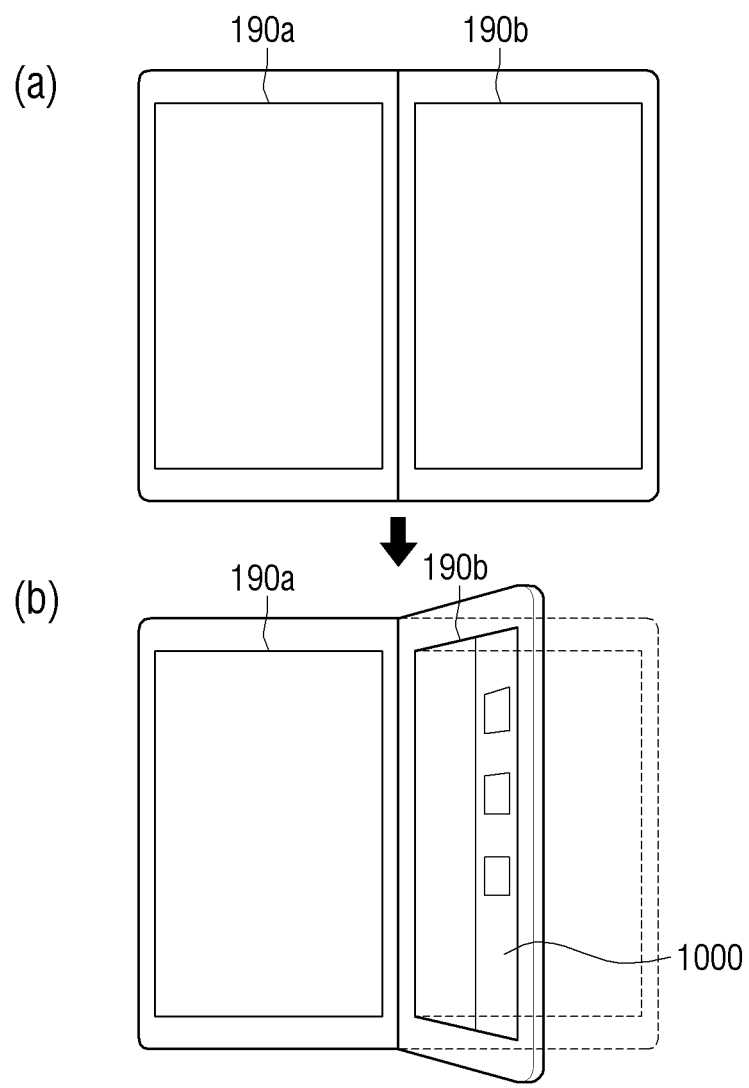
FIGS. 21 to 22 illustrate examples of an operation that corresponds to a folding and hold gesture as illustrated in FIG. 20.
Figure 22:
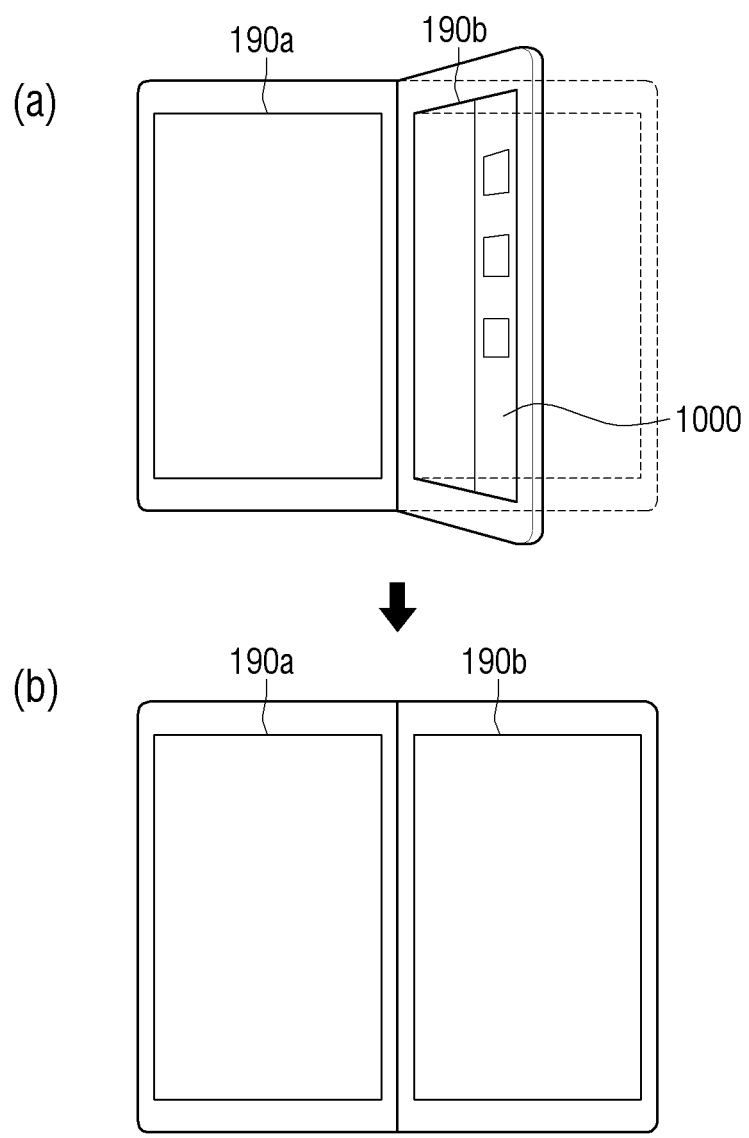

FIGS. 21 to 22 illustrate examples of an operation that corresponds to a folding and hold gesture as illustrated in FIG. 20. FIG. 21 illustrates an example of operation S2001 of FIG. 20 in greater detail. If the multi-display apparatus 100 is in the expanding mode, that is, at an interval angle θ of 180 degrees as illustrated in a view (a) of FIG. 21, when a folding and hold gesture occurs in which the second body 191b is rotated toward at a predetermined interval angle θ (e.g. 150 degrees) as illustrated in a view (b) of FIG. 21 and maintains its position, the multi-display apparatus 100 may display a UI 1000 that corresponds to the folding and flat gesture. A view (b) of FIG. 21 illustrates that the UI 1000 may be displayed at a predetermined area of the screen of the second body 191b.

FIG. 22 illustrates an example of a process of finishing the holding state. When the holding state finishes so that the first body 191a and the second body 191b become flat, as illustrated in FIG. 22, the UI 1000 may be deleted automatically. That is, while using the multi-display apparatus 100, the user may check a UI 1000 that the user wants by folding the multi-display apparatus 100, and then may return to the former screen by unfolding the multi-display apparatus 100.

Figure 23:
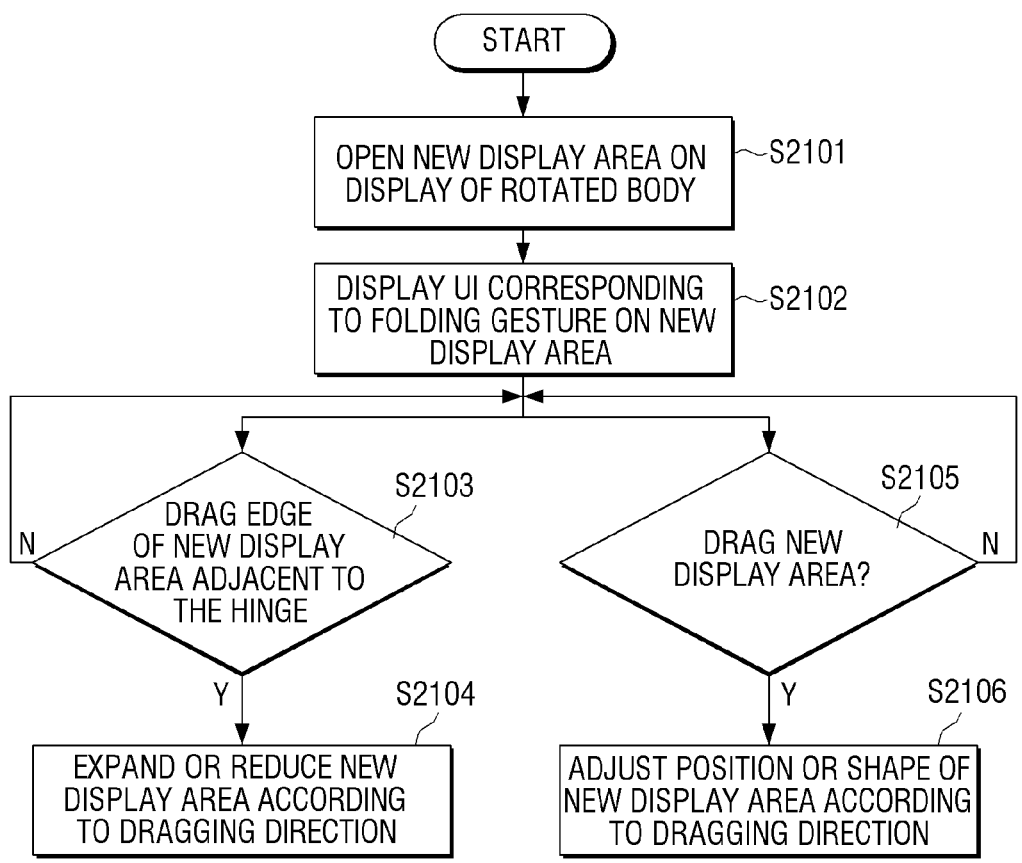
FIG. 23 is a flow chart illustrating operation of expanding or reducing a new display area according to an exemplary embodiment of the present inventive concept.

FIG. 23 is a flow chart illustrating an operation of expanding or reducing a new display area according to an exemplary embodiment of the present inventive concept. FIG. 23 is a flow chart that illustrates an example of an operation of changing a UI according to an exemplary embodiment of the present invention.

With reference to FIG. 23, when a folding gesture is input to the multi-display apparatus 100 and the predetermined conditions are satisfied as described above, a new display area may be opened on a display of a rotated body in operation S2101.

In operation S2102, the open new display area may display a UI that corresponds to the folding gesture using control operation information that corresponds to the rotated body and the rotating direction.

In this case, when a touch gesture to drag an edge of the new display area, which may be adjacent to the hinge 185, occurs in operation S2103-Y, the new display area may be expanded or reduced according to the dragging direction in operation S2104. On the other hand, when a touch gesture to drag the new display area occurs in operation S2105-Y, the position or the shape of the new display area may be adjusted according to the dragging direction in operation S2106. For example, the display position of the UI may be moved to an upper edge, a lower edge, a left edge or a right edge or a center of the screen, or the shape of the UI may be modified from a quadrangle to a circle, a triangle, or another shape.

In FIG. 23, when an edge, which may be adjacent to the hinge 185, is dragged, the size of the UI may be changed, and when a portion of the UI is touched and dragged, the display position or shape of the UI may be changed. However, these operations may be implemented differently according to exemplary embodiments of the present inventive concept. For example, when a portion of the UI is touched and dragged, the UI may be expanded or reduced according to the dragging direction. In addition, for example, when the portion of the UI is touched and flicked, the display position or shape of the UI may be changed according to the flick.

FIGS. 24 to 27 illustrate examples of an operation of expanding or reducing a new display area and/or a UI as illustrated in FIG. 23.

Figure 24:
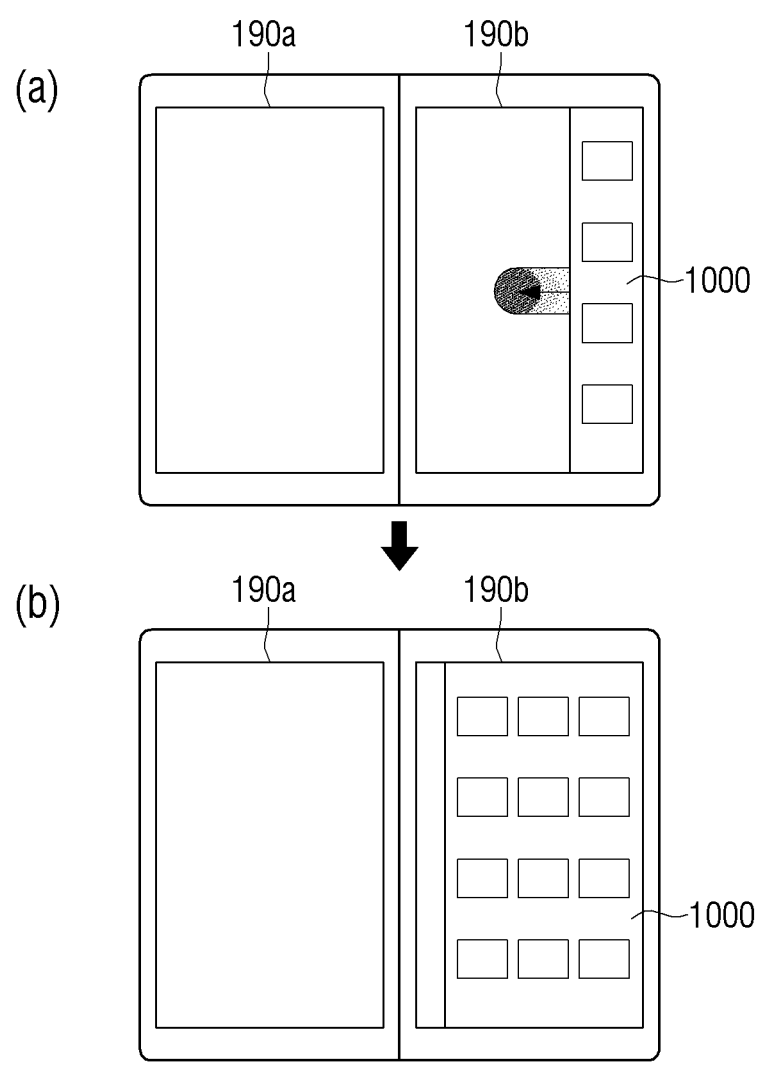
FIGS. 24 to 27 illustrate examples of an operation of expanding or reducing a new display area as illustrated in FIG. 23.

With reference to a view (a) of FIG. 24, a UI 1000 that corresponds to a folding gesture may be displayed on the second display 190b. When a touch gesture to drag the UI 1000 toward the hinge 185 occurs, the UI 1000 may be expanded in the dragging direction as illustrated in a view (b) of FIG. 24. As the UI 1000 is expanded, a growing number of contents (icons or images), which may constitute the UI 1000, may be displayed at the expanded area.

Figure 25:
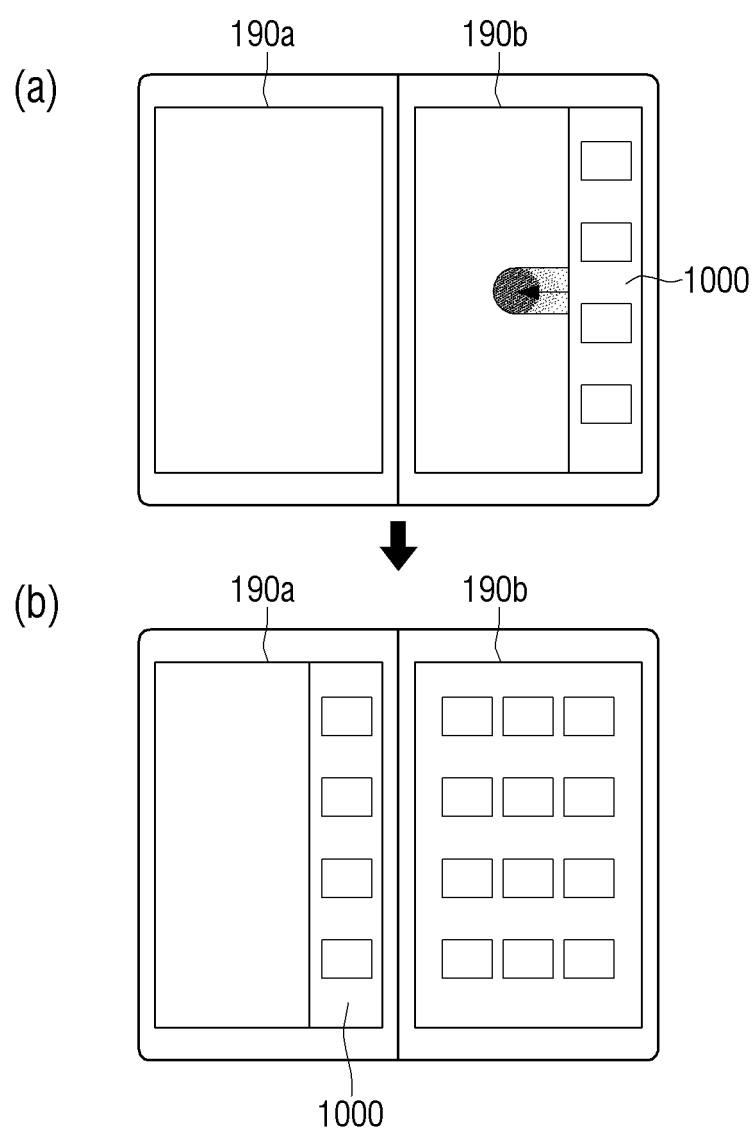

FIG. 25 illustrates an example in which a touch gesture may not finish on the second display 190b, but may continue beyond the hinge 185. That is, when a touch gesture begins on the second display 190b and finishes on the first display 190a as illustrated in a view (a) of FIG. 25, the UI 1000 may be expanded to the first display 190a as illustrated in a view (b) of FIG. 25.

Figure 26:
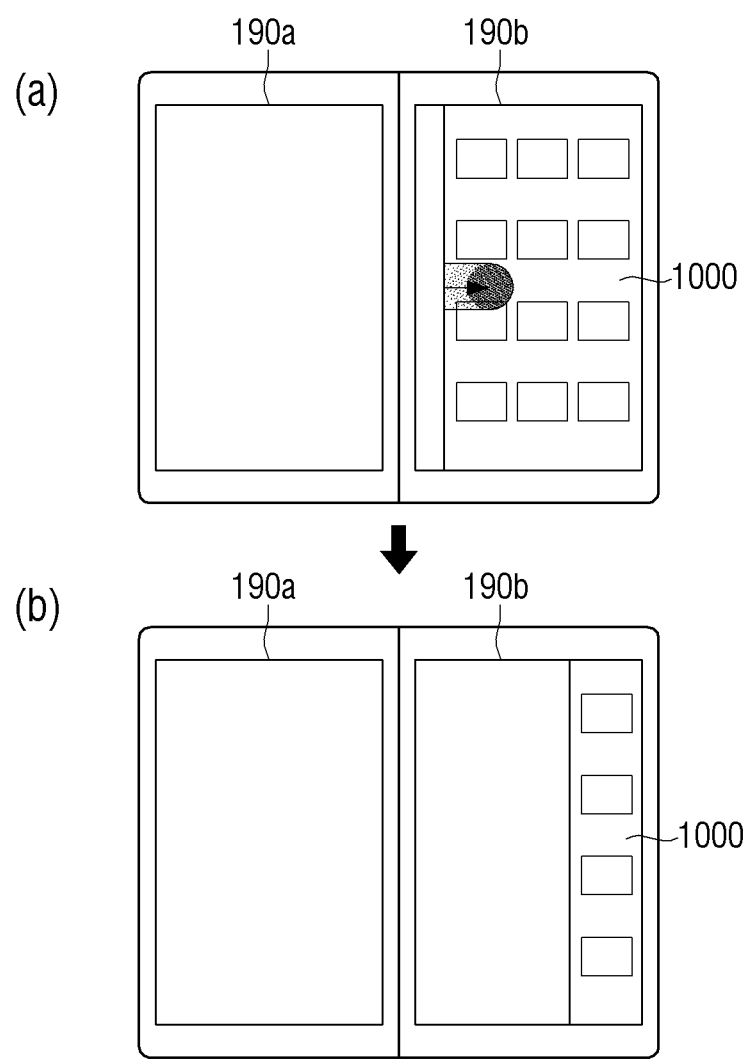

FIG. 26 illustrates an example of an operation of reducing a UI. When a touch gesture to drag an edge of the UI 1000, which may be adjacent to the hinge 195, in the direction opposite to the hinge 185 occurs as illustrated in a view (a) of FIG. 26, the UI 1000 may be reduced as illustrated in a view (b) of FIG. 26. Accordingly, the number of contents (icons or images) displayed on the UI 1000 may be reduced appropriately for the reduced area.

Figure 27:
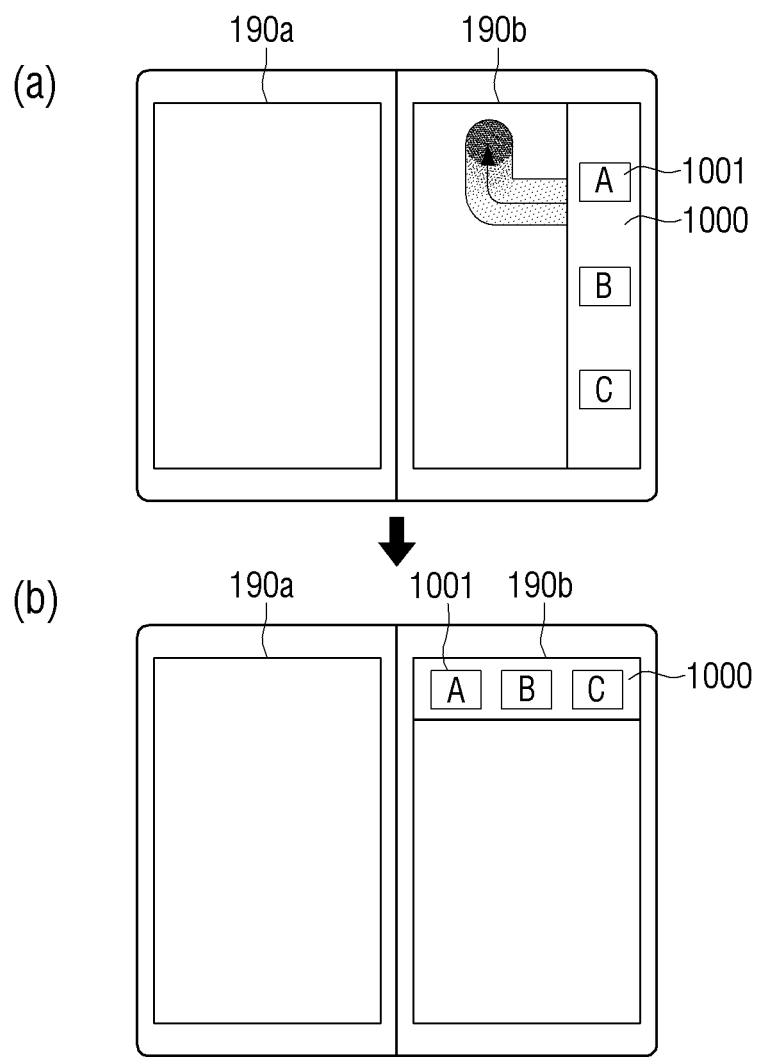

FIG. 27 illustrates an example of an operation of changing the display position of a UI. In the state that the UI 1000 is displayed on the second display 190b as illustrated in a view (a) of FIG. 27, when a touch gesture to touch and drag a point on the UI 1000 to another point occurs, the position and the shape of the UI 1000 may be adjusted as illustrated in a view (b) of FIG. 27 according to the dragging direction.

As the position and the shape of the UI 1000 is changed, the multi-display apparatus 100 may display contents (icons or images) that constitute the UI 1000 in the changed area in order for the user to intuitively identify the contents.

The position and the shape of the UI 1000 may be changed by rotation of the multi-display apparatus 100 as well as the user's touch or dragging.

Figure 28:
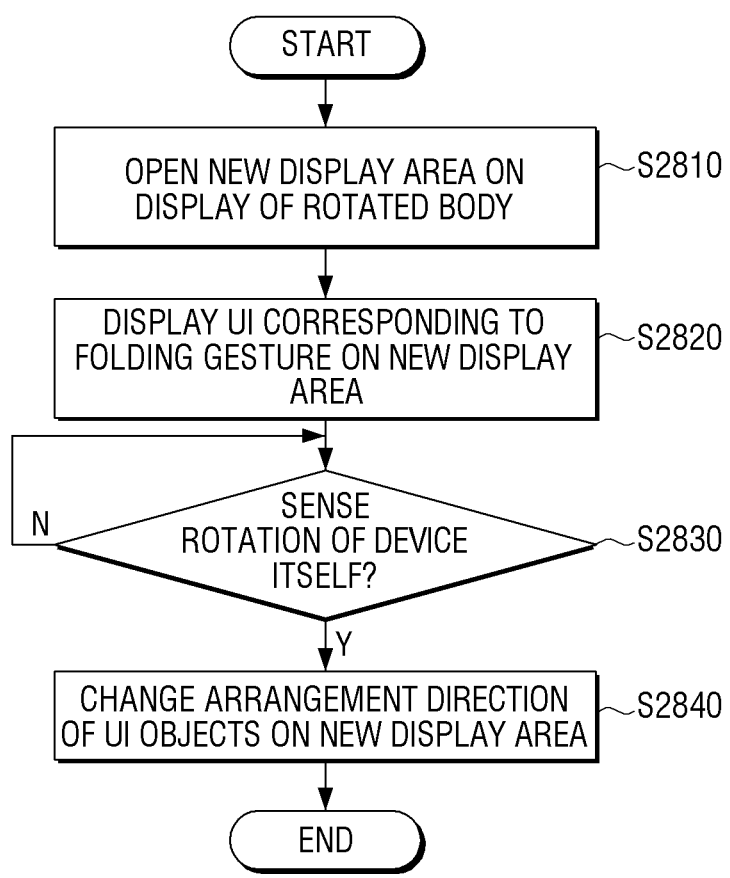
FIG. 28 is a flow chart illustrating an exemplary embodiment of an operation of changing a new display area according to a rotation of the multi-display apparatus.

An operation of changing a new display area according to a rotation of the multi-display apparatus 100 is described below. FIG. 28 is a flow chart illustrating an exemplary embodiment of an operation of changing a UI according to a rotation of the multi-display apparatus 100.

With reference to FIG. 28, when a folding gesture is input to the multi-display apparatus 100 and the predetermined conditions are satisfied as described above, a new display area may be opened on a display of a rotated body in operation S2810.

In operation S2820, the open new display area may display a UI that corresponds to the folding gesture using control operation information that corresponds to the rotated body and the rotating direction.

In this state, when the multi-display apparatus 100 senses its rotation horizontally or vertically in operation S2830-Y, an arrangement direction of the objects in the UI displayed on the new display area may be changed in operation S2840. The objects may include, for example, icons, images, and/or text displayed on the UI. That is, when the multi-display apparatus 100 is rotated, the objects on the UI may be rearranged to be appropriate for the rotating direction so that the user may consistently use the UI.

Figure 29:
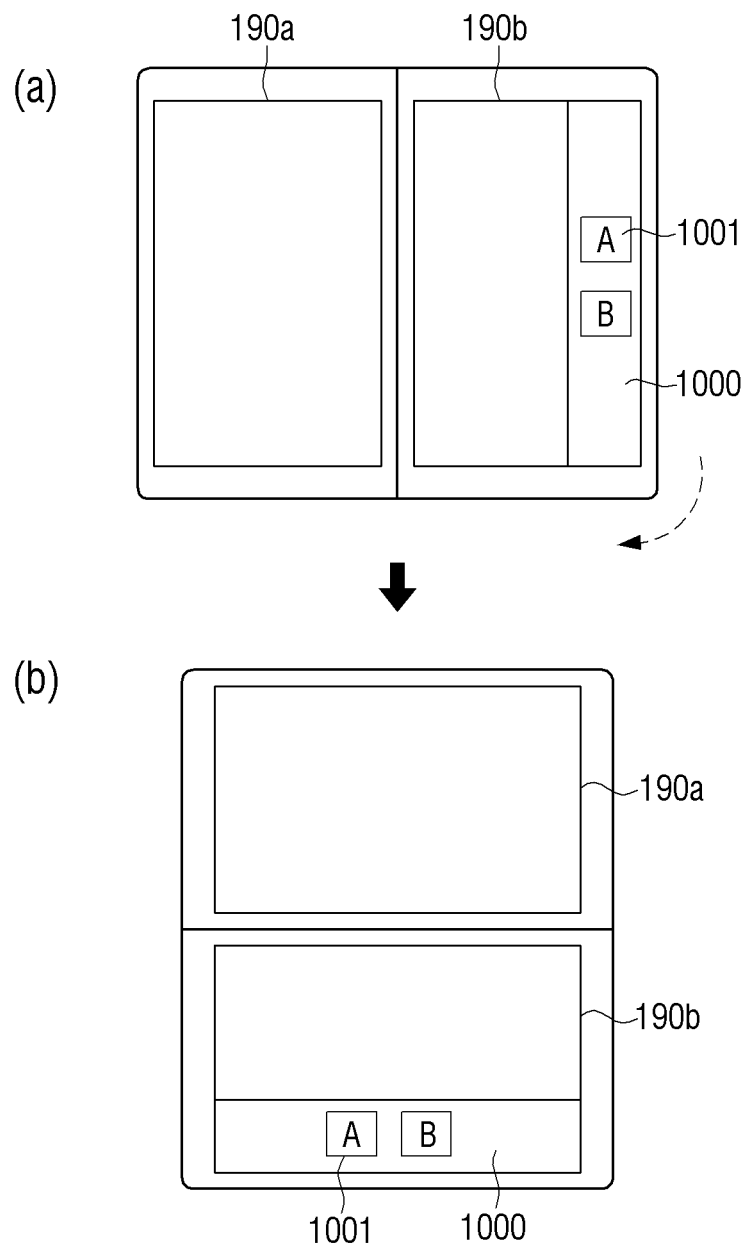
FIG. 29 illustrates the exemplary embodiment of the operation of changing the new display area according to the rotation of the multi-display apparatus as illustrated in FIG. 28.

FIG. 29 illustrates the exemplary embodiment of the operation of changing the new display area according to the rotation of the multi-display apparatus 100 as illustrated in FIG. 28.

With reference to a view (a) of FIG. 29, a UI 1000 that corresponds to a folding gesture may be displayed on the second display 190b.

When the user rotates the multi-display apparatus 100 horizontally, the arrangement direction of the objects of the UI may be changed as illustrated in a view (b) of FIG. 29.

Due to this function, the user may easily recognize the objects of the UI when the multi-display apparatus 100 is rotated vertically or horizontally.

Figure 30:
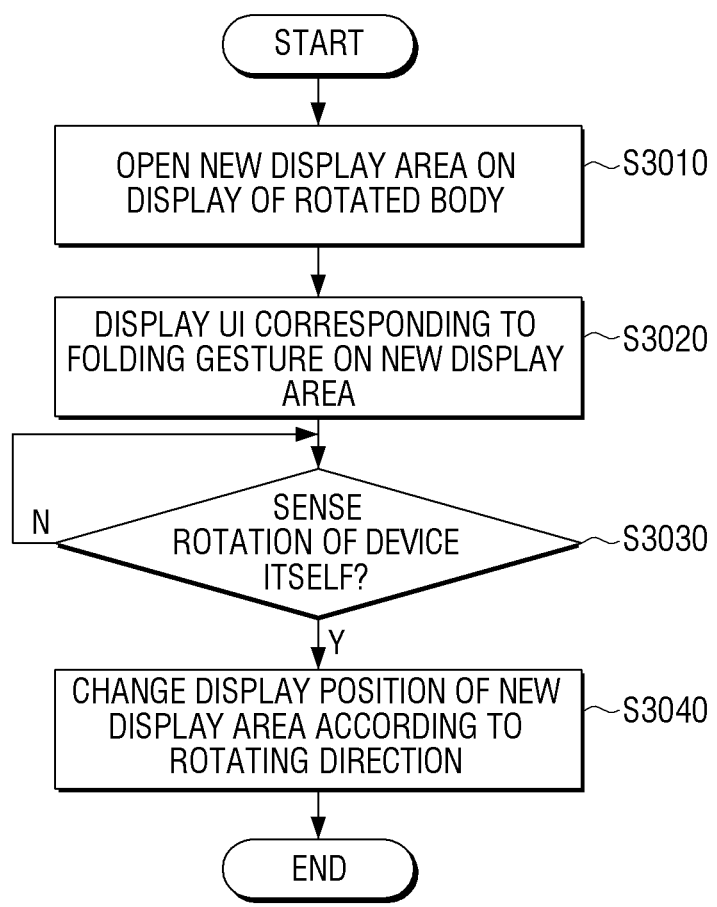
FIG. 30 is a flow chart illustrating an exemplary embodiment of an operation of changing a new display area according to a rotation of the multi-display apparatus.

FIG. 30 is a flow chart that illustrates an exemplary embodiment of an operation of changing a UI and/or a new display area according to a rotation of the multi-display apparatus 100.

With reference to FIG. 30, when a folding gesture is input to the multi-display apparatus 100 and the predetermined conditions are satisfied as described above, a new display area may be opened on a display of a rotated body in operation S3010.

In operation S3020, the open new display area may display a UI that corresponds to the folding gesture using control operation information that corresponds to the rotated body and the rotating direction.

In this state, when the multi-display apparatus 100 senses its rotation horizontally or vertically in operation S3030-Y, a display position of the objects of the new display area may be changed according to the rotating direction in operation S3040.

Figure 31:
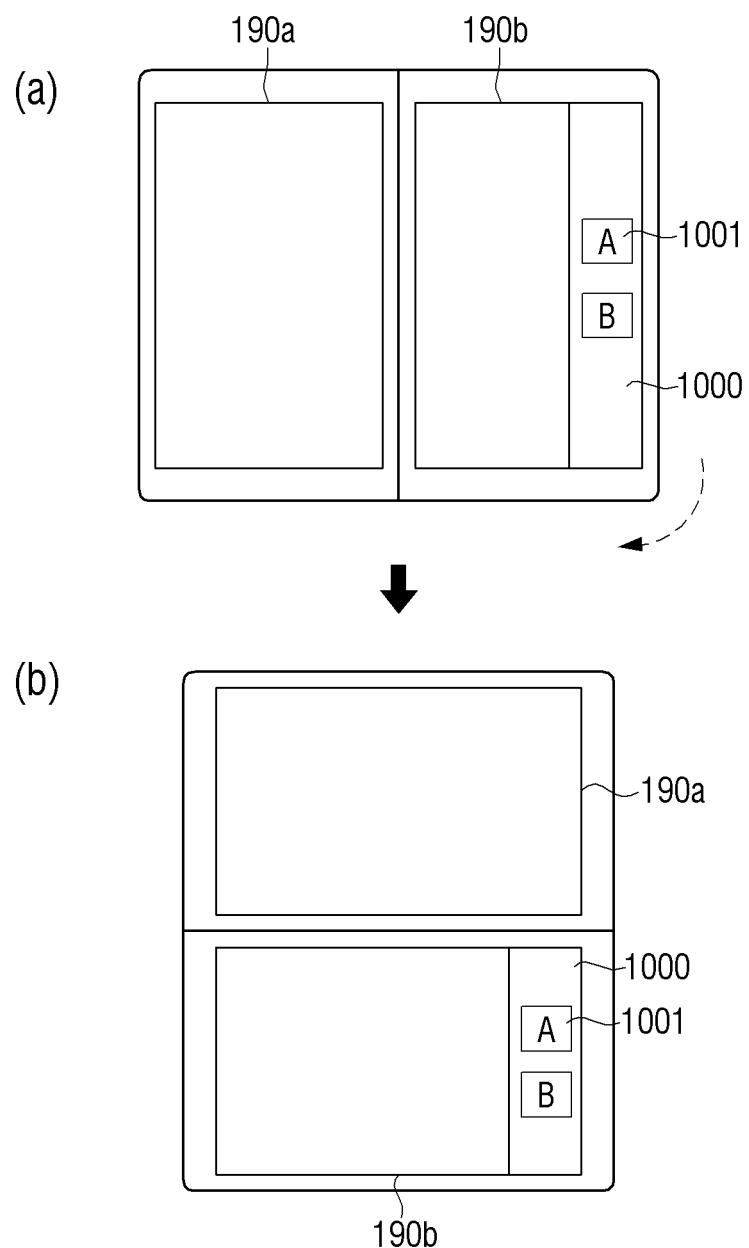
FIG. 31 illustrates the exemplary embodiment of the operation of changing the new display area according to the rotation of the multi-display apparatus as illustrated in FIG. 30.

FIG. 31 illustrates the exemplary embodiment of the operation of changing the new display area according to the rotation of the multi-display apparatus 100 as illustrated in FIG. 30.

With reference to a view (a) of FIG. 31, a UI 1000 may be displayed, for example, on a right edge of the second display 190b. In this state, when the user rotates the multi-display apparatus 100 to the right (as illustrated by the arrow), the UI 1000 may be moved and may be displayed on a right edge of the second display 190b as illustrated in a view (b) of FIG. 31.

Due to this function, the UI 1000 may be provided at the same location with respect to the user's eyes when the multi-display apparatus 100 is rotated vertically or horizontally.

A clipboard UI 1000-2 generated by a folding gesture as described above may be utilized in diverse methods.

Among the functions of the clipboard UI 1000-2 provided according to an exemplary embodiment of the present inventive concept, copying (or cutting) and pasting are described here.

Basically, the clipboard UI 1000-2 may store objects copied, by a copying (or cutting) command, in a storage and thus allow the user to call a copied object when desired. In the exemplary embodiments of the present inventive concept, the clipboard UI 1000-2 may include more functions such as, for example, a SNS update and a record deletion.

Copying (or cutting) may be performed by symbolization. Symbolization is to express data, such as, for example, text, images, sounds, and video, in simple images and/or icons.

Pasting may be performed by objectification. Objectification is a concept opposite of symbolization, which is to convert the symbolized images and/or icons into original data such as, for example, text, images, sounds, and data.

Figure 32:
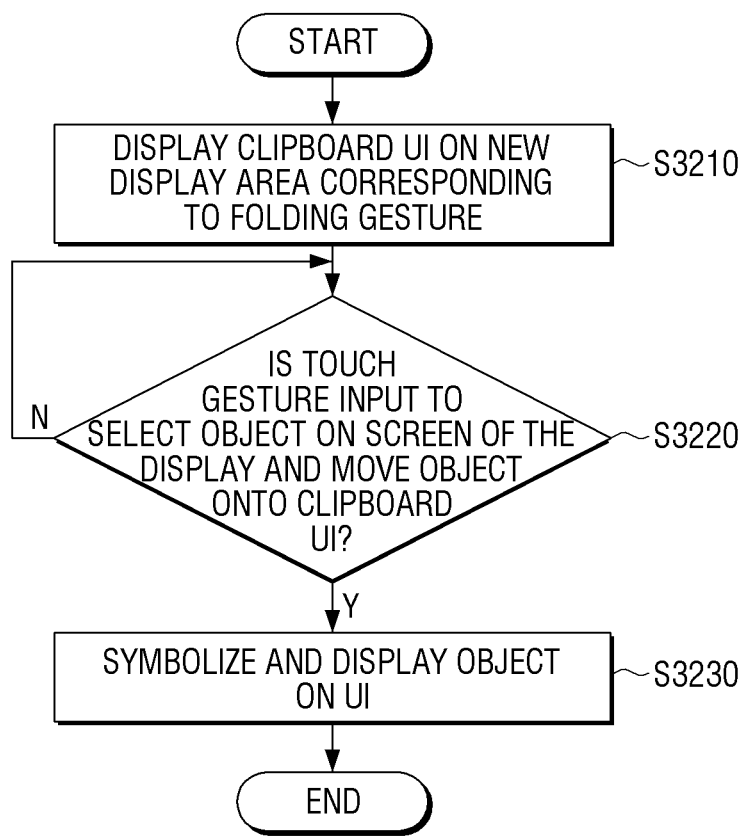
FIG. 32 is a flow chart illustrating operation of symbolizing a clipboard user interface according to an exemplary embodiment of the present inventive concept.

FIG. 32 is a flow chart illustrating an operation of symbolizing a clipboard user interface according to an exemplary embodiment of the present inventive concept.

With reference to FIG. 32, a clipboard UI may be displayed on a new display area that corresponds to a folding gesture in operation S3210.

In this case, when a touch gesture to select an object (e.g., a text, an image, a video, and/or a sound) on the screen of the display and to move the object onto the clipboard UI is input in operation S3220-Y, the selected object may be symbolized and may be displayed on the clipboard UI in operation S3230.

Figure 33:
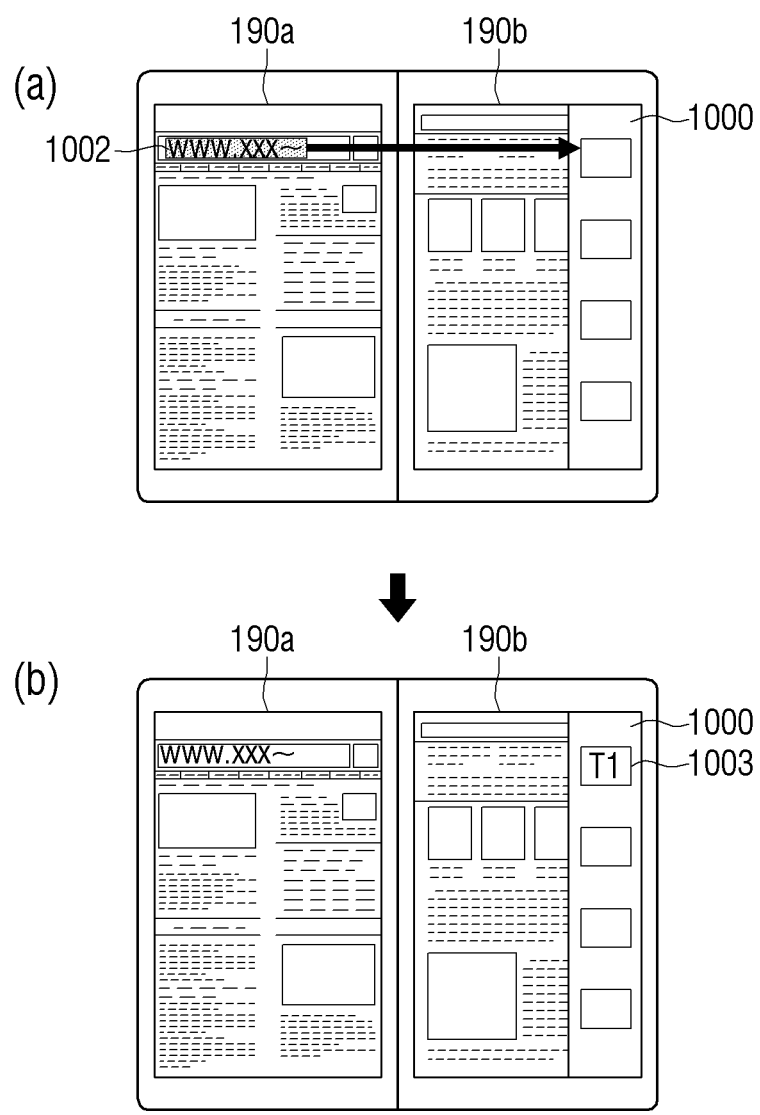
FIGS. 33 and 34 illustrate examples of an operation of symbolizing a clipboard user interface as illustrated in FIG. 32.
Figure 34:
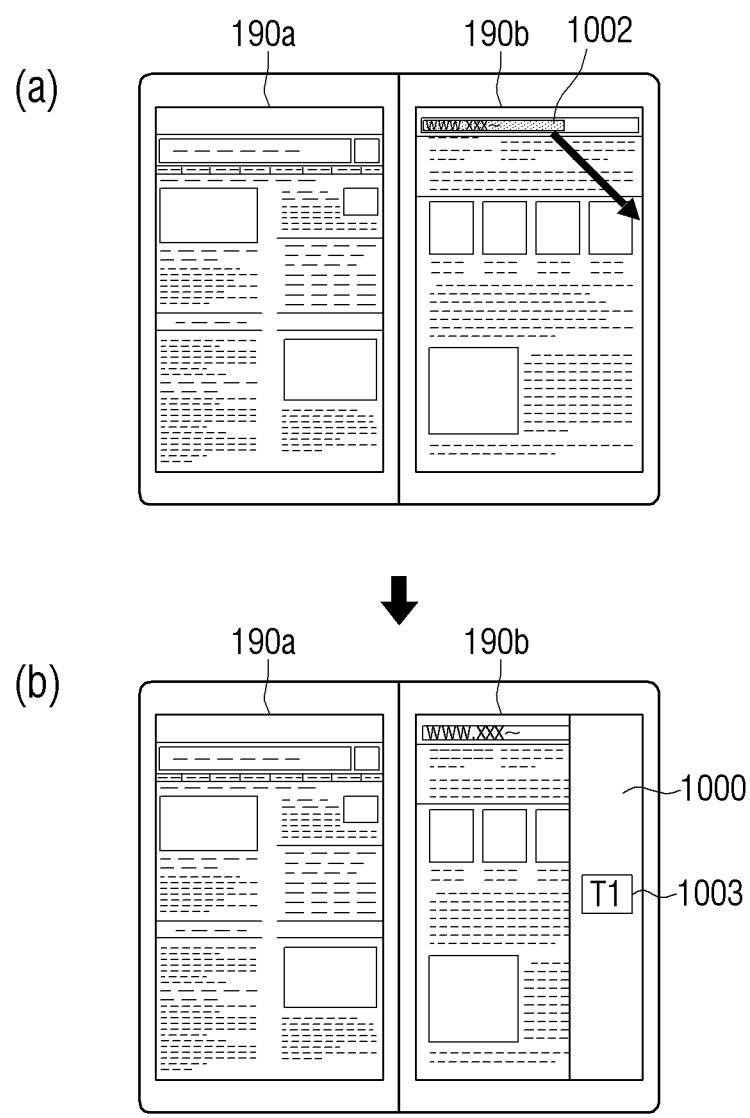

FIGS. 33 and 34 illustrate examples of an operation of symbolizing a clipboard user interface as illustrated in FIG. 32.

FIG. 33 illustrates an example of symbolization when a clipboard UI is displayed, and FIG. 34 illustrates an example of symbolization when a clipboard UI is not displayed.

With reference to FIG. 33, a web browser application may be running on the first display 190a. When text that indicates a uniform resource locator (URL), "WWW.XXX~" 1002, for example, is selected by the user and a touch gesture to move the text onto a clipboard UI 1000 occurs, the text may be converted into an icon and/or an image 1003 that displays data properties and may be displayed on a portion of the clipboard UI 1000 as illustrated in a view (b) of FIG. 33.

In symbolization, an object may be converted into an icon and/or image that corresponds to its characteristic. For example, the text, as illustrated in a view (b) of FIG. 33, may be symbolized to "T1", and an image may be symbolized to a thumbnail image of the original image.

FIG. 34 illustrates an example of symbolization when a clipboard UI is not displayed. With reference to a view (a) of FIG. 34, a webpage may be displayed on the second display 190b when a web browser application may be running.

When an Internet address 1002, that is, text of a URL of the web browser "WWW.XXX~", for example, is selected by the user and a touch gesture to move the text to a predetermined area such as, for example, a right edge of the screen occurs, a clipboard UI 1000 may be generated and a symbol 1003 of the selected data may be displayed as illustrated in a view (b) of FIG. 34.

The predetermined area may be an area to open a new display area, which may be preset by the manufacturer or may be set by the user.

In addition, an image and/or an icon of the symbol 1003 may be set according to characteristic of the object, and may be preset or may be set by the user.

Figure 35:
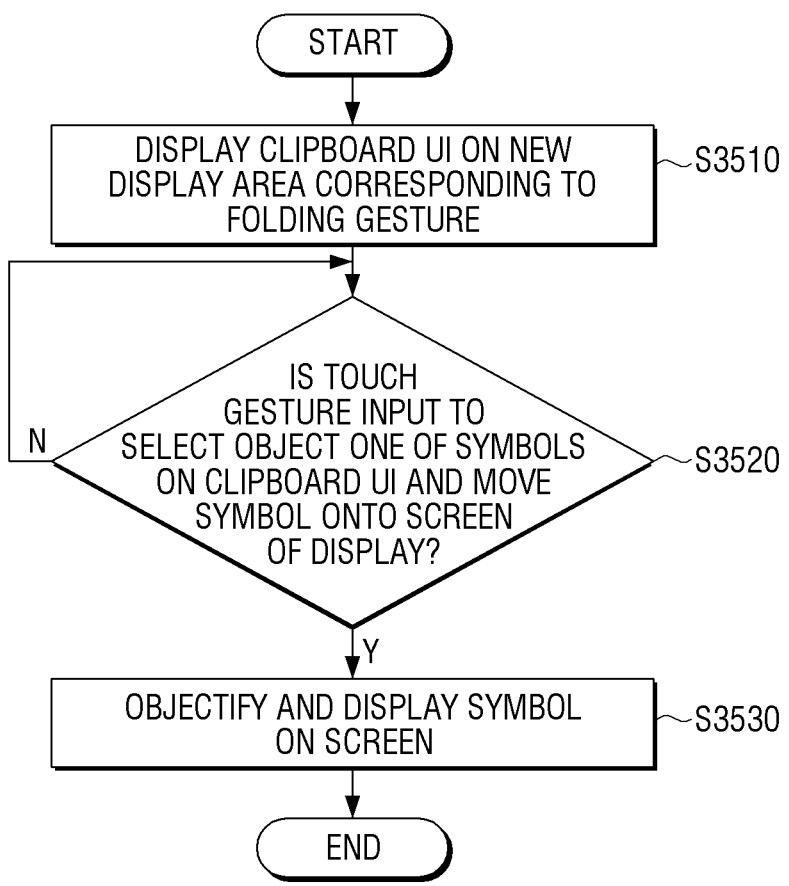
FIG. 35 is a flow chart illustrating operation of objectifying a clipboard user interface according to an exemplary embodiment of the present inventive concept.

FIG. 35 is a flow chart illustrating an operation of objectifying a clipboard user interface according to an exemplary embodiment of the present inventive concept.

With reference to FIG. 35, a clipboard UI may be displayed on a new display area that corresponds to a folding gesture in operation S3510.

In this case, when a touch gesture to select one of the symbols displayed on the clipboard UI and to move the selected symbol onto the screen of the display is input in operation S3520-Y, the selected symbol may be objectified and may be displayed on the clipboard UI in operation S3530.

Figure 36:
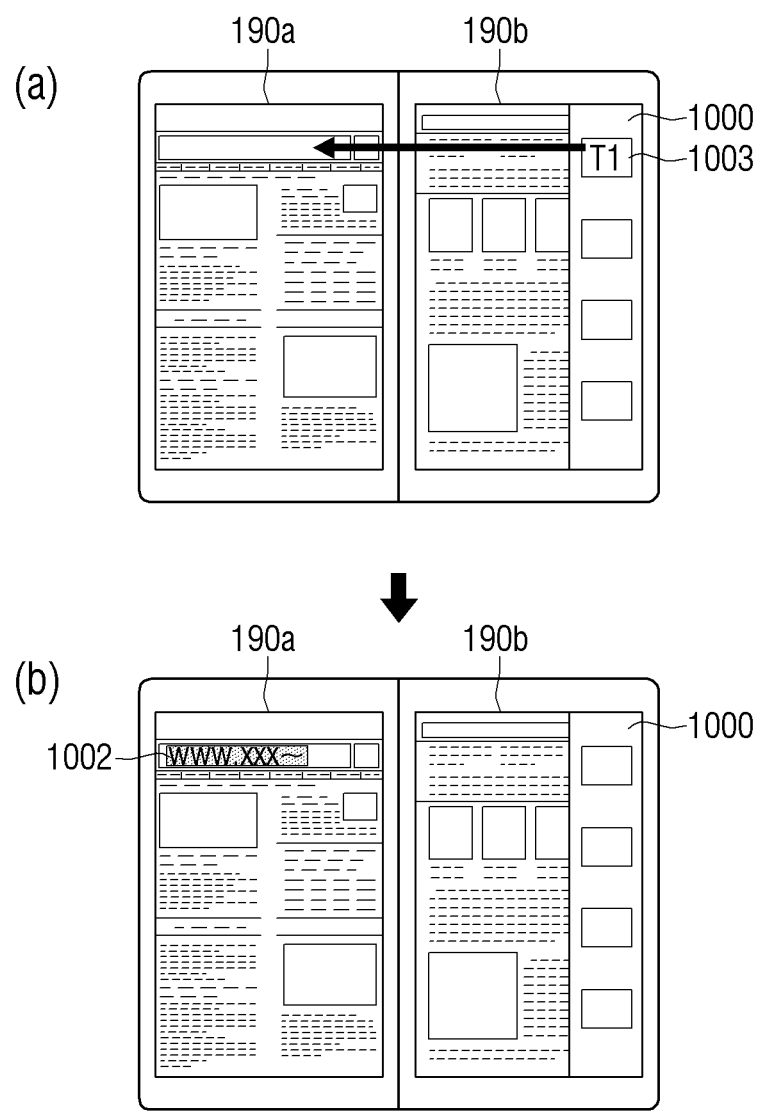
FIG. 36 illustrates an example of an operation of objectifying a clipboard user interface as illustrated in FIG. 35.

FIG. 36 illustrates an example of an operation of objectifying a clipboard user interface as illustrated in FIG. 35.

With reference to FIG. 36, a web browser application may be running on the first display 190a. When a touch gesture to move symbol T1 1003, displayed on the clipboard UI 1000, onto a web address window of the web browser running on the first display 190a occurs, the symbol T1 10003 may be converted into text "WWW.XXX~" 1002 and may be input to the address window as illustrated in FIG. 36(b). That is, objectification may be performed.

By symbolization and objectification, the user may easily capture desired data while using an application and may input the captured data again.

Among the functions of the clipboard UI 1000-2 provided according to an exemplary embodiment of the present inventive concept, deleting a symbol is described here.

Basically, the clipboard UI 1000-2 may store objects copied, by a copying (or cutting) command, in a storage. When some stored objects are not desire, the user may delete the undesired objects from the storage.

Figure 37:
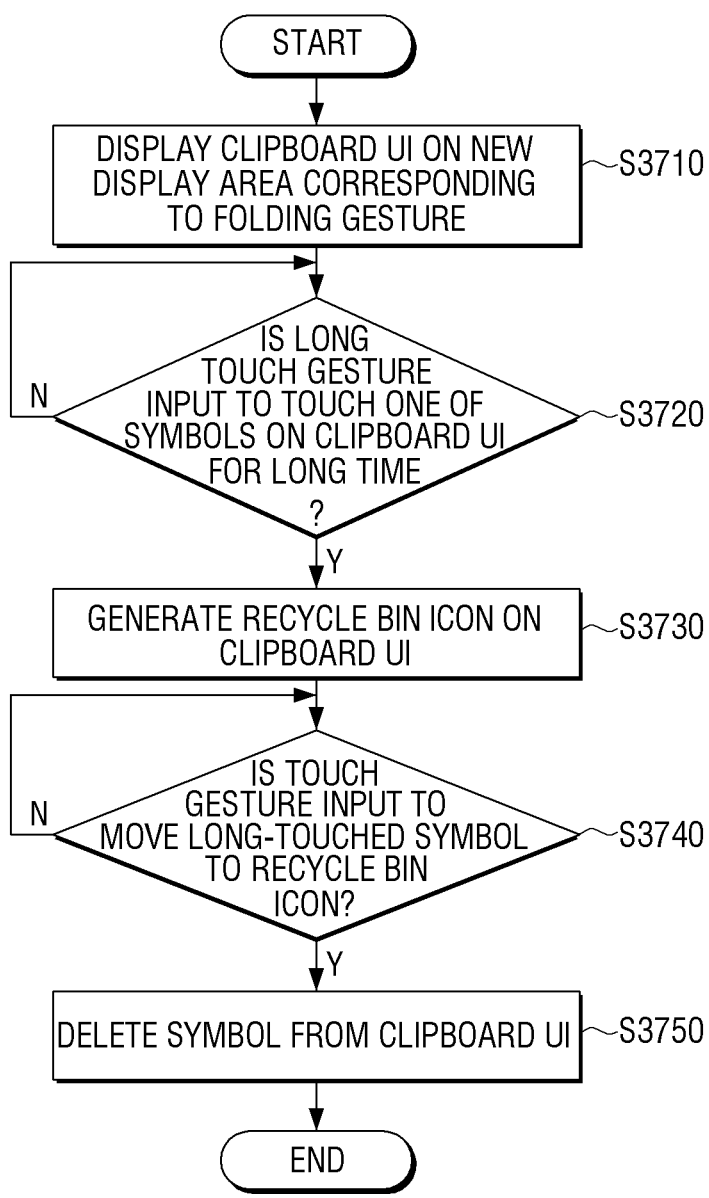
FIG. 37 is a flow chart illustrating operation of deleting a symbol from a clipboard user interface according to an exemplary embodiment of the present inventive concept.

FIG. 37 is a flow chart that illustrates an operation of deleting a symbol from a clipboard user interface according to an exemplary embodiment of the present inventive concept.

With reference to FIG. 37, a clipboard UI may be displayed on a new display area that corresponds to a folding gesture in operation S3710.

In this case, when a long touch gesture to touch one of the symbols displayed on the clipboard UI for a long time is input in operation S3720-Y, a recycle bin icon may be generated on the clipboard UI in operation S3730.

Subsequently, when a touch gesture to move the long-touched symbol to the recycle bin icon is input in operation S3740-Y, the symbol may be deleted from the clipboard UI in operation S3750. Accordingly, data related to the deleted symbol may also be deleted from the storage.

In FIG. 37, the deleting operation has been described by generating the recycle bin icon, but may also be performed, for example, by generating diverse types of icons. In addition, without generating an icon, it may be possible to delete a symbol by inputting a predetermined touch gesture (e.g., a touch gesture to drag the symbol within the clipboard UI in the direction opposite of the display).

Figure 38:
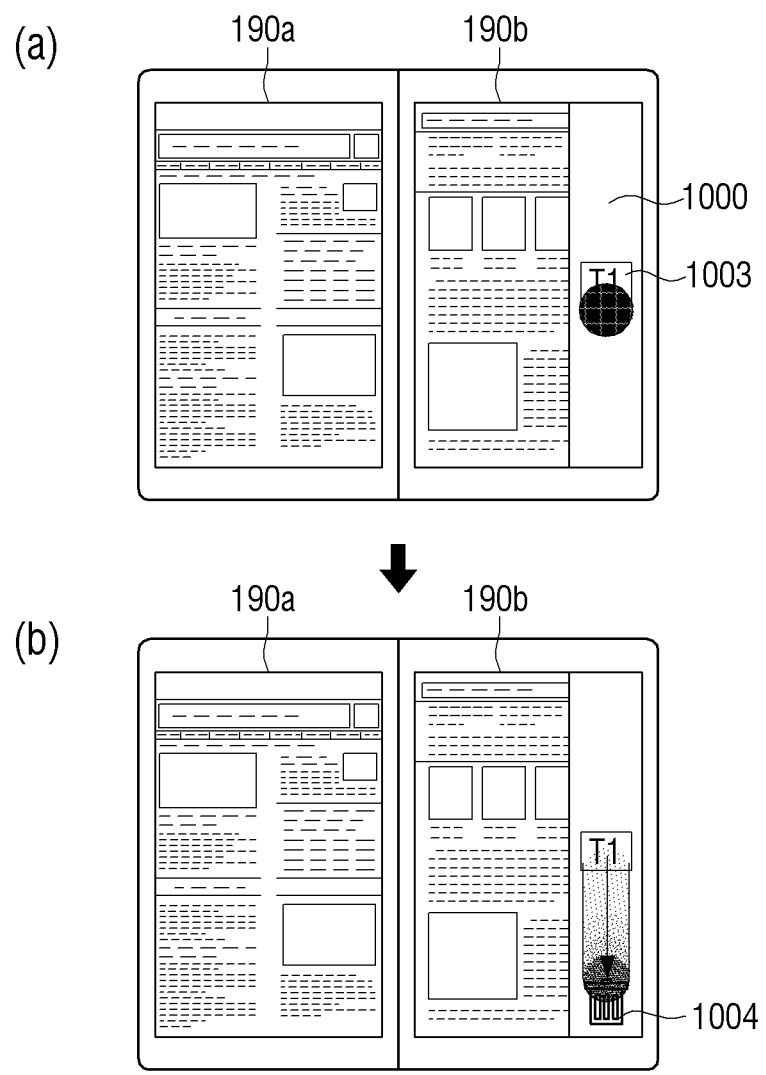
FIG. 38 illustrates an example of an operation of deleting a symbol from a clipboard user interface as illustrated in FIG. 37.

FIG. 38 illustrates an example of an operation of deleting a symbol from a clipboard user interface as illustrated in FIG. 37.

When a long touch gesture to touch symbol T1 1003, displayed on the clipboard UI 1000, is input for a long time as illustrated in a view (a) of FIG. 38, a recycle bin icon 1004 may be generated at, for example, a lower edge of the clipboard UI 1000 as illustrated in FIG. 38(b). Subsequently, when a touch gesture to drag and move the long-touched symbol T1 1003 to the recycle bin occurs, the multi-display apparatus 100 may delete the symbol T1 1003 from the clipboard UI 1000.

As in the above exemplary embodiment of the present inventive concept, the user may delete undesired objects from the clipboard.

FIG. 39 is a detailed block diagram of a configuration of the multi-display apparatus 100 according to an exemplary embodiment of the present inventive concept.

The multi-display apparatus 100 may be configured to be connected to an external device (not illustrated) using at least one of a cellular communication module 111, a wireless local area network (WLAN) module 112, a local communication module 113, and a connector 114 of a communicator 110. The multi-display apparatus 100 may include, for example, at least one of a mobile phone, a tablet PC, a computer server, and a digital television.

With reference to FIG. 39, the multi-display apparatus 100 may include two displays 190a and 190b. In FIG. 39, the two displays 190a and 190b are illustrated, but it may be possible to include three or more displays.

The multi-display apparatus 100, according to an exemplary embodiment of the present inventive concept, may include the communicator 110, a multimedia unit 120, the controller 130, a photographing unit 140, the sensor 150, an input/output unit 160, the storage 170, a power supplier 180, and the first and second displays 190a and 190b.

The communicator 110 may include, for example, the cellular communication module 111, the WLAN module 112, the local communication module 113, the connector 114, a Global Positioning System (GPS) module 115, and a broadcast communication module 116.

The cellular communication module 111, according to control of the controller 130, may allow the multi-display apparatus 100 to be connected to an external device (not illustrated) (in particular, a base station of a cellular system) through at least one antenna (not shown) using a wireless access technology of a cellular communication protocol.

In addition, the cellular communication module 111 may exchange wireless signals, containing voice call, video call, short messaging service (SMS) messages, and/or multimedia messaging service (MMS) messages, with other communicable devices such as, for example, mobile phones, smart phones, tablet PCs, and/or other devices that have a phone number input to the multi-display apparatus 100.

In addition, the communicator 110 may include, for example, at least one of the WLAN module 112 and the local communication module 113. For example, the communicator 110 may include only the WLAN module 112, include only the local communication module 113, or include both the WLAN module 112 and the local communication module 113.

The WLAN module 112, according to control of the controller 130, may access the Internet at a location in which a wireless access point (AP) (not shown) may be installed. The WLAN module 112 may support the WLAN standard (IEEE 802.11x) of the Institute of Electrical and Electronics Engineers (IEEE).

The local communication module 113, according to control of the controller 130, may allow wireless local communication between the multi-display apparatus 100 and an external device. Local communication methods may include, for example, Bluetooth, infrared data association (IrDA), and so on.

The connector 114 may provide interfaces for diverse devices, such as, for example, a USB 2.0, a USB 3.0, an HDMI, and/or an IEEE 1394 standard, and so on.

The connector 114 may act as an interface to connect the multi-display apparatus 100 to an external device or a power source. The multi-display apparatus 100, according to control of the controller 130, may transmit data stored in the storage 170 to an external device or may receive data from an external device through, for example, a cable, which may be connected to the connector 114. In addition, the multi-display apparatus 100 may receive power from a power source or charge its battery (not illustrated) through a cable, which may be connected to the connector 114.

The GPS module 115 may receive radio waves from a plurality of GPS satellites (not illustrated) moving around the Earth, and may calculate a location of the multi-display apparatus 100 using a time of arrival from the GPS satellites (not illustrated) to the multi-display apparatus 100 and GPS parameters.

The broadcast communication module 116, according to control of the controller 130, may receive broadcast signals (e.g., TV broadcast signals, radio broadcast signals, and/or data broadcast signals) and/or broadcast additional information (e.g., electronic program guide (EPG) and/or electronic service guide (ESG)) from a broadcasting station through a broadcast communication antenna (not illustrated).

The multimedia unit 120 may include, for example, an audio playback module 121 and a video playback module 122.

The audio playback module 121, according to control of the controller 130, may play back a digital audio file (e.g., a file having a filename extension such as mp3, wma, ogg, or wav), which may have been stored or may have been received. The video playback module 122 may support diverse forms of codecs to play back a digital video file. That is, the video playback module 122, for example, may play back a video file using a pre-stored codec that may be suitable for a codec format of the video file. The audio playback module 121 or the video playback module 122 of the multimedia unit 120 may be included in the controller 130.

The controller 130 (see FIG. 40) may include a central processing unit (CPU) 131, a read-only memory (ROM) 137, which may store a control program to control the multi-display apparatus 100, and a random access memory (RAM) 135, which may store a signal or data input from outside of the multi-display apparatus 100 and which may be used as a memory area for jobs performed by the multi-display apparatus 100. The CPU 131 may include at least one of a single core processor, a dual core processor, a triple core processor, and a quad core processor. The CPU 131, the ROM 137, and the RAM 135 may be connected to one another through a local bus 139.

The controller 130 may control the communicator 110, the GPS module 115, the multimedia unit 120, the photographing unit 140, the sensor 150, the input/output unit 160, the storage 170, the power supplier 180, and the first and second displays 190a and 190b.

The photographing unit 140 may include, for example, at least one of a first camera 141 and a second camera 142. In FIG. 39, only the first camera 141 and the second camera 142 are illustrated, but it may be possible to add more cameras according to exemplary embodiments of the present inventive concept.

The photographing unit 140, according to control of the controller 130, may include at least one of the first camera 141 and the second camera 142, which may be configured to photograph at least one of a still image and video. According to exemplary embodiments of the present inventive concept, the photographing unit 140 may include additional cameras. The first camera 141 and the second camera 142 may be provided on the bodies 191a and 191b of the multi-display apparatus 100, or may be configured to be connected to the multi-display apparatus 100 using a separate connecting means. At least one of the first camera 141 and the second camera 142 may include a supplementary light source (e.g. a flash (not illustrated)) to provide an amount of light which may be needed to take a picture.

The sensor 150 may include, for example, a touch sensor 151, a geomagnetic sensor 152, an acceleration sensor 153, a hinge sensor 154, and a proximity sensor 155.

The touch sensor 151 may sense a touch by a user on at least one of the first display 190a and the second display 190b. Methods of sensing the user's touch using the touch sensor 151 may be implemented as a capacitive method or a piezo-electric method. The touch sensor 151, according to an exemplary embodiment of the present inventive concept, may be implemented in the two methods or other methods. The touch sensor 151 may be included in a display 390 together with a display panel 360 (see FIG. 44). Detailed description thereof is given below with reference to separate drawings.

The geomagnetic sensor 152 may sense an azimuth by detecting, for example, terrestrial magnetism so that the orientation of the multi-display apparatus 100 may be recognized. The acceleration sensor 153 may process an output signal and may measure a dynamic force, such as, for example, acceleration, vibration, and impact of an object, thereby sensing change in a moving speed of the multi-display apparatus 100 or a strength of a force. The hinge sensor 154 may sense an angle or a movement of the hinge 135. The proximity sensor 155 may sense whether or not the user may be approaching the multi-display apparatus 100.

Although not illustrated in FIG. 39, the sensor 150 of the multi-display apparatus 100 may further include, for example, at least one of a gravity sensor, which may sense in which direction gravity is acting, a gyro sensor, which may recognize six degrees of motion in total by including rotational motion to an existing acceleration sensor, an orientation sensor, which may automatically rotate and arrange content by automatically sensing horizontal and vertical frames of the content such as, for example, an image, an illumination sensor, which may sense an intensity of illumination around the multi-display apparatus 100, an altitude measuring sensor, which may measure atmospheric pressure, an RGB sensor, which may sense a color of an object, a distance measuring sensor, which may measure a distance using ultrasonic waves and/or infrared light, and a Hall effect sensor, which may change in a voltage according to a strength of a magnetic field.

Each sensor of the sensor 150 may detect its state, may generate a signal corresponding to the detected state, and may transmit the signal to the controller 130. Each sensor of the sensor 150 may be added or removed according to performance needs of the multi-display apparatus 100.

The input/output unit 160 may include, for example, a button 161, a microphone 162, a speaker 163, and a vibration motor 164.

At least one button 161 may be provided on a front, a side, or a back of the bodies 191a and 191b of the multi-display apparatus 100 in a push type or a touch type, and may include at least one of a power/lock button, a volume control button, a menu button, a home button, a back button, and a search button.

The microphone 162, according to control of the controller 130, may receive a voice or a sound and may generate an electrical signal.

The speaker 163, according to control of the controller 130, may output sounds that correspond to diverse signals (e.g., wireless signals, broadcast signals, digital audio files, digital video files, and/or photographing) of the cellular communication module 111, the WLAN module 112, the local communication module 113, the multimedia unit 120, and/or the photographing unit 140 to the outside of the multi-display apparatus 100.

The speaker 163 may output sounds (e.g., button manipulation sounds or a ring back tone that corresponds to calling) that corresponds to functions of the multi-display apparatus 100. One or more speakers 163 may be provided at appropriate locations of the bodies 191a and 191b of the multi-display apparatus 100. For example, the speaker 163 may include an internal speaker module, which may be provided at a location suitable to be near a user's ears when the user is on the phone, and an external speaker module that may have a higher output suitable to reproduce audio and video files or viewing a broadcast and which may be provided at an appropriate location of the bodies 191a and 191b of the multi-display apparatus 100.

The vibration motor 164, according to control of the controller 130, may convert an electrical signal into a mechanical vibration. For example, when the multi-display apparatus 100 in vibration mode receives a call from another device (not illustrated), the vibration motor 164 may operate. One or more vibration motors 164 may be provided inside the bodies 191a and 191b of the multi-display apparatus 100. The vibration motor 164 may operate in response to at least one of the user's touch gesture, which may be detected on at least one of the first and second displays 190a and 190b, and a continuous movement of touch, which may be detected on at least one of the first and second displays 190a and 190b.

The storage 170 may store diverse types of multimedia data, which may be processed by the controller 130, content data, and data that may be received from an external source.

For example, the storage 170, according to control of the controller 130, may store an input and/or an output signal, information, or data that correspond to operation of, for example, the cellular communication module 111, the WLAN module 112, the local communication module 113, the connector 114, the GPS module 115, the multimedia unit 120, the photographing unit 140, the sensor 150, the input/output unit 160, and the first and second displays 190a and 190b.

The storage 170 may also store control programs configured to control the multi-display apparatus 100 or the controller 130, and applications. Hereinafter, the term "storage" may include, for example, the storage 170, the ROM 137 (see FIG. 40), the RAM 135, and/or a memory card (e.g., a secure digital (SD) card and a memory stick), which may be attachable to or detachable from the multi-display apparatus 100. In addition, the storage may include, for example, a non-volatile memory, a volatile memory, a hard disk drive (HDD), and/or a solid state drive (SSD).

The power supplier 180 may supply power to the multi-display apparatus 100. The power supplier 180 may be implemented, for example, with a rechargeable battery and may further include a voltage converter which converts externally supplied power and supplies the converted power to the rechargeable battery.

According to power management control of the controller 130, the power supplier 180 may supply power to the multi-display apparatus 100 in diverse modes, such as, for example, a maximum performance mode, a general mode, a power saving mode, and a standby mode.

The first display 190a and the second display 190b may be configured to be connected to each other by the hinge 135. The first display 190a and the second display 190b, according to control of the controller 130, may display multimedia contents, images, videos, and/or text.

The first display 190a and the second display 190b may be physically separated from each other. Screens of the first display 190a and the second display 190b may be controlled independently. For example, resolutions of the first display 190a and the second display 190b may be set individually. In addition, the screens of the first display 190a and the second display 190b may be expanded, rotated, moved, or divided individually.

Furthermore, the first display 190a and the second display 190b may display a single display screen using a virtual integrated frame buffer.

The first display 190a and the second display 190b may be implemented with diverse display technologies such as, for example, a liquid crystal display (LCD) panel, a plasma display panel (PDP), an organic light emitting diode (OLED), a vacuum fluorescent display (VFD), a field emission display (FED), an electro luminescence display (ELD), and so on.

The first display 190a and the second display 190b may be implemented, for example, with a general display panel, which may not have a touch input function, or may be implemented with a touch display panel, which may recognize the user's manipulation using at least one of a proximity sensor and a touch sensor. When the first display 190a and the second display 190b are implemented with a touch display panel, the first display 190a and the second display 190b may receive input of at least one touch gesture through the user's body (e.g. fingers including a thumb) or a sensible input means (e.g., a stylus pen).

Such a user interface may include, for example, a predetermined touch area, a soft key, and/or a soft menu. An electronic signal, that corresponds to at least one touch gesture that may be input through the user interface, may be transmitted to the first display 190a and the second display 190b through an LCD controller (not illustrated). In addition, the first display 190a and the second display 190b may detect a continuous movement of touch and may transmit an electronic signal, that corresponds to a continuous or discontinuous touch movement, to the LCD controller.

The first display 190a and the second display 190b may be implemented, for example, in diverse methods, such as a resistive method, a capacitive method, an infrared method, and/or an acoustic wave method.

The first display 190a and the second display 190b may convert a signal that corresponds to the user's gesture, which may be detected by the touch sensor 151 into a digital signal (e.g., X and Y coordinates), and may transmit the digital signal to the controller 130. The controller 130 may perform a control operation that corresponds to the input user's gesture by using the received digital signal. For example, the controller 130 may select a soft key displayed on at least one of the first display 190a and the second display 190b or may, in response to the user's gesture, execute an application that corresponds to the soft key.

The user's gesture is not limited to direct contact between the first and second displays 190a and 190b and the user's body or to a touchable input means, but may include methods that do not involve contact. Sensitivity to the user's gesture, which may be detected by at least one of the first display 190a and the second display 190b, may vary according to performance and/or structure needs of the multi-display apparatus 100.

The controller 130 may detect diverse types of the user's gesture using the touch sensor 151 and other sensors.

In an exemplary embodiment of the present inventive concept, a touch gesture may include all types of user's gestures that may be sensed by the multi-display apparatus 100 when the user contacts the touch screen directly or approaches the touch screen closely. For example, the touch gesture may be the user's gesture that selects one position or continuous positions on the touch screen using a finger (for example, an index finger) of at least one of the right or left hand, a thumb, or an object (e.g., a stylus pen) that may be sensed by the touch screen. The touch gestures are described here with reference to the following tables.

TABLE 1

|  | Type | Mark |
| --- | --- | --- |
| Single Finger Gesture | Tap | ● |
|  | Touch & Hold | ● |
|  | Double Tap |  |
|  | Drag | ↓ |
|  | Drag & Drop | ↓ |
|  | Flick | ↓ |

Table 1 illustrates marks associated with diverse types of gestures that may be made using a single finger.

With reference to Table 1, the diverse types of gestures that may be made using a single finger may include, for example, a tap, a touch & hold, a double tap, a drag, a drag & drop, and a flick. The tap may be a gesture to slightly press and then release the touch screen. The touch & hold may be a gesture to touch the touch screen for a relatively long time. The double tap may be a gesture to tap on the touch screen twice quickly. The drag may be a gesture to move an object on the the touch screen in one direction while maintaining contact with the touch screen. The drag & drop may be a gesture to touch an object on the touch screen and to move the object from the position to another position. The flick may be a gesture to drag quickly.

TABLE 2

| | Type | Mark |
|---|---|---|
| Two Finger Gesture | Two Finger Tap | |
| | Touch & Spread | |
| | Pinch-Out | |
| | Pinch-In | |
| | Two Finger Drag | |
| | Cross-Two-Finger Touch & Rotate | |

Table 2 illustrates marks associated with diverse types of gestures that may be made using two fingers.

With reference to Table 2, the diverse types of gestures that may be made using two fingers may include, for example, a two finger tap, a touch & spread, a pinch-out, a pinch-in, a two finger drag, a cross two fingers, and a touch & rotate. The two finger tap may be a gesture to tap using two fingers at the same time. The touch & spread may be a gesture to press the touch screen using two fingers at the same time and to move one finger straight without moving the other. The pinch-out may be a gesture to press the touch screen using two fingers at the same time and to drag the two fingers in opposite directions. The pinch-in may be a gesture to press the touch screen using two fingers at the same time and to drag the two fingers in directions facing each other. The two finger drag may be a gesture to drag using two fingers in the same direction. The cross two fingers may be a gesture to drag using two fingers in directions facing each other at the same time so that the two fingers miss each other. Lastly, the touch & rotate may be a gesture to touch the touch screen using two fingers and to rotate one finger around the other one without moving the other one.

TABLE 3

| | Type | Mark |
|---|---|---|
| Multi-Finger Gesture | Three Finger Touch | |
| | Four Finger Touch | |
| | Five Finger Touch | |
| Palm | Palm | |

Table 3 illustrates marks associated with diverse types of gestures that may be made using three or more fingers or using a palm.

With reference to Table 3, the diverse types of gestures that may be made using three or more fingers or using a palm may include, for example, a three finger touch, a four finger touch, and a five finger touch. In addition, gestures such as a tap, a drag, and a rotate as described above and illustrated in Tables 1 and 2 may be performed using three or more fingers.

The controller 130 may recognize the aforementioned touch gestures and may perform an operation that corresponds to the touch gestures. For example, the controller 130 may execute an application, a widget, or a web browser, which may be stored in the storage 170, and may display an execution screen on at least one of the first and second displays 190*a* and 190*b*.

In the aforementioned exemplary embodiments of the present inventive concept, the bodies 191*a* and 191*b* of the multi-display apparatus 100 may be connected to each other by the hinge 135, but the bodies 191*a* and 191*b* may also be connected by a connector (not illustrated), which may be made of a flexible material, instead of the hinge 135.

FIG. 40 is a detailed block diagram illustrating an example of a configuration of the controller 130 as illustrated in FIG. 39.

As illustrated in FIG. 40, the multi-display apparatus 100 may include the communicator 110, the multimedia unit 120, the controller 130, the photographing unit 140, the sensor 150, the input/output unit 160, the storage 170, the power supplier 180, and a dual display 190. Since the components, except for the controller 130, have been described above in detail, description thereof is not repeated here.

With reference to FIG. 40, the controller 130 may include the CPU 131, a graphic process unit (GPU) 133, the RAM 135, the ROM 137, and the system bus 139. The functions of the controller 130 are described here.

The CPU 131 may control the overall components of the multi-display apparatus 100 as well as the components of the controller 130. For example, the CPU 131 may control the functions of the components while performing data communication with the components through the system bus 139, may collect control results, and may control diverse peripheral devices by transmitting control signals to the diverse peripheral devices based on the control results.

For example, the CPU 131 may boot up the system using booting information pre-stored in the ROM 137. The CPU 131 may read out data stored in a storage (not illustrated) into the RAM 135, and may transmit to the GPU 133 data that may need graphical processing from among the data stored in the RAM 135. The CPU 131 may receive the data that have been graphically processed by the GPU 133, may transmit the data to an LCD controller (not illustrated), which may be connected to the system bus 139, and may display an image on the display.

The CPU 131 may temporarily store the image data processed by the GPU 133 in a virtual frame buffer area, which may be allocated in a predetermined area of the RAM 135. The CPU 131 may allocate the virtual frame buffer area in order to support the maximum resolution of the display. When there are two displays, the CPU 131 may allocate, for example, the virtual frame buffer area to be 1024 by 200 in size.

The CPU 131 may perform digital signal processing by inputting the data which may be temporarily stored in the virtual frame buffer to the GPU 133.

The GPU 133 may perform graphical processing of the input data according to control of the CPU 131. For example, the GPU 133 may generate, using an operator (not illustrated) and a renderer (not illustrated), a screen that includes diverse objects, such as, for example, an icon, an image, and/or text. The operator may calculate property values of each object, such as, for example, a coordinate value, a shape, a size and/or a color, according to a layout of the screen. The renderer may generate the screen having diverse layouts that include the objects based on the property values calculated by the operator. The screen generated by the renderer may be transmitted to the first and second displays 190*a* and 190*b* through the bus 139, and may be displayed on a display area or may be stored in the storage 170.

The CPU 131 may display the data which are graphically processed by the GPU 133 on at least one of the first and second displays 190*a* and 190*b*, may store the data in the storage 170, or may input the data to a display controller (not illustrated).

The GPU 133 may include a decoder (not illustrated), a renderer (not illustrated), and a scaler (not illustrated). Accordingly, the GPU 133, according to control of the display controller (not illustrated), may decode stored content, may configure a frame by rendering the decoded content data, and may scale the size of the frame to be suitable for the size of the display. If the content is displayed on one of the first display 190a and the second display 190b, the frame may be scaled to the display, or if the content is displayed on the two displays 190a and 190b together, the frame may be scaled to the entire size of both displays 190a and 190b. The GPU 133 may transmit the processed frame to the display so that the display may display the content.

The controller 130 may further include an audio processor (not illustrated) and an interface (not illustrated). The interface may be a component configured to interface with peripheral components.

The audio processor (not illustrated) may be configured to interface with the multimedia unit 120 through an audio interface (not illustrated), to process audio data, and to transmit the audio data to an audio output means such as, for example, a speaker (not illustrated). The audio processor may perform audio signal processing such as, for example, decoding audio data stored in the storage 170 or audio data received through the communicator 110, filtering noise, and amplifying the audio data to an optimal decibel. In the above example, when the content is video, the audio processor may process audio data de-multiplexed from the video and may transmit the audio data to the speaker so that the audio data may be synchronized with output from the GPU 133.

When web browsing data includes audio data, the CPU 131 may display the web browsing screen and also may control the audio processor to play back the audio signal.

When a web browsing program is executed, the CPU 131 may access a web server through a network interface (not illustrated). When receiving webpage data from the web server, the CPU 131 may control the GPU 133 to configure a webpage screen, and may display the webpage screen on a multi-display 190. (The multi-display 190 is a collective term for the first and second displays 190a and 190b and the hinge 185, which have been described above.)

The ROM 137 may store a set of commands to boot up the system. When a turn-on command is input and the power is supplied, the CPU 131, according to the commands stored in the ROM 137, may copy an operating system (OS) stored in the storage 170 to the RAM 135 and may execute the OS so that the system may boot up. When the boot-up is complete, the CPU 131 may copy diverse application programs stored in the storage 170 to the RAM 135, and may execute copied application programs so that diverse operations may be performed. As mentioned above, the CPU 131 may perform diverse operations according to execution of the application programs stored in the storage 170.

When the multi-display apparatus 100 senses the user's touch or other manipulations as described above, the controller 130 may determine whether or not the user's manipulation was intentional. When the controller 130 determines that the user's manipulation was intentional, the controllers may read out, from the storage 170, information about an operation that corresponds to the user's manipulation and may perform the corresponding operation. This operation of the controller 130 may be realized by running diverse programs stored in the storage 170.

The multi-display apparatus 100 may include the aforementioned components. Since the multi-display apparatus 100 has a plurality of displays, the displays may provide diverse screens. Diverse examples of a basic detailed configuration and of operation of the multi-display apparatus 100 are described here.

Figure 41:
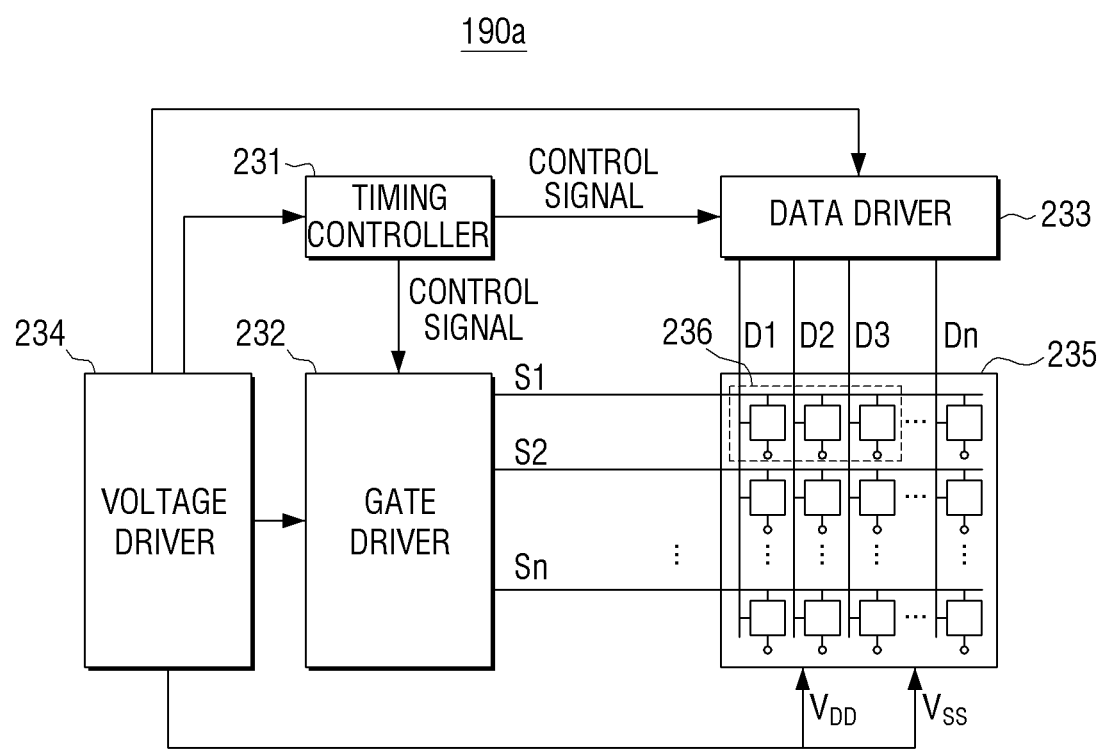
FIG. 41 illustrates an example of a configuration of hardware of the display.

FIG. 41 illustrates an example of a configuration of hardware of the display. For convenience of description, FIG. 41 illustrates only the first display 190a, but the second display 190b may be implemented in the same or in a similar form.

With reference to FIG. 41, the first display 190a may include a timing controller 231, a gate driver 232, a data driver 233, a voltage driver 234, and a display panel 235.

The timing controller 231 may receive, from an external source (not illustrated), a clock signal (DCLK) (not illustrated), a horizontal sync signal (Hsync) (not illustrated), and a vertical sync signal (Vsync) (not illustrated), which may be suitable for resolution of, for example, the touch screen, may generate a gate control signal (a scanning control signal) and a data control signal (a data signal), may rearrange RGB data, and may provide the data to the data driver 233.

With regard to the gate control signal, the timing controller 231 may generate a gate shift clock (GSC) (not illustrated), a gate output enable (GOE) (not illustrated), and a gate start pulse (GSP) (not illustrated). The GSC may be a signal to determine the time when a thin film transistor (TFT), which may be connected to a light emitting element such as, for example, RGB organic light emitting diodes (OLEDs), may be turned on or off. The GOE may be a signal to control output of the gate driver 232. The GSP may be a signal to indicate a first driving line of the screen in a single vertical sync signal.

In addition, with regard to the data control signal, the timing controller 231 may generate a source sampling clock (SSC) (not illustrated), a source output enable (SOE) (not illustrated), and a source start pulse (SSP) (not illustrated). The SSC may be used as a sampling clock to latch data in the data driver 233, and may determine a driving frequency of a data driver integrated circuit (IC). The SOE may transmit the data latched by the SSC to the display panel 235. The SSP may be a signal to indicate latch of data or start of sampling during a single horizontal sync period.

The gate driver 232 may generate a scanning signal, and may be connected to the display panel 235 through scanning lines S1, S2, . . . , and Sn. The gate driver 232 may transmit a gate on/off voltage (Vgh/Vgl), received from the voltage driver 234, to the display panel 235 according to a gate control signal generated by the timing controller 231. The gate on voltage (Vgh) may be provided to gate lines sequentially from gate line 1 (GL1) to gate line n (GLn) to realize a unit frame image.

The data driver 233 may generate a data signal, and may be connected to the display panel 235 through data lines D1, D2, D3, . . . , and Dn. The data driver 233 may complete scaling and may input RGB data of an image frame to the display panel 235 according to a data control signal generated by the timing controller 231. The data driver 233 may convert serial RGB image data provided by the timing controller 231 into parallel data, may convert digital data into an analog voltage, and may provide image data for a single horizontal line to the display panel 235. This process may be performed according to each horizontal line in sequence.

The voltage driver 234 may generate each driving voltage and may supply the generated voltages to the gate driver 232, the data driver 233, and the display panel 235. That is, the voltage driver 234 may receive a prevailing voltage, i.e., alternating current voltage of 110V or 220V from the outside, may generate power voltage (VDD), which may be needed for the display panel 235, and may provide the power voltage, or may provide a grounding voltage (VSS). In addition, the voltage driver 234 may generate the gate on voltage (Vgh) and may provide the gate on voltage to the gate driver 232. To do so, the voltage driver 234 may include, for example, a plurality of voltage driving modules (not illustrated), which may operate individually. The plurality of voltage driving modules (not illustrated) may provide, according to control of the controller 130, different voltages and the controller 130 may control the voltage driver 234 in order that, for example, the plurality of voltage driving modules may provide different driving voltages according to predetermined information. For example, each of the voltage driving modules, according to control of the controller 130, may provide a first voltage and a second voltage (set as the default voltages), which may be different based on predetermined information.

According to an exemplary embodiment, the voltage driver 234 may include a plurality of voltage driving modules (not illustrated) that correspond to to each area of the display panel 235, which may be divided into a plurality of areas. In this case, the controller 130 may control the plurality of voltage driving modules to provide different first voltages, i.e., different electroluminescence (EL) power voltages (ELVDD) according to screen information (or input image information) of the plurality of areas. That is, the intensity of the ELVDD may be controlled using an image signal that may be input to the data driver 233. The screen information may be, for example, at least one of luminance and gray scale information of an input image.

The display panel 235 may include a plurality of gate lines (GL1 to GLn) (not illustrated) and a plurality of data lines (DL1 to DLn) that cross over each other and define a pixel area 236. RGB light emitting elements, such as, for example, OLED may be provided on the pixel area 236. More precisely, a switching element (not illustrated), that is, a thin film transistor (TFT) may be provided at, for example, the edge. When the TFT is turned on, gray scale voltage may be supplied from the data driver 233 to each of the RGB light emitting elements. At this time, the RGB light emitting elements may emit light that corresponds to an amount of current provided based on the gray scale voltage. That is, the greater the amount of current that may be provided, the brighter the light may be provided by the RGB light emitting elements.

Figure 42:
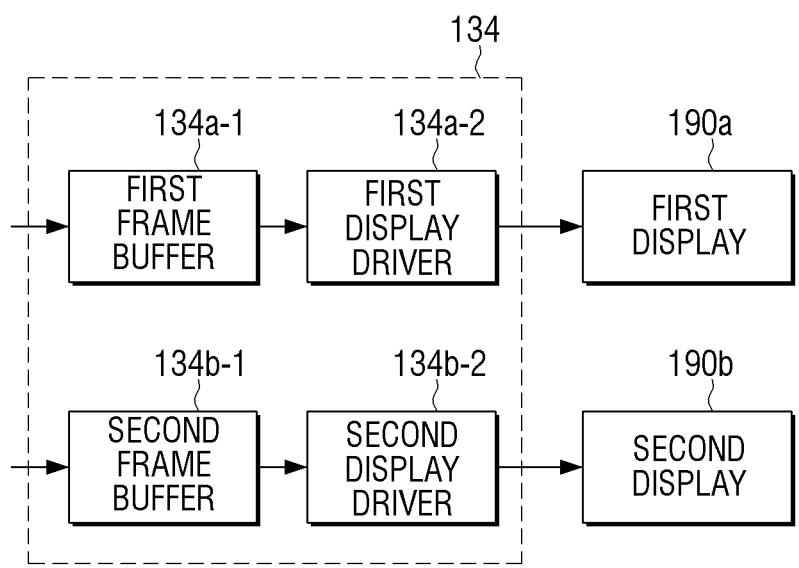
FIGS. 42 and 43 are schematic block diagrams of configurations of the liquid crystal display (LCD) controller configured to control the two displays of the multi-display apparatus according to an exemplary embodiment of the present inventive concept.
Figure 43:
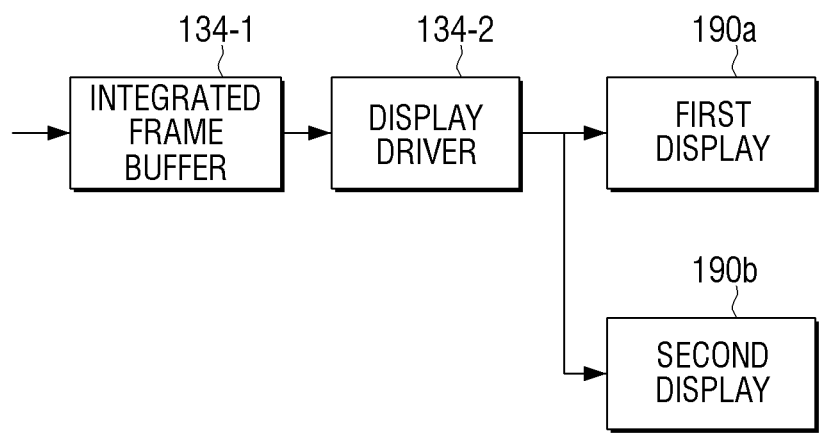

FIGS. 42 and 43 are schematic block diagrams of configurations of the liquid crystal display (LCD) controller configured to control the two displays 190*a* and 190*b* of the multi-display apparatus 100 according to an exemplary embodiment of the present inventive concept.

FIG. 42 is a schematic block diagram of an example of a configuration of the multi-display apparatus 100 configured to control operation of the displays 190*a* and 190*b* using a plurality of frame buffers 134*a*-1 and 134*b*-1.

With reference to FIG. 42, the multi-display apparatus 100 may include first and second displays 190*a* and 190*b* and a display controller 134. The display controller 134 may be provided separate from the controller 130 or may be provided inside the controller 130.

As illustrated in FIG. 42, the display controller 134 may include the first frame buffer 134*a*-1, a first display driver 134*a*-2, the second frame buffer 134*b*-1, and a second display driver 134*b*-2.

The first frame buffer 134*a*-1 may be configured to buffer an image frame to display on the first display 190*a*, and the second frame buffer 134*b*-1 may be configured to buffer an image frame to display on the second first display 190*b*.

For example, image frames that has been processed into digital signals by the GPU 133 may be stored in the first and second frame buffers 134*a*-1 and 134*b*-1 in a bitmap form. In this case, a buffering area of each frame buffer 134*a*-1 and 134*b*-1 may be allocated, for example, to be suitable for the maximum pixel size that may be supported by each display 190*a* and 190*b*. The first display driver 134*a*-2 may analyze the image frame that may be stored in the first frame buffer 134*a*-1, may convert the image frame into a first image source signal, and may transmit the first image source signal to the first display 190*a* so that the first display 190*a* may display the image frame.

In the same manner, the second display driver 134*b*-2 may analyze the image frame that may be stored in the second frame buffer 134*b*-1, may convert the image frame into a second image source signal, and may transmit the second image source signal to the second display 190*b* so that the second display 190*b* may display the image frame.

In FIG. 42, the first frame buffer 134*a*-1 and the second frame buffer 134*b*-1 that correspond to the displays 190*a* and 190*b* may be provided separately. However, in FIG. 43, a single integrated frame buffer is illustrated according to another exemplary embodiment of the present inventive concept.

FIG. 43 is a schematic block diagram of an example of a configuration of the multi-display apparatus 100 configured to control the displays 190*a* and 190*b* using an integrated frame buffer 134-1. If the integrated frame buffer 134-1 is used, the memory size of the integrated frame buffer 134-1 may be allocated to be greater than the memory required to support the maximum resolution size of each of the first and second displays 190*a* and 190*b*.

For example, when each of the first and second displays 190*a* and 190*b* may display the maximum resolution of 1024×800, the integrated frame buffer 134-1 may have a storage area in a frame buffer size configured to display the resolution of 1024×1600. A first area of the integrated frame buffer 134-1 may store a first image frame to be displayed on the first display 190*a*, and a second area of the integrated frame buffer 134-1 may store a second image frame to be displayed on the second display 190*b*.

The display driver 134-2 may transmit the first and second image frames, respectively, to the first and second displays 190*a* and 190*b* using addresses of the first and second image frames which may be stored in the integrated frame buffer 134-1 so that each display 190*a* and 190*b* may be driven.

Figure 44:
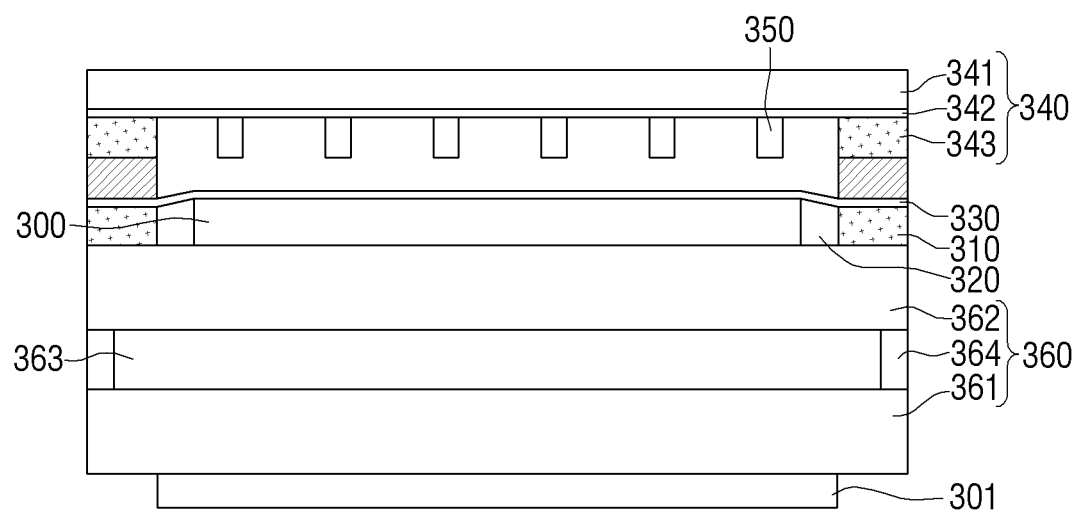
FIG. 44 is a cross sectional view illustrating the display according to an exemplary embodiment of the present inventive concept.

FIG. 44 is a cross sectional view that illustrates a display 390 according to an exemplary embodiment of the present inventive concept.

With reference to FIG. 44, the display 390 may include a display panel 360 which may be formed by placing an upper substrate 362 and a lower substrate 361 together, an upper polarizing plate 300, which may be provided on the upper substrate 362 of the display panel 360, a lower electrode 310, which may be provided on edges of the upper polarizing plate 300, a lower transparent electrode 330, which may be connected to the lower electrode 310 and may be provided on the upper polarizing plate 300, a touch screen 340, which may include an upper transparent electrode 342 and may be attached onto the upper substrate 362, and a protrusion 350, which may be provided between the upper transparent electrode 342 and the lower transparent electrode 330. In addition, the display 390 may further include a lower polarizing plate 301, which may be provided under the lower substrate 361.

The touch screen 340 may include a base film 341, the upper transparent electrode 342, which may be located above the base film 341, and an under electrode 343, which may be located under the upper transparent electrode 342.

A liquid crystal layer 363 may be provided between the upper substrate 362 and the lower substrate 361. The upper substrate 362 and the lower substrate 361 may include a display area (not illustrated) to display an image, and a peripheral area (not illustrated), which may be provided on the edges of the display area.

Although not illustrated in FIG. 44, the display area of the lower substrate 361 may include a plurality of gate lines, a plurality of data lines, a thin film transistor (TFT), which may be provided on an area where the plurality of gate lines and the plurality of data lines cross over each other, a pixel electrode, which may be connected to the TFT, and a sustaining electrode of which a portion may be overlapped with the pixel electrode.

The peripheral area of the lower substrate 361 may include a plurality of pads (not illustrated), which may be connected to the gate lines and the data lines.

The upper substrate 362 and the lower substrate 361 may be sealed with a sealing member 364 such as, for example, a sealant. It may be more effective that the sealing member 364 may be provided on the peripheral areas of the upper substrate 362 and the lower substrate 361.

In the display 390 illustrated in FIG. 44, when the touch screen 340 is pressed with predetermined strength, the protrusion 350 at a pressed area may be in contact with the lower transparent electrode 330 so that the lower transparent electrode 330 and the upper transparent electrode 342 may be electrically connected to each other. Due to the electrical connection, the electrical current that flows through the upper transparent electrode 342 and/or the lower transparent electrode 330 may be changed. A separate sensor (not illustrated) may sense this change and may transmit a signal to the controller 130. The controller 130 may generate coordinates of the area in which the flow of the electrical current may be or may have been changed using the signal, and may transmit the coordinates, for example, to a predetermined driver (not illustrated). The driver may manipulate an image displayed on the display panel 360 that corresponds to the received coordinates as if an input tool (not illustrated), such as a mouse, manipulates the image.

Figure 45:
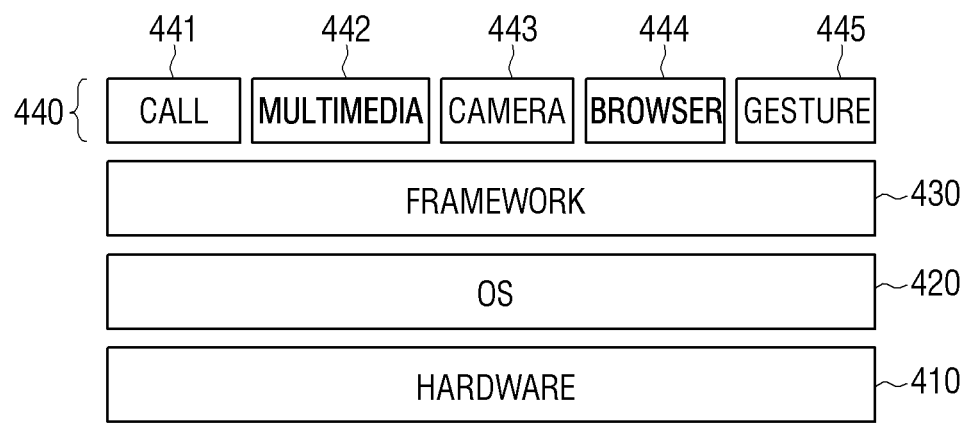
FIG. 45 illustrates a hierarchical structure of the multi-display apparatus according to an exemplary embodiment of the present inventive concept.

FIG. 45 illustrates a hierarchical system structure of the multi-display apparatus 100 according to an exemplary embodiment of the present inventive concept.

With reference to FIG. 45, a hardware 410 may include the communicator 110, the multimedia unit 120, the controller 130, the photographing unit 140, the sensor 150, the input/output unit 160, the storage 170, and the power supplier 180 of the multi-display apparatus 100.

The operating system (OS) 420 may control the overall operation of the hardware 410 and may manage the hardware 410. That is, the OS 420 may be a layer that performs basic functions such as, for example, hardware management, memory, and security. The OS 420 may include modules such as a display driver (not illustrated) to drive a multi-display, a communication driver (not illustrated) to transmit and receive data, a camera driver (not illustrated) to drive a photographing unit, an audio driver (not illustrated) to drive audio unit, and a power supply manager (not illustrated). In addition, the OS 420 may further include a library (not illustrated) and a runtime (not illustrated), which may be accessible by a developer (not illustrated).

A framework layer 430 may be at an upper level of the OS 420. The framework 430 may connect an application layer 440 and the OS layer 420. That is, the framework layer 430 may include, for example, a location manager (not illustrated), a notification manager (not illustrated), and/or a frame buffer (not illustrated), which may display an image on the touch screen.

The application layer 440 may exist above the framework layer 430 and may realize diverse functions of the multi-display apparatus 100. For example, the application layer 440 may include diverse application programs such as, for example, a call application 441, a multimedia application 442, a camera application 443, a browser application 444, and a gesture application 445.

The exterior of the multi-display apparatus 100 according to an exemplary embodiment of the present inventive concept is described here with reference to the attached perspective views.

Figure 46:
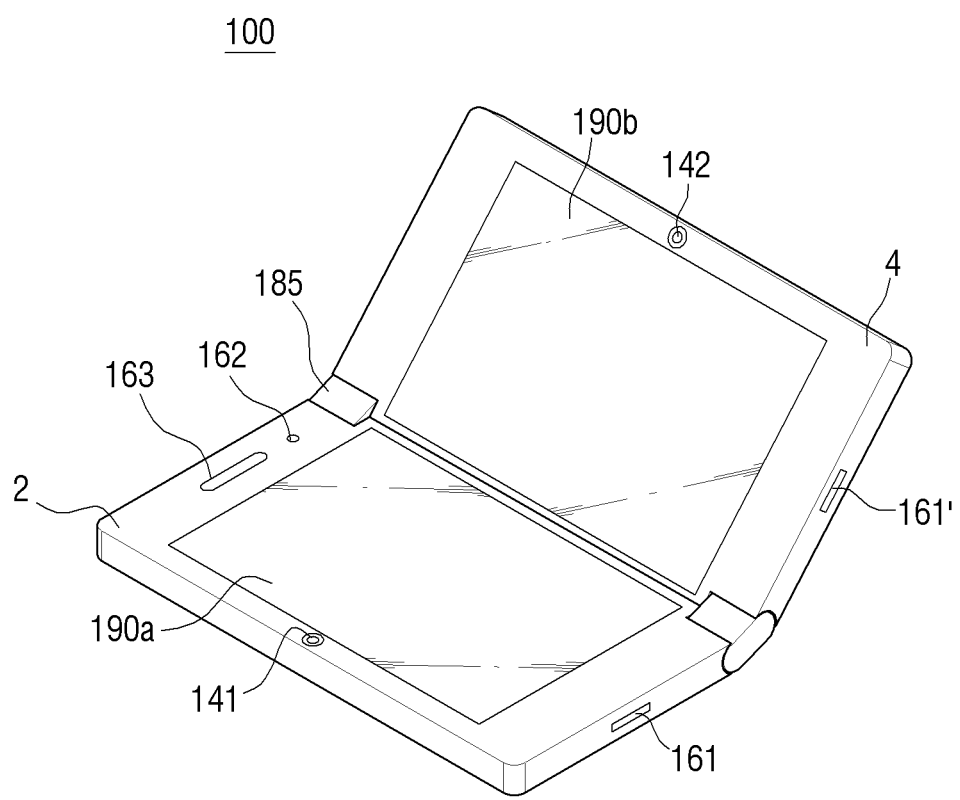
FIG. 46 is a detailed perspective view of the multi-display apparatus according to an exemplary embodiment of the present inventive concept.

FIG. 46 is a detailed perspective view of the multi-display apparatus 100 according to an exemplary embodiment of the present invention. In the exemplary embodiment illustrated in FIG. 46, the multi-display apparatus 100 may include two displays 190a and 190b that may be connected to each other by the hinge 185.

With reference to FIG. 46, the multi-display apparatus 100 may include first and second bodies 2 and 4. The first and second bodies 2 and 4 may be connected to each other by the hinge 185 and thus may be movable in relation to each other. The first display 190a may be provided on one face of the first body 2, and at least one physical button 161 may be provided on one side of the first display 190a. The second display 190b may be provided on one face of the second body 4, and at least one physical button 161' may be provided on one side of the second display 190b. The physical buttons 161 and 161' may include at least one of a push button and a touch button. In an exemplary embodiment of the present inventive concept, the first display 190a on the first body 2 may include a speaker 163 and a microphone 162 and may act as a main screen, and the second display 190b on the second body 4 may act as a sub-screen. In an exemplary embodiment of the present inventive concept, the first body 2 may include the first camera 141, and the second body 4 may include the second camera 142.

When the multi-display apparatus 100 is positioned as illustrated in FIG. 46, each of the displays 190a and 190b may display its screen in a landscape mode.

If the first and second bodies 2 and 4 of the multi-display apparatus 100 are connected to each other by the hinge 185 and thus movable in relation to each other, the multi-display apparatus 100 may be any device such as, for example, a notebook PC, a tablet PC, and a PMP. Although the first and second displays 190a and 190b may be provided, respectively, on the first and second bodies 2 and 4, the description below may be applied to a device in which a touch screen display is provided to only one of the two panels. In addition, at least one of the function buttons 161 and 161' on one side of the displays 190a and 190b may be omitted. Furthermore, although the first and second bodies 2 and 4 may be connected by the hinge 185 in this exemplary embodiment, the hinge 185 may be replaced with other components as long as the first and second bodies 2 may be folded by movements relative to each other.

The hinge 185 may include, for example, two hinge portions, which may be provided on an upper portion and a lower portion of a connecting portion of the first and second bodies 2 and 4 as illustrated in FIG. 46. Alternatively, the hinge 185, for example, may include a single hinge, which may be provided on the entire connecting portion of the first and second bodies 2 and 4.

The multi-display apparatus 100 may include a display unit, which may include the first display 190a and the second display 190b, which may be physically or graphically separated, and may support diverse screen modes using the two displays 190a and 190b as illustrated in FIGS. 47 to 50.

FIGS. 47 to 50 illustrate exemplary embodiments according to the interval angle between the first body 2 and the second body 4 of the multi-display apparatus 100 according to an exemplary embodiment of the present inventive concept.

The interval angle θ may be an angle of rotation of the second body 4 with respect to the first body 2 in, for example, a predetermined direction (e.g., counterclockwise).

For example, the interval angle θ may be detected using the hinge sensor 154, which may be mounted in the hinge 185. The hinge sensor 154 may be, for example, at least one of a Hall effect sensor, a pressure sensor, an inductive detection sensor, an electrical contact sensor, and/or an optical sensor, and may recognize the interval angle θ by detecting a movement of the hinge 185 and relative position of the hinge 185. In addition, the interval angle θ may be recognized by detecting the positions of the first and second bodies 2 and 4 using the geomagnetic sensor 152 and the acceleration sensor 153 as well as the hinge sensor 154.

Figure 47:
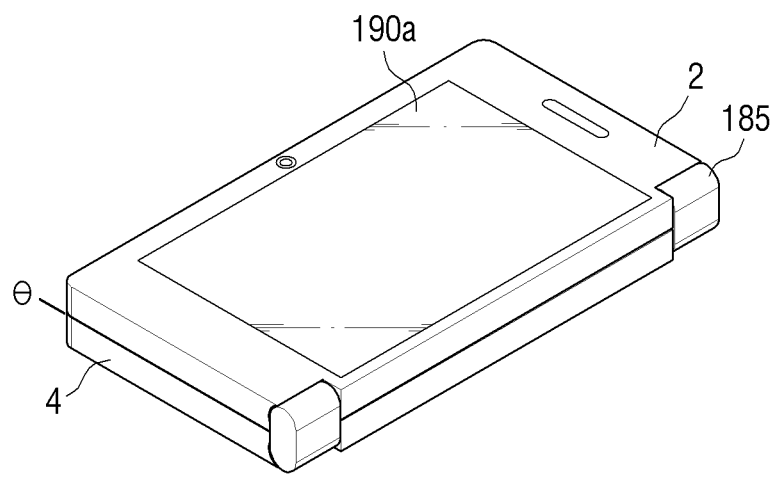
FIGS. 47 to 50 illustrate exemplary embodiments according to an interval angle θ between the first body and the second body of the multi-display apparatus according to an exemplary embodiment of the present inventive concept.

FIG. 47 is a perspective view that illustrates the folded multi-display apparatus 100 according to an exemplary embodiment of the present inventive concept. In FIG. 47, the first and second displays 190*a* and 190*b* on the first and second bodies 2 and 4 may face the outside, and the first and second bodies 2 and 4 may be in contact with each other, that is, may be completely folded toward the outside. This position may be referred to as a single mode. In this case, the interval angle θ is 0 degrees.

Figure 48:
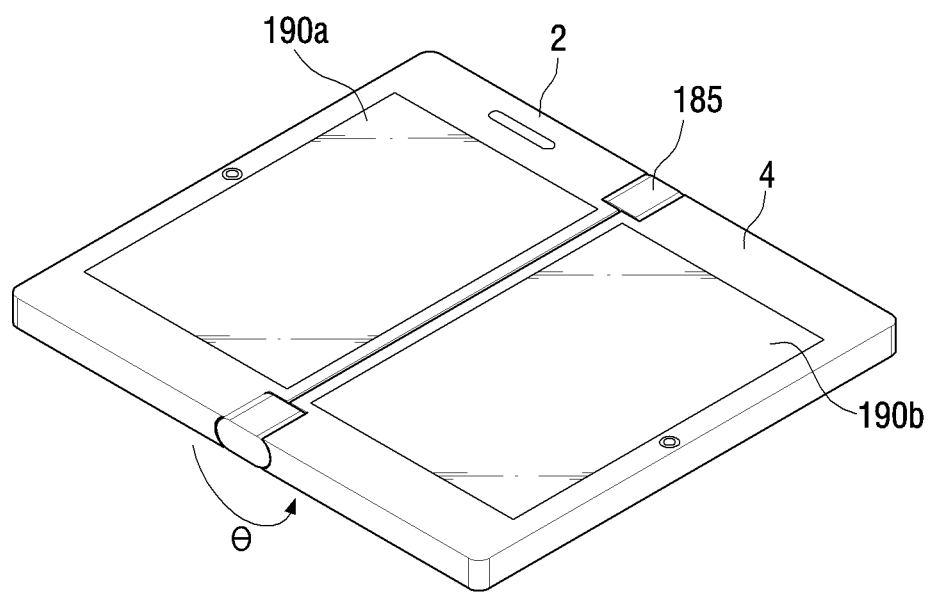

In FIG. 48, the first and second bodies 2 and 4 may be unfolded with the interval angle θ of 180 degrees or almost 180 degrees, within a predetermined range. This position may be referred to as an expanding mode.

Figure 49:
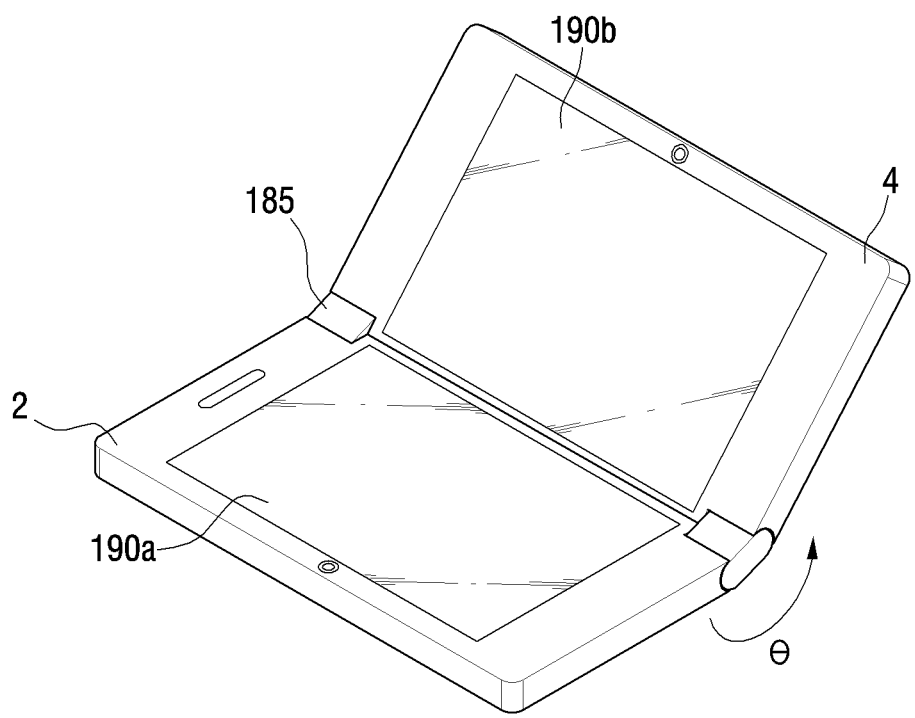

In FIG. 49, the interval angle θ of the second body 4 with respect to the first body 2 may be greater than 180 degrees so that the two displays 190*a* and 190*b* are slightly folded toward the inside.

Figure 50:
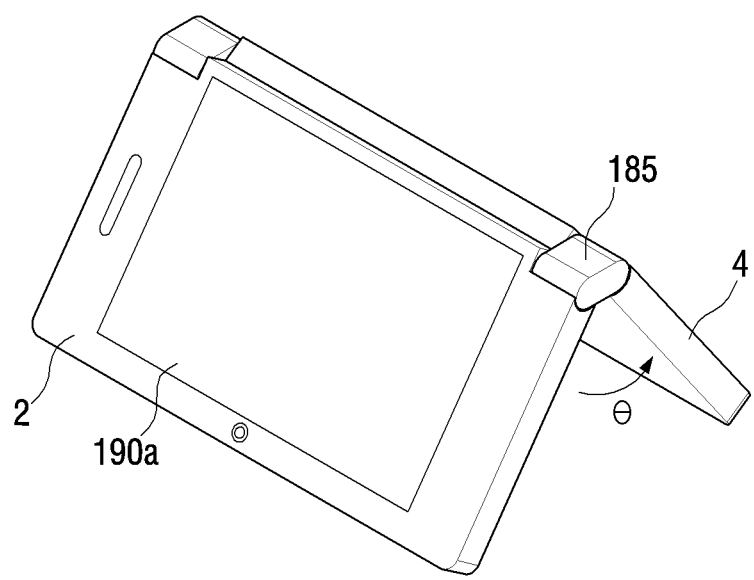

In FIG. 50, the interval angle θ of the second body 4 with respect to the first body 2 may be less than 180 degrees so that the two displays 190*a* and 190*b* are almost folded toward opposite directions, that is, the two displays 190*a* and 190*b* are slightly folded toward the inside. This position may be referred to as a toolkit mode.

In the above diverse exemplary embodiments of the present inventive concept, the first and second bodies 2 and 4 may be connected to each other by the hinge 185, but may also be connected by a connector (not illustrated), which may be made of a flexible material, instead of the hinge 185.

According to the diverse exemplary embodiments of the present inventive concept, a user interface that allows the user to control both the device and a running application more intuitively and conveniently for the user may be provided.

The operation control method of the multi-display apparatus and the method that provides the UI interface according to the diverse exemplary embodiments of the present inventive concept may be implemented in a program and may be provided to multi-display apparatuses.

For example, a program that performs operations, including storing control operation information which may be matched with a rotated body and a rotating direction, sensing an interval angle between a first body and a second body when a folding gesture to rotate the first body or the second body on a hinge occurs, and performing an operation corresponding to the folding gesture using the control operation information corresponding to the rotated body and the rotating direction when the interval angle satisfies predetermined conditions, may be stored in a non-transitory computer readable medium and may be provided.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

A non-transitory computer readable medium is a medium which does not store data temporarily such as a register, cash, and memory but stores data semi-permanently and is readable by devices. For example, the aforementioned diverse applications or programs may be stored and provided in a non-transitory computer readable medium such as a compact disk (CD), a digital video disk (DVD), a hard disk, a Blu-ray disk, a universal serial bus (USB), a memory card, and/or a read-only memory (ROM).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-display apparatus, comprising:
   a first body on which a first display is provided;
   a second body on which a second display is provided;
   a hinge configured to connect the first body and the second body;
   a storage configured to store control operation information which is matched with a rotated state of the first body and the second body;
   a sensor configured to sense a folding gesture to rotate at least one of the first body and the second body on a basis of the hinge; and
   a controller configured to perform, when the folding gesture is sensed, an operation corresponding to the folding gesture using the control operation information corresponding to the rotated state of a rotated body from among the first body and the second body,
   wherein the sensor detects a position of the first body and a position of the second body respectively, and senses the folding gesture based on the detected position of the first body and the detected position of the second body.

2. The multi-display apparatus as claimed in claim 1, wherein the controller is configured to display a user interface corresponding to the folding gesture at a predetermined area of a screen of the first display or the second display.

3. The multi-display apparatus as claimed in claim 2, wherein the controller is configured to expand and to reduce the user interface according to a dragging direction when a manipulation to drag the user interface is input.

4. The multi-display apparatus as claimed in claim 2, wherein the controller is configured to adjust at least one of a display position and a shape of the user interface according to a dragging direction when a manipulation to drag the user interface is input.

5. The multi-display apparatus as claimed in claim 2, wherein the sensor is configured to sense rotation of the multi-display apparatus, and the controller is configured to change an arrangement direction of objects displayed on the user interface according to a rotating direction when rotation of the multi-display apparatus is sensed.

6. The multi-display apparatus as claimed in claim 2, wherein the sensor is configured to sense rotation of the multi-display apparatus, and the controller is configured to change a display position of the user interface according to a rotating direction when rotation of the multi-display apparatus is sensed.

7. The multi-display apparatus as claimed in claim 1, wherein:
  the controller is configured to display, when the first body is rotated in a first direction, a clipboard user interface on a predetermined area of a screen of the first display;
  the controller is configured to display, when the first body is rotated in a second direction opposite to the first direction, an application configuration user interface on the predetermined area of the screen of the first display;
  the controller is configured to display, when the second body is rotated in a third direction, a quick launcher user interface on a predetermined area of a screen of the second display; and
  the controller is configured to display, when the second body is rotated in a fourth direction opposite to the third direction, a configuration user interface on the predetermined area of the screen of the second display.

8. The multi-display apparatus as claimed in claim 7, wherein:
  the controller is configured to produce a first symbol for a first object and to display the first symbol on the clipboard user interface when a first touch gesture is input to select the first object on the screen displayed on one of the first display and the second display and to move the first object onto the clipboard user interface; and
  the controller is configured to produce a second object for a second symbol and to display the second object on the screen displayed on one of the first display and the second display when a second touch gesture is input to select the second symbol displayed on the clipboard user interface and to move the second symbol onto the screen.

9. The multi-display apparatus as claimed in claim 7, wherein:
  the controller is configured to display a recycle bin icon on the clipboard user interface when a first touch gesture is input to touch a symbol displayed on the clipboard user interface for a predetermined time; and
  the controller is configured to delete the symbol from the clipboard user interface when a second touch gesture is input to move the symbol to the recycle bin icon.

10. The multi-display apparatus as claimed in claim 1, wherein the folding gesture is a folding and flat gesture in which the first body or the second body is rotated in a first direction on the basis of the hinge and is rotated in a second direction opposite to the first direction within a predetermined time.

11. The multi-display apparatus as claimed in claim 10, wherein:
  the controller is configured to display, when the folding and flat gesture occurs, a screen corresponding to the folding and flat gesture on at least one of the first display and the second display; and
  the controller is configured to stop displaying the screen, when the folding and flat gesture occurs again while the controller is displaying the screen, and to return to an original state.

12. The multi-display apparatus as claimed in claim 1, wherein the folding gesture is a folding and hold gesture in which the first body or the second body is rotated in a first direction on the basis of the hinge and is maintained in this position for a predetermined time.

13. The multi-display apparatus as claimed in claim 12, wherein:
  the controller is configured to display, when the folding and hold gesture occurs and while in a holding state, a screen corresponding to the folding and hold gesture on at least one of the first display and the second display; and
  the controller is configured to stop displaying the screen, when the holding state is released, and to return to an original state.

14. A method of controlling a multi-display apparatus, the method comprising:
  storing control operation information which is matched with a rotated state of a first body of the multi-display apparatus and a second body of the multi-display apparatus, wherein a first display is provided on the first body, a second display is provided on the second body, and a hinge is configured to connect the first body and the second body;
  sensing a folding gesture to rotate at least one of the first body and the second body on a basis of the hinge; and
  performing, when the folding gesture is sensed, an operation corresponding to the folding gesture using the control operation information corresponding to the rotated state of a rotated body from among the first body and the second body,
  wherein the sensing comprises detecting a position of the first body and a position of the second body respectively, and sensing the folding gesture based on the detected position of the first body and the detected position of the second body.

15. The method as claimed in claim 14, wherein the performing the operation corresponding to the folding gesture includes displaying a user interface corresponding to the folding gesture at a predetermined area of a screen of the first display or the second display.

16. The method as claimed in claim 15, further comprising:
  expanding or reducing the user interface according to a dragging direction when a manipulation to drag the user interface is input.

17. The method as claimed in claim 15, further comprising:
  adjusting at least one of a display position and a shape of the user interface according to a dragging direction when a manipulation to drag the user interface is input.

18. The method as claimed in claim 14, wherein the performing the operation corresponding to the folding gesture includes:
  displaying, when the first body is rotated in a first direction, a clipboard user interface on a predetermined area of a screen of the first display;
  displaying, when the first body is rotated in a second direction opposite to the first direction, an application configuration user interface on the predetermined area of the screen of the first display;
  displaying, when the second body is rotated in a third direction, a quick launcher user interface on a predetermined area of a screen of the second display; and displaying, when the second body is rotated in a fourth direction opposite to the third direction, a configuration user interface on the predetermined area of the screen of the second display.

19. The method as claimed in claim 18, further comprising:
producing a first symbol for a first object and displaying the first symbol on the clipboard user interface when a first touch gesture is input to select the first object on the screen displayed on one of the first display and the second display and to move the first object onto the clipboard user interface; and
producing a second object for a second symbol and displaying the second object on the screen displayed on one of the first display and the second display when a second touch gesture is input to select the second symbol displayed on the clipboard user interface and to move the second symbol onto the screen.

20. The method as claimed in claim 18, further comprising:
displaying a recycle bin icon on the clipboard user interface when a first touch gesture is input to touch a symbol displayed on the clipboard user interface for a predetermined time; and
deleting the symbol from the clipboard user interface when a second touch gesture is input to move the symbol to the recycle bin icon.

21. The method as claimed in claim 14, wherein the folding gesture is a folding and flat gesture in which the first body or the second body is rotated in a first direction on the basis of the hinge and is rotated in a second direction opposite to the first direction within a predetermined time.

22. The method as claimed in claim 21, wherein the performing the operation corresponding to the folding gesture includes:
displaying, when the folding and flat gesture occurs, a screen corresponding to the folding and flat gesture on at least one of the first display and the second display; and
stopping displaying the screen, when the folding and flat gesture occurs again while displaying the screen, and returning to an original state.

23. The method as claimed in claim 14, wherein the folding gesture is a folding and hold gesture in which the first body or the second body is rotated in a first direction on the basis of the hinge and is maintained in this position for a predetermined time.

24. The method as claimed in claim 23, wherein the performing the operation corresponding to the folding gesture includes:
displaying, when the folding and hold gesture occurs and while in a holding state, a screen corresponding to the folding and hold gesture on at least one of the first display and the second display; and
stopping displaying the screen, when the holding state is released, and returning to an original state.

25. An electronic apparatus, comprising:
a first body connected to a second body in a common housing;
a sensor configured to sense a gesture to rotate the first body with respect to the second body and to produce a signal in response to the gesture; and
a controller configured to perform, in response to the signal, an operation in at least one of the first body and the second body, the operation corresponding to the gesture,
wherein the sensor detects a position of the first body and a position of the second body respectively, and senses the folding gesture based on the detected position of the first body and the detected position of the second body.

26. The multi-display apparatus as claimed in claim 1, wherein the sensor is at least one of a gyroscope sensor, a geomagnetic sensor and an acceleration sensor.

\* \* \* \* \*